(12) United States Patent
Ishihara et al.

(10) Patent No.: US 8,787,769 B2
(45) Date of Patent: Jul. 22, 2014

(54) CHROMATIC DISPERSION VALUE CALCULATING APPARATUS, OPTICAL SIGNAL RECEIVING APPARATUS, OPTICAL SIGNAL TRANSMITTING APPARATUS, AND CHROMATIC DISPERSION VALUE CALCULATION METHOD

(75) Inventors: Koichi Ishihara, Yokosuka (JP); Takayuki Kobayashi, Yokosuka (JP); Riichi Kudo, Yokosuka (JP); Yasushi Takatori, Atsugi (JP); Munehiro Matsui, Yokosuka (JP); Masato Mizoguchi, Yokosuka (JP); Tadao Nakagawa, Yokosuka (JP); Etsushi Yamazaki, Yokosuka (JP); Akihide Sano, Yokosuka (JP); Yutaka Miyamoto, Yokosuka (JP); Eiji Yoshida, Yokosuka (JP); Shogo Yamanaka, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 13/380,432

(22) PCT Filed: Jul. 14, 2010

(86) PCT No.: PCT/JP2010/061898
§ 371 (c)(1),
(2), (4) Date: Dec. 22, 2011

(87) PCT Pub. No.: WO2011/007803
PCT Pub. Date: Jan. 20, 2011

(65) Prior Publication Data
US 2012/0099864 A1 Apr. 26, 2012

(30) Foreign Application Priority Data

Jul. 17, 2009 (JP) .................................. 2009-169518
Oct. 8, 2009 (JP) .................................. 2009-234360

(51) Int. Cl.
H04B 10/00 (2013.01)
H04B 10/06 (2006.01)

(52) U.S. Cl.
USPC .......................... 398/159; 398/205; 398/208

(58) Field of Classification Search
USPC .................. 398/147, 158, 159, 182–201, 208
See application file for complete search history.

(56) References Cited

U.S. PATENT DOCUMENTS

| | | | |
|---|---|---|---|
| 7,266,306 B1 * | 9/2007 | Harley et al. | 398/182 |
| 7,463,802 B2 | 12/2008 | Witzel | |
| 7,769,299 B2 | 8/2010 | Ooi et al. | |
| 2002/0126351 A1 * | 9/2002 | Chung et al. | 359/124 |
| 2003/0067651 A1 | 4/2003 | Wan et al. | |
| 2007/0165294 A1 * | 7/2007 | Witzel | 359/245 |
| 2009/0297140 A1 * | 12/2009 | Heismann et al. | 398/16 |
| 2010/0316326 A1 * | 12/2010 | Sugiyama | 385/3 |

FOREIGN PATENT DOCUMENTS

| | | |
|---|---|---|
| CN | 1392670 A | 1/2003 |
| EP | 1 381 176 A2 | 1/2004 |
| JP | 2006-262452 A | 9/2006 |
| JP | 2007-208546 A | 8/2007 |
| JP | 2009-512365 A | 3/2009 |
| WO | 01/61888 A9 | 10/2002 |
| WO | 2007/045070 A1 | 4/2007 |

OTHER PUBLICATIONS

Liu, Ning, et al., "PMD and Chirp Effects Suppression in RF Tone-Based Chromatic Dispersion Monitoring," IEEE Photonics Technology Letters, vol. 18, No. 5, Mar. 1, 2006, pp. 673-675.
Notice of Allowance, Japanese Patent Application No. 2011-522835, Dec. 4, 2012.
Dimmick, Timothy E., et al., "Optical Dispersion Monitoring Technique Using Double Sideband Subcarriers," IEEE Photonics Technology Letters, vol. 12, No. 7, Jul. 2000, pp. 900-902.
Search Report, European Patent Application No. 10799861.9, Mar. 12, 2013.
H. Masuda, et al., "13.5-Tb/s (135x11-Gb/s/ch) No-Guard-Interval Coherent OFDM Transmission over 6,248 km using SNR Maximized Second-order DRA in the Extended L-band," OSA/OFC/NFOEC 2009, PDPB5.

(56) References Cited

OTHER PUBLICATIONS

Jianjun Yu, et al., "17 Tb/s (161x114 Gb/s) PolMux-RZ-8PSK transmission over 662 km of ultra-low loss fiber using C-band EDFA amplification and digital coherent detection," ECOC 2008, Th.3.E.2, Brussels, Belgium, Sep. 21-25, 2008.

R. Kudo, T. Kobayashi, K. Ishihara, Y. Takatori, A. Sano, E. Yamada, H. Masuda, Y. Miyamoto, and M. Mizoguchi, "Single carrier transmission with two-stage overlap frequency domain equalisation for long-haul optical systems," Electronics Letters, vol. 45, issue 3, Jan. 2009.

R. Kudo, T. Kobayashi, K. Ishihara, Y. Takatori, A. Sano, and Y. Miyamoto, "Coherent optical single carrier transmission using overlap frequency domain equalization for long-haul optical systems," J. Lightw. Technol., vol. 27, No. 16, pp. 3721-3728, Aug. 2009.

Qian Yu, Zhongqi Pan, Lian-Shan Yan, and Alan Eli Willner, "Chromatic dispersion monitoring technique using sideband optical filtering and clock phase-shift detection," Journal of Lightwave Technology, Dec. 2002, vol. 20, No. 12, p. 2267-2271.

H. Kawakami, E. Yoshida, H. Kubota and Y. Miyamoto, "Novel signed chromatic dispersion monitoring technique based on asymmetric waveform distortion in DQPSK receiver", OECC/ACOFT 2008 Conference, Jul. 2008.

International Search Report for PCT/JP2010/061898, mailed Sep. 21, 2010, ISA/JP.

Office Action, Chinese Patent Application No. 201080026669.8, Feb. 8, 2014.

\* cited by examiner

*Primary Examiner* — David Payne
*Assistant Examiner* — Casey Kretzer
(74) *Attorney, Agent, or Firm* — Harness, Dickey & Pierce, P.L.C.

(57) ABSTRACT

In order to compensate for chromatic dispersion caused by optical fiber transmission in a communication system with coherent detection using optical signals, specific frequency band signals are used to enable estimation of a chromatic dispersion value. The chromatic dispersion value calculating apparatus is provided with: a signal distributing circuit which distributes, into a plurality of signal sequences, an electrical digital signal converted from received optical signals of an optical signal transmitted by an optical signal transmitting apparatus, in which a known signal with concentrated frequency components of a plurality of specific frequencies is appended to a signal generated from a transmission data sequence; a plurality of frequency band pass filter circuits, each of which separating only each of a plurality of specific frequency components in which the known signal is included from each of the signal sequences distributed by the signal distributing circuit, and passing each of the specific frequency components therethrough; a plurality of power calculating circuits which are provided so as to correspond respectively to the plurality of frequency band pass filter circuits and which calculate power values of signals output from the corresponding frequency band pass filter circuits; a delay time calculating circuit which detects times at which power has the maximum value or times at which the power exceeds a predetermined threshold value, respectively from signal sequences of the power values output from the plurality of power calculating circuits, and which compares the detected times; and a chromatic dispersion value calculating circuit which calculates a chromatic dispersion value based on a comparison result of the times by the delay time calculating circuit.

22 Claims, 38 Drawing Sheets

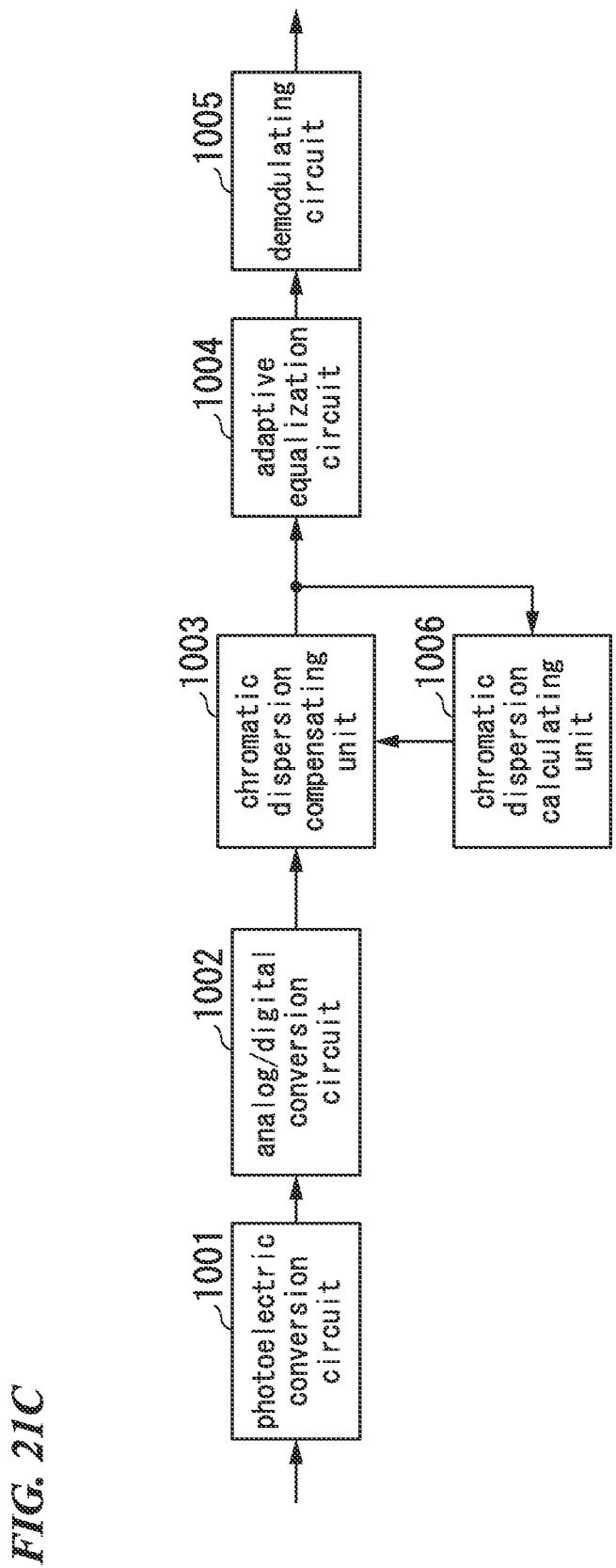

| second specific frequency band signal | first specific frequency band signal | second specific frequency band signal |
|---|---|---|

CHROMATIC DISPERSION VALUE CALCULATING APPARATUS, OPTICAL SIGNAL RECEIVING APPARATUS, OPTICAL SIGNAL TRANSMITTING APPARATUS, AND CHROMATIC DISPERSION VALUE CALCULATION METHOD

CROSS-REFERENCE TO RELATED APPLICATIONS

This application is a 371 U.S. National Stage of International Application No. PCT/JP2010/061898, filed Jul. 14, 2010. This application claims priority to Japanese Patent Applications Nos. JP 2009-169518, filed Jul. 17, 2009 and JP 2009-234360, filed Oct. 8, 2009. The disclosures of the above applications are incorporated herein by reference.

TECHNICAL FIELD

The present invention relates to a chromatic dispersion value calculating apparatus, an optical signal receiving apparatus, an optical signal transmitting apparatus, and a chromatic dispersion value calculation method. In particular, the present invention relates to a technique such that in optical communication, an optical signal transmitting apparatus transmits a specific frequency band signal, an optical signal receiving apparatus receives the specific frequency band signal, a chromatic dispersion value in an optical fiber transmission line is detected, and chromatic dispersion compensation is performed based on the calculated value of the chromatic dispersion value, to thereby compensate for distortion in a transmitted signal caused by chromatic dispersion associated with optical fiber transmission.

Priority is claimed on Japanese Patent Application No. 2009-169518, filed Jul. 17, 2009, and Japanese Patent Application No. 2009-234360, filed Oct. 8, 2009, the contents of which are incorporated herein by reference.

BACKGROUND ART

In the field of optical communication, a digital coherent communication system which combines a coherent detection scheme and digital signal processing for significantly improving frequency utilization efficiency is drawing attention. Compared to a system built with direct detection, this type of communication system is known to be capable of not only improving receiver sensitivity but also compensating for waveform distortion in a transmitted signal caused by chromatic dispersion and polarization mode dispersion associated with optical fiber transmission, by receiving the transmitted signal as a digital signal. Therefore, introduction of this type of communication system is being considered as a next-generation optical communication technique.

The digital coherent schemes exemplified by Non-Patent Documents 1 and 2 employ a method in which quasi-static chromatic dispersion is compensated for by a digital filter having a fixed number of taps (e.g., the number of taps is 2048 taps for the dispersion of 20000 ps/nm and for a signal at 28 G Baud), and variable polarization-mode dispersion is compensated for by an adaptive filter with a small number of taps, (e.g., about 10 to 12 taps for polarization-mode dispersion of 50 ps) using a blind algorithm.

PRIOR ART DOCUMENT

Non-Patent Document

Non-Patent Document 1: H. Masuda, et al., "13.5-Tb/s (135× 111-Gb/s/ch) No-Guard-Interval Coherent OFDM Transmission over 6,248 km using SNR Maximized Second-order DRA in the Extended L-band," OSA/OFC/NFOEC 2009, PDPB5.

Non-Patent Document 2: Jianjun Yu, et al., "17 Tb/s (161× 114 Gb/s) PolMux-RZ-8PSK transmission over 662 km of ultra-low loss fiber using C-band EDFA amplification and digital coherent detection," ECOC 2008, Th.3.E.2, Brussels, Belgium, 21-25 Sep. 2008.

DISCLOSURE OF THE INVENTION

Problems to be Solved by the Invention

However, in the digital coherent schemes of Non-Patent Documents 1 and 2, it is necessary to separately measure chromatic dispersion in advance and manually input tap coefficients of a fixed-point digital filter to each of receivers for wavelength-division multiplexing (WDM) channels.

The present invention has been made in view of such circumstances, and an object thereof is to provide a chromatic dispersion value calculating apparatus, an optical signal receiving apparatus, an optical signal transmitting apparatus, and a chromatic dispersion value calculation method for enabling chromatic dispersion value estimation using specific frequency band signals, in order to compensate for chromatic dispersion that occurs in optical fiber transmission in a communication system with coherent detection using optical signals.

Means for Solving the Problems

In order to solve the above problems, the present invention is a chromatic dispersion value calculating apparatus which includes: a signal distributing circuit which distributes, into a plurality of signal sequences, an electrical digital signal converted from a received optical signal of an optical signal transmitted by an optical signal transmission apparatus in which a known signal with concentrated frequency components of a plurality of specific frequencies is appended to a signal generated from a transmission data sequence; a plurality of frequency band pass filter circuits, each of which separating only each of a plurality of specific frequency components in which the known signal is included from each of the signal sequences distributed by the signal distributing circuit, and passing each of the specific frequency components therethrough; a plurality of power calculating circuits which are provided so as to correspond respectively to the plurality of frequency band pass filter circuits and which calculate power values of signals output from the corresponding frequency band pass filter circuits; a delay time calculating circuit which detects times at which power has the maximum value or times at which the power exceeds a predetermined threshold value, respectively from signal sequences of the power values output from the plurality of power calculating circuits, and which compares the detected times; and a chromatic dispersion value calculating circuit which calculates a chromatic dispersion value based on a comparison result of the times by the delay time calculating circuit.

The chromatic dispersion value calculating apparatus above may further include a plurality of averaging circuits which are provided so as to correspond to the respective signal sequences and which average the signal sequences of the power values obtained in a period in which the known signal arrives.

Moreover, the present invention is a chromatic dispersion value calculating apparatus which includes: a plurality of sets corresponding to polarized waves of an optical signal, each set including a signal distributing circuit which distributes, into a plurality of polarized wave signal sequences, an electrical digital signal converted from one of the polarized waves of a received optical signal of the optical signal transmitted by an optical signal transmission apparatus in which a known signal with concentrated frequency components of a plurality of specific frequencies is appended to a signal generated from a transmission data sequence, a plurality of frequency band pass filter circuits, each of which separating only each of a plurality of specific frequency components in which a known signal is included from each of the polarized wave signal sequences distributed by the signal distributing circuit, and passing each of the specific frequency components therethrough, and a plurality of power calculating circuits which are provided so as to correspond respectively to the plurality of frequency band pass filter circuits and which calculate power values of output signals from the corresponding frequency band pass filter circuits; a plurality of multiplexing circuits which synthesize signal sequences of the power values output from the plurality of power calculating circuits corresponding to different polarized waves in the same frequency band; a delay time calculating circuit which detects times at which power has the maximum value or times at which the power exceeds a predetermined threshold value, from signal sequences of the power values output from the plurality of multiplexing circuits, and which compares the detected times; and a chromatic dispersion value calculating circuit which calculates a chromatic dispersion value based on a comparison result of the times by the delay time calculating circuit.

The chromatic dispersion value calculating apparatus above may further include a plurality of averaging circuits which are provided so as to correspond to the respective polarized wave signal sequences and which average the signal sequences of the power values obtained in a period in which the known signal arrives.

Furthermore, the present invention is an optical signal receiving apparatus which includes: a photoelectric conversion circuit which converts, into an electrical signal, a received optical signal of an optical signal in which a known signal with concentrated frequency components in a plurality of specific frequencies is appended to a signal generated from a transmission data sequence; an analog/digital conversion circuit which converts the electrical signal converted by the photoelectric conversion circuit into a digital signal; a chromatic dispersion calculating unit which calculates a chromatic dispersion value; a chromatic dispersion compensating unit which compensates the digital signal output from the analog/digital conversion circuit, for distortion caused by chromatic dispersion, based on the chromatic dispersion value calculated by the chromatic dispersion calculating unit; an adaptive equalization circuit which equalizes the digital signal in which the distortion caused by the chromatic dispersion has been compensated for by the chromatic dispersion compensating unit; and a demodulating circuit which demodulates the digital signal which have been equalized by the adaptive equalization circuit, wherein the chromatic dispersion calculating unit may be the above chromatic dispersion value calculating apparatus, and the chromatic dispersion calculating unit may calculate the chromatic dispersion value from the digital signal converted by the analog/digital conversion circuit or the digital signal output from the chromatic dispersion compensating unit.

Moreover, the present invention is an optical signal receiving apparatus which includes: a polarized wave distributing circuit which distributes, into polarized waves, a received optical signal of an optical signal in which a known signal with frequency components concentrated in a plurality of specific frequencies is appended to a signal generated from a transmission data sequence; a plurality of photoelectric conversion circuits which convert the polarized waves of the optical signal distributed by the polarized wave distributing circuit into electrical signals; a plurality of analog/digital conversion circuits which are provided so as to correspond respectively to the plurality of photoelectric conversion circuits, and which convert the electrical signals converted by the plurality of corresponding photoelectric conversion circuits into digital signals; a chromatic dispersion calculating unit which calculates a chromatic dispersion value; a plurality of chromatic dispersion compensating units which are provided so as to correspond to the plurality of analog/digital conversion circuits, and which compensate the digital signals output from the corresponding analog/digital conversion circuits for distortion caused by chromatic dispersion, based on the chromatic dispersion value calculated by the chromatic dispersion calculating unit; an adaptive equalization circuit which equalizes respective digital signals in which the distortion caused by the chromatic dispersion has been compensated for by the plurality of chromatic dispersion compensating units; and a plurality of demodulating circuits which demodulate respective digital signals equalized by the adaptive equalization circuit, wherein the chromatic dispersion calculating unit may be the above chromatic dispersion value calculating apparatus, and the chromatic dispersion calculating unit may calculate the chromatic dispersion value from the digital signals converted by the plurality of analog/digital conversion circuits, or the digital signals output from the plurality of chromatic dispersion compensating units.

Moreover, the present invention is a chromatic dispersion value calculating apparatus which includes: a signal distributing circuit which distributes, into a plurality of signal sequences, polarized waves of an electrical digital signal converted from a received optical signal of an optical signal in which a training signal sequence in which second specific frequency band signal sequences with power concentrated in a specific frequency band which differs from a first specific frequency band signal sequence with power concentrated in a plurality of specific frequency bands are appended before and after the first specific frequency band signal sequence, is time-division multiplexed with a transmission data sequence by an optical signal transmitting apparatus, and is transmitted by the optical signal transmitting apparatus; a plurality of frequency band pass filter circuits, each of which separating each of a plurality of specific frequency components with power concentrated in the first specific frequency band signal sequence from each of the plurality of signal sequences distributed by the signal distributing circuit, and passing each of the specific frequency components therethrough; a plurality of power calculating circuits which are provided so as to correspond respectively to the plurality of frequency band pass filter circuits, and which calculate power values of the respective signal sequences of the plurality of specific frequency components output from the corresponding frequency band pass filter circuits; a plurality of multiplexing circuits which synthesize the signal sequences of the power values output from the plurality of power calculating circuits corresponding to different polarized waves of the same specific frequency component; a plurality of averaging filter circuits which are provided so as correspond respectively to the plurality of multiplexing circuits and which average consecutive signal sequences output from the corresponding multiplexing circuits; and a delay time calculating circuit which, for respective signal sequences averaged by the plurality of averaging filter circuits, detects times at which power has the maximum value or times at which the power exceeds a predetermined threshold value, which compares the detected times, and which outputs a delay time obtained as a result of comparison, or a chromatic dispersion value calculated from the delay time.

The chromatic dispersion value calculating apparatus described above may further include a frequency offset calculating circuit which calculates a frequency offset based on frequencies at which the power has a peak value in a signal sequence of the electrical digital signal, wherein the plurality of frequency band pass filter circuits may shift frequencies of frequency bands to be passed, based on the value of the frequency offset calculated by the frequency offset calculating circuit, or may compensate the signal sequences of the polarized waves to be passed for the frequency offset, based on the value of the frequency offset.

The chromatic dispersion value calculating apparatus described above may further include a training signal detecting circuit which detects an inserted position of the training signal sequence in the electrical digital signal, which extracts a signal sequence in a section which includes the training signal sequence and signal sequences in sections therebefore and thereafter, based on the detected inserted position, and which outputs the signal sequences to the signal distributing circuit.

The chromatic dispersion value calculating apparatus described above may further include a frequency offset calculating circuit which calculates a frequency offset based on frequencies at which the power has a peak value in the signal sequences extracted by the training signal detecting circuit, wherein the plurality of frequency band pass filter circuits may shift frequencies of frequency bands to be passed, based on the value of the frequency offset calculated by the frequency offset calculating circuit, or may compensate the signal sequences of the polarized waves to be passed for the frequency offset, based on the value of the frequency offset.

Moreover, the present invention is an optical signal receiving apparatus which includes: a photoelectric conversion circuit which converts, into an electrical signal, a received optical signal of an optical signal in which a training signal sequence in which second specific frequency band signal sequences with power concentrated in a specific frequency band which differs from a first specific frequency band signal sequence with power concentrated in a plurality of specific frequency bands are appended before and after the first specific frequency band signal sequence, is time-division multiplexed with a transmission data sequence; an analog/digital conversion circuit which converts the electrical signal converted by the photoelectric conversion circuit into a digital signal; a chromatic dispersion compensating unit which compensates the digital signal output from the analog/digital conversion circuit for distortion caused by chromatic dispersion, based on a calculated chromatic dispersion value; a chromatic dispersion value calculating unit which calculates the chromatic dispersion value based on a digital signal in which the distortion caused by the chromatic dispersion has been compensated for by the chromatic dispersion compensating unit; an adaptive equalization circuit which equalizes the digital signal in which the distortion caused by the chromatic dispersion has been compensated for by the chromatic dispersion compensating unit; and a demodulating circuit which demodulates a digital signal which has been equalized by the adaptive equalization circuit, wherein the chromatic dispersion value calculating unit may be the above chromatic dispersion value calculating apparatus.

Furthermore, the present invention is an optical signal receiving apparatus which includes: a polarized wave dividing circuit which divides, into polarized waves, a received optical signal of an optical signal in which a training signal sequence in which second specific frequency band signal sequences with power concentrated in a specific frequency band which differs from a first specific frequency band signal sequence with power concentrated in a plurality of specific frequency bands are appended before and after the first specific frequency band signal sequence, is time-division multiplexed with a transmission data sequence; a plurality of photoelectric conversion circuits which convert the polarized waves of the optical signal divided by the polarized wave dividing circuit into electrical signals; a plurality of analog/digital conversion circuits which are provided so as to correspond respectively to the plurality of photoelectric conversion circuits, and which convert the electrical signals converted by the plurality of corresponding photoelectric conversion circuits into digital signals; a plurality of chromatic dispersion compensating units which are provided so as to correspond respectively to the plurality of analog/digital conversion circuits, and which compensate the digital signals output from the plurality of corresponding analog/digital conversion circuits for distortion caused by chromatic dispersion, based on a calculated chromatic dispersion value; a chromatic dispersion value calculating unit which calculates the chromatic dispersion value from digital signals in which the distortion caused by the chromatic dispersion has been compensated for by the plurality of chromatic dispersion compensating units; an adaptive equalization circuit which equalizes the respective digital signals in which the distortion caused by the chromatic dispersion has been compensated for by the plurality of chromatic dispersion compensating units; and a plurality of demodulating circuits which are provided for the polarized waves, and which demodulate the polarized waves of digital signals equalized by the adaptive equalization circuit, wherein the chromatic dispersion value calculating unit may be the above chromatic dispersion value calculating apparatus.

Moreover, the present invention is an optical signal transmitting apparatus which includes: a specific frequency band signal generating circuit which generates a first specific frequency band signal sequence with power concentrated in a plurality of specific frequency bands and second specific frequency band signal sequences with power concentrated in a specific frequency band different from the first specific frequency band signal sequence, and which generates a training signal sequence in which the second specific frequency band signal sequences are time-division multiplexed immediately before and immediately after the first specific frequency band signal sequence; a signal multiplexing circuit which generates a signal sequence in which the training signal sequence generated by the specific frequency band signal generating circuit is inserted into a transmission data sequence by means of time-division multiplexing; and an electro-optical conversion circuit which converts the signal sequence generated by the signal multiplexing circuit into an optical signal.

In the optical signal transmitting apparatus described above, a transmission section of the second specific frequency band signal sequences in the training signal sequence may only have a DC component, or no signals may be transmitted in the transmission section.

In the optical signal transmitting apparatus described above, a frequency interval between the specific frequency band in which power is concentrated in the second specific frequency band signal sequences and the specific frequency bands in which power is concentrated in the first specific frequency band signal sequence may be set so as to be a value greater than a predetermined value.

In the above optical signal transmitting apparatus, the predetermined value may be the maximum value with which a set frequency offset can be compensated for.

In the optical signal transmitting apparatus described above, the phase of the first specific frequency band signal sequence may be different from the phases of the second specific frequency band signal sequences.

In the optical signal transmitting apparatus described above, the second specific frequency band signal sequences before and after the first specific frequency band signal sequence may be different from each other.

In the optical signal transmitting apparatus described above, a plurality of sequences of the training signal sequence may be transmitted on different polarization planes.

Moreover, the present invention is a chromatic dispersion value calculation method which includes: a signal distributing step of distributing, into a plurality of signal sequences, polarized waves of an electrical digital signal converted from a received optical signal of an optical signal transmitted by an optical signal transmitting apparatus in which a training signal sequence in which second specific frequency band signal sequences with power concentrated in a specific frequency band which differs from a first specific frequency band signal sequence with power concentrated in a plurality of specific frequency bands are appended before and after the first specific frequency band signal sequence, is time-division multiplexed with a transmission data sequence; a filtering step of separating each of a plurality of specific frequency components with power concentrated in the first specific frequency band signal sequence, from each of the plurality of signal sequences distributed in the signal distributing step; a power calculating step of calculating power values of the signal sequences of the plurality of specific frequency components separated in the filtering step; a multiplexing step of synthesizing signal sequences of the power values corresponding to different polarized waves of the same specific frequency component, among the power values calculated in the power calculating step; an averaging step of averaging consecutive signal sequences synthesized in the multiplexing step; and a delay time calculating step of detecting times at which power has the maximum value or times at which the power exceeds a predetermined threshold value from a signal sequence averaged in the averaging step, comparing the detected times, and outputting a delay time obtained as a result of comparison or a chromatic dispersion value calculated from the delay time.

Effect of the Invention

In accordance with the present invention, the optical signal transmitting apparatus generates specific frequency band signals having power concentrated in two or more specific frequencies, and transmits signals including these generated specific frequency band signals. The optical signal receiving apparatus calculates a chromatic dispersion value from the difference in the arrival time of the specific frequency band signals included in received signals and compensates for this calculated chromatic dispersion value, thereby decoding of the received signals becomes possible.

Moreover, in accordance with the present invention, the optical signal transmitting apparatus generates a first specific frequency band signal sequence with power concentrated in two or more specific frequency bands, and second specific frequency band signal sequences with power concentrated in a specific frequency band different from those two or more specific frequency bands of the first specific frequency band signal sequence, and transmits a signal including a signal sequence in which the second specific frequency band signal sequences are respectively time-division multiplexed immediately before and immediately after this generated first specific frequency band signal sequence. The optical signal receiving apparatus calculates a chromatic dispersion value from the difference in the arrival time of the specific frequency bands of the first specific frequency band signal sequence included in this signal, and compensates for this calculated chromatic dispersion value, thereby decoding of the received signal becomes possible.

BRIEF DESCRIPTION OF THE DRAWINGS

FIG. 21C is a block diagram showing the configuration of the optical signal receiving apparatus in a case of calculating chromatic dispersion, using an output value of the chromatic dispersion compensating unit instead of an output value of an analog/digital conversion circuit in the first embodiment of the present invention.

MODE FOR CARRYING OUT THE INVENTION

Hereinafter, embodiments of the present invention will be described in detail with reference to the drawings. An optical signal transmitting apparatus and an optical signal receiving apparatus in accordance with the embodiments of the present invention are to be used in a coherent communication system such as a coherent detection optical fiber transmission system which uses optical signals.

First Embodiment

First, a first embodiment of the present invention will be described.

Figure 1:
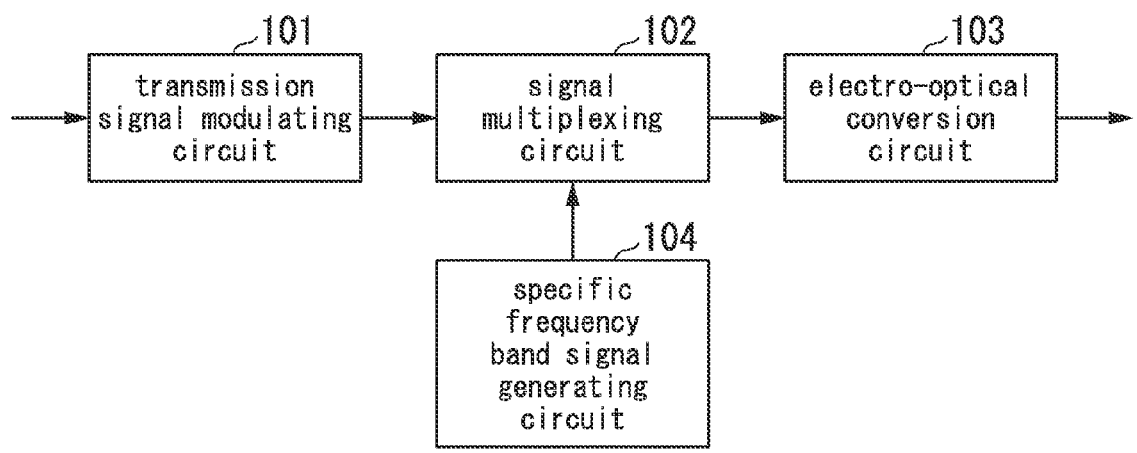
FIG. 1 is a block diagram showing the configuration of an optical signal transmitting apparatus in accordance with a first embodiment of the present invention.

FIG. 1 shows an example of the configuration of an optical signal transmitting apparatus in accordance with the first embodiment of the present invention. In this diagram, 101 denotes a transmission signal modulating circuit, 102 denotes a signal multiplexing circuit, 103 denotes an electro-optical conversion circuit, and 104 denotes a specific frequency band signal generating circuit.

The transmission signal modulating circuit 101 modulates a binary sequence of data to be transmitted, and outputs a transmission symbol sequence. The specific frequency band signal generating circuit 104 generates a signal sequence having signals in two or more specific frequencies, and outputs the generated signal sequence as a specific frequency band signal (a known signal). The signal multiplexing circuit 102 receives the outputs of the transmission signal modulating circuit 101 and the specific frequency band signal generating circuit 104, and multiplexes the plurality of signals in the time domain, and outputs the multiplexed result. The electro-optical conversion circuit 103 receives the output of the signal multiplexing circuit 102, performs electro-optical conversion, and outputs an optical signal.

Here, as specific frequency band signals, for example, alternating signals that are point-symmetric on an IQ plane may be used. As an example, BPSK (binary phase shift keying) signals may be generated and two signal points may be used alternately like −S, S, −S, S, . . . , −S, S, or QPSK (quadrature phase shift keying) signals may be generated in manners such as (S, S), (−S, −S), (S, S), (−S, −S), . . . , (S, S), (−S, −S), or (S, −S), (−S, S), (S, −S), (−S, S), . . . , (S, −S), (−S, S), thereby making it possible to generate specific frequency band signals. Here, S denotes an arbitrary real number. Moreover, $\alpha$ and $\beta$ in the notation ($\alpha$, $\beta$) respectively denote signal components of a real part and imaginary part, and it may be expressed as $\alpha+j\beta$ as a complex number. j is an imaginary unit.

Moreover, it is possible to use alternating signals, in which a single signal is repeated M times (M is an arbitrary positive number), such as −S, −S, S, S, −S, −S, S, S, . . . , −S, −S, S, S. Furthermore, it is possible to generate a specific frequency band signal having peaks in four or more frequency bands by mixing or convoluting signals corresponding to the number of a plurality of repetitions. Moreover, it is also possible to generate a specific frequency band signal having peaks in two or more frequency bands by generating and summing a plurality of sinusoidal waves with different periods. Furthermore, it is possible to generate a specific frequency band signal by transmitting signals for only specific subcarriers by means of an orthogonal frequency division multiplexing (OFDM) scheme.

With use of specific frequency band signals, signal lights respectively have a frequency spectrum with a small spread, and thus deterioration in waveforms caused by chromatic dispersion will be unlikely. On the other hand, since their frequency spectra spread to a certain degree, there is a difference between arrival times when chromatic dispersion occurs. With this understanding, it is possible to calculate a chromatic dispersion value using a method described below.

Figure 2:
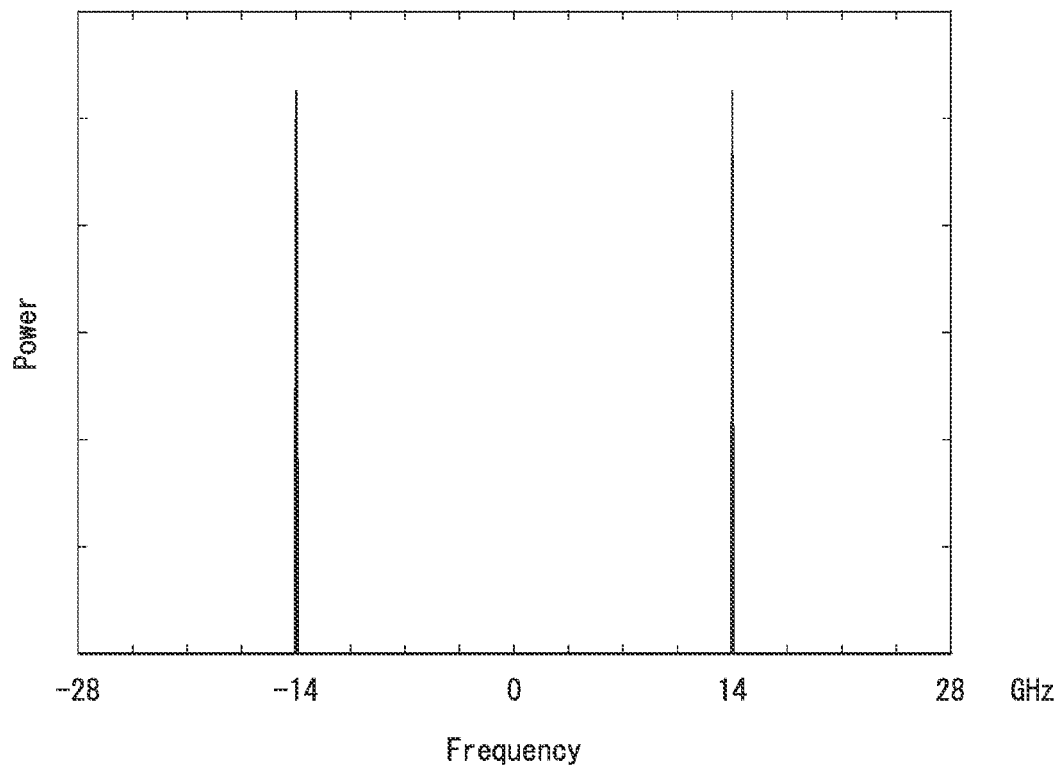
FIG. 2 is a diagram showing an example of a frequency spectrum of alternating signals in accordance with the same embodiment.

FIG. 2 shows the frequency spectrum of a specific frequency band signal when an alternating signal of (S, S) and (−S, −S) of a QPSK signal is generated from a transmission signal at 28 Gbaud. In accordance with this diagram, it can be seen that two signals with an interval of 28 GHz are formed on a high frequency side of 14 GHz and a low frequency side of −14 GHz. It is to be noted that the signal represented as negative in the frequency domain is an alias component of a signal corresponding to an electrical signal in a range of 28 to 56 GHz; however, this electrical signal is converted into a negative region with respect to a carrier frequency when the electrical signal is up-converted into an optical signal, and accordingly such notation is used in FIG. 2.

Figure 3:
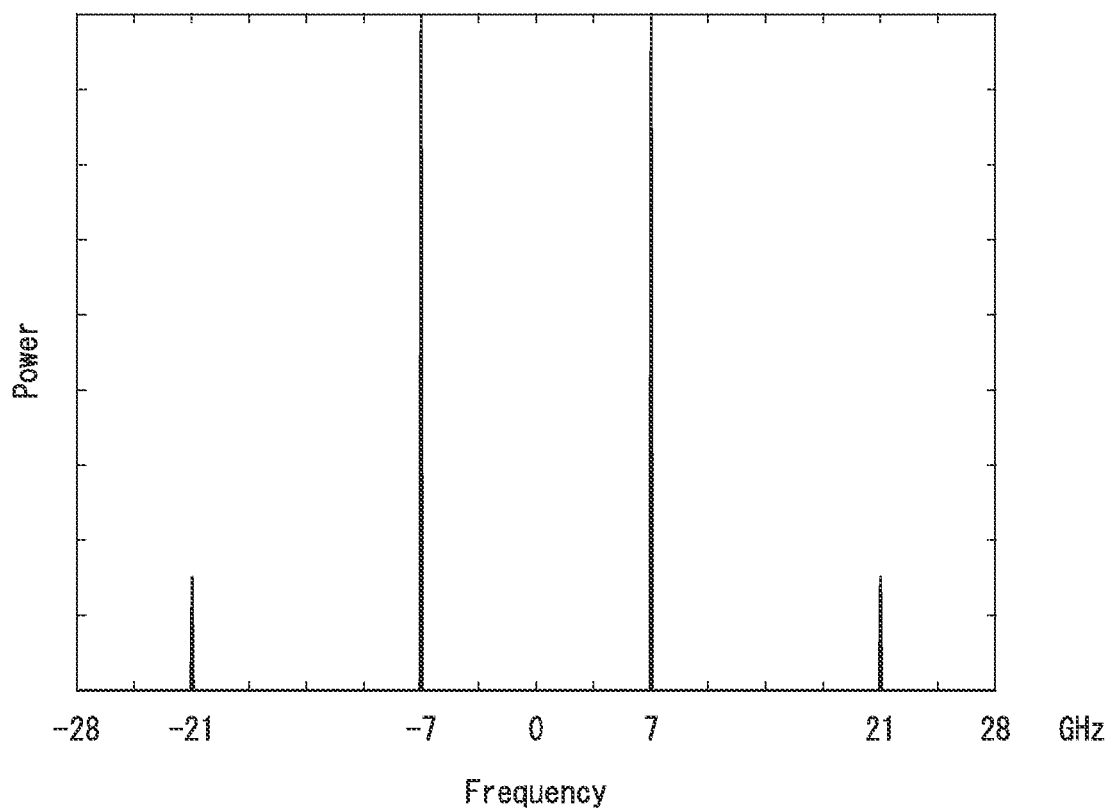
FIG. 3 is a diagram showing another example of a frequency spectrum of alternating signals in accordance with the same embodiment.

Moreover, FIG. 3 shows a frequency spectrum observed when a single signal is repeated twice under the above condition, like (S, S), (S, S), (−S, −S), (−S, −S), (S, S) . . . , (S, S), (S, S), (−S, −S), (−S, −S). In accordance with this diagram, it can be seen that a total of four spectra are formed, namely, two spectra with a high level of power on the high frequency side at 7 GHz and the low frequency side at −7 GHz, and two spectra with a low level of power on the high frequency side at 21 GHz and the low frequency side at −21 GHz.

A specific frequency band signal generated by the specific frequency band signal generating circuit 104 in such a manner is input to the signal multiplexing circuit 102, and the signal multiplexing circuit 102 multiplexes the signal in the time domain at a specific position in the transmission signal input from the transmission signal modulating circuit 101, and the electro-optical conversion circuit 103 transmits it as an optical signal.

Figure 4:
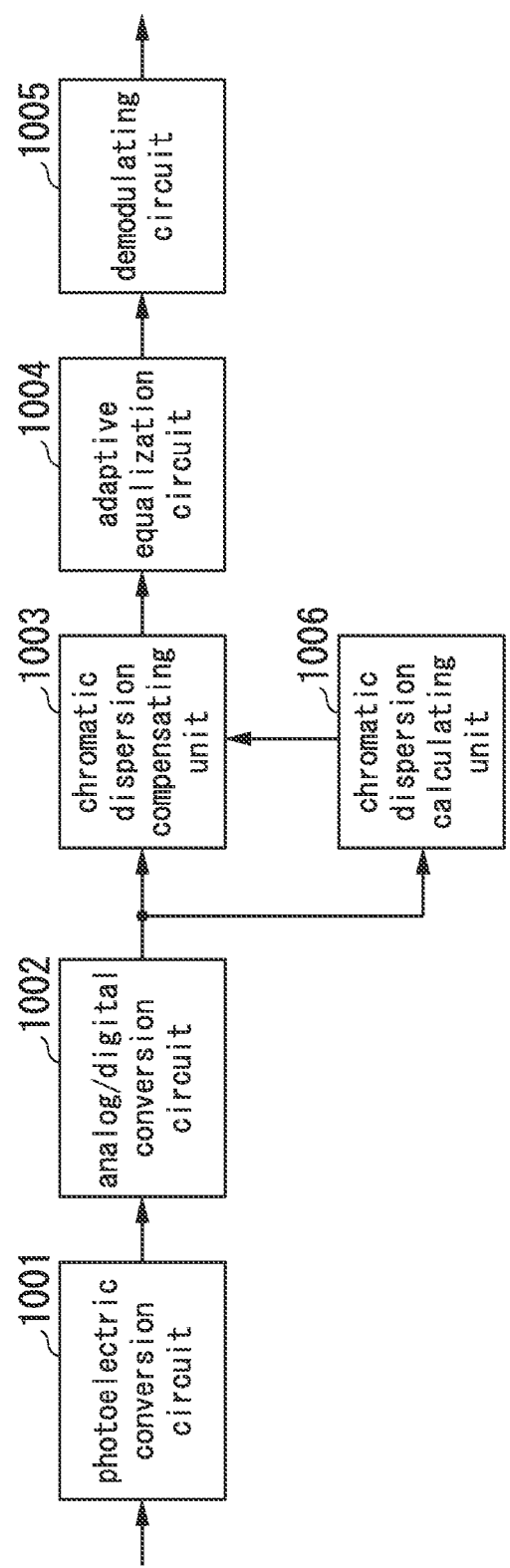
FIG. 4 is a block diagram showing the configuration of an optical signal receiving apparatus in accordance with the same embodiment.

FIG. 4 shows an example of the configuration of an optical signal receiving apparatus in accordance with the first embodiment of the present invention. In this diagram, 1001 denotes a photoelectric conversion circuit, 1002 denotes an analog/digital conversion circuit, 1003 denotes a chromatic dispersion compensating unit, 1004 denotes an adaptive equalization circuit, 1005 denotes a demodulating circuit, and 1006 denotes a chromatic dispersion calculating unit.

The photoelectric conversion circuit 1001 receives an optical signal transmitted through an optical fiber and received, converts it into an electrical signal, and outputs the result to the analog/digital conversion circuit 1002. Specifically, the photoelectric conversion circuit 1001 uses local oscillator light to separate the optical electric field of input signal light into orthogonal components, and converts the separated components into electrical analog signals. The analog/digital conversion circuit 1002 receives the electrical signal from the photoelectric conversion circuit 1001 and performs an analog/digital conversion, and outputs the received signal which has been converted into a digital signal. The output digital received signal is input to the chromatic dispersion compensating unit 1003 and the chromatic dispersion calculating unit 1006. The chromatic dispersion calculating unit 1006 receives the output result from the analog/digital conversion circuit 1002, calculates a chromatic dispersion value, and outputs the result as an output value. The chromatic dispersion compensating unit 1003 receives the digital received signal, compensates for distortion in the signal caused by chromatic dispersion based on the chromatic dispersion value calculated by the chromatic dispersion calculating unit 1006, and outputs the result thereof. The adaptive equalization circuit 1004 receives the digital received signal which has been compensated by the chromatic dispersion compensating unit 1003, compensates the signal distorted due to polarization mode dispersion, at the time of transmission/reception, or on the transmission line, and outputs the result. The demodulating circuit 1005 receives the digital received signal compensated by the adaptive equalization circuit 1004, demodulates the received signal, and outputs the demodulated result.

Figure 5:
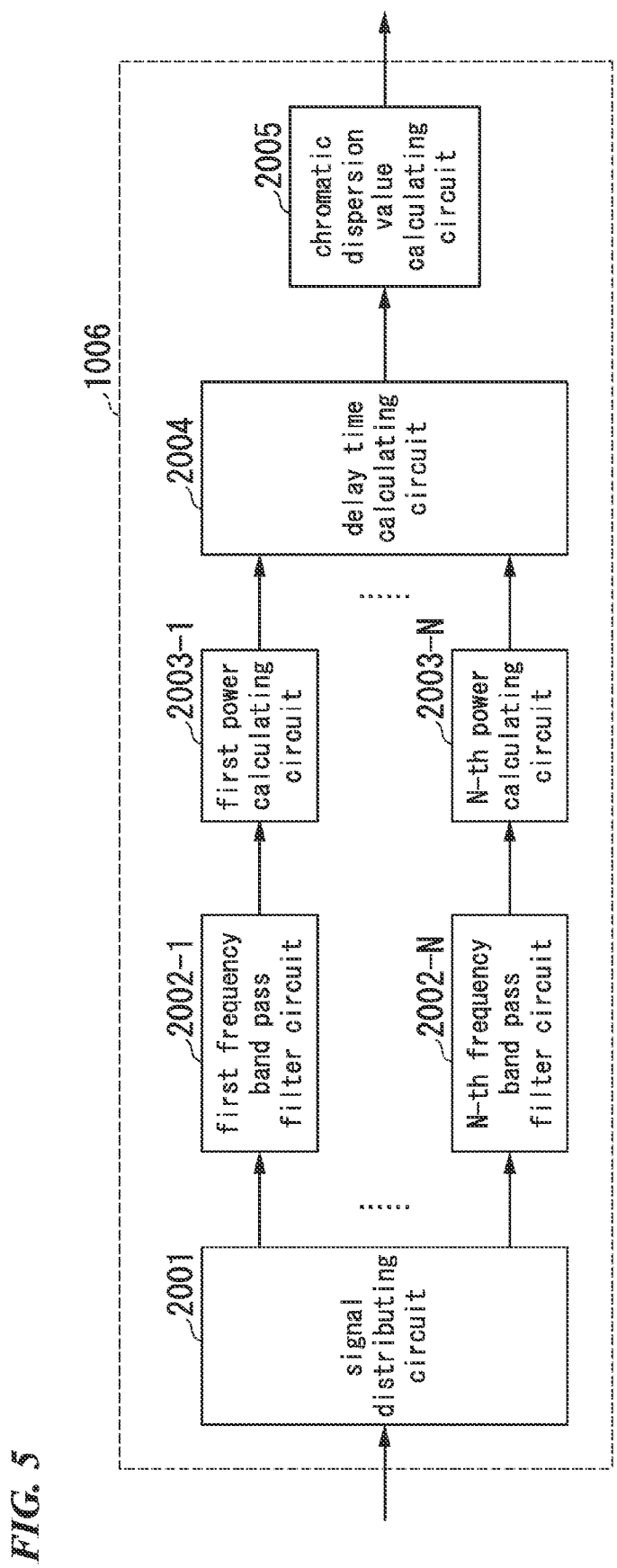
FIG. 5 is a block diagram showing the configuration of a chromatic dispersion calculating unit in accordance with the same embodiment.

FIG. 5 shows an example of the configuration of the chromatic dispersion calculating unit 1006 in accordance with the first embodiment of the present invention. In this diagram, 2001 denotes a signal distributing circuit, 2002-$n$ (1≤n≤N, N≥2) denotes an n-th frequency band pass filter circuit, 2003-$n$ (1≤n≤N, N≥2) denotes an n-th power calculating circuit, 2004 denotes a delay time calculating circuit, and 2005 denotes a chromatic dispersion value calculating circuit.

The signal distributing circuit 2001 receives the output result from the analog/digital conversion circuit 1002, and branches it into the same N sequences. Each of the branched N sequences is output to the n-th (1≤n≤N, N≥2) frequency band pass filter circuit 2002-$n$. Each of the n-th (1≤n≤N, N≥2) frequency band pass filter circuit 2002-$n$ uses a filter to allow only received signals of a specific frequency in each input sequence to pass. Filters of the n-th (1≤n≤N, N≥2) frequency band pass filter circuits 2002-*n* allow to pass signals of different frequency bands for respective sequences, and band pass filters are set so as to include part or all of the specific frequency band signal multiplexed by the optical signal transmitting apparatus. The n-th (1≤n≤N, N≥2) power calculating circuit 2003-*n* calculates power values for respective samples with respect to the output sequence of the n-th (1≤n≤N, N≥2) frequency band pass filter circuit 2002-*n*, and outputs a power value sequence of the samples. The delay time calculating circuit 2004 detects sample times $T_n$ at which the maximum values (peak values) of power are obtained from the sequences output from the N n-th power calculating circuits 2003-*n* (1≤n≤N, N≥2), and calculates the time difference between the peak values. The chromatic dispersion value calculating circuit 2005 calculates a chromatic dispersion value from the time difference (delay time) calculated by the delay time calculating circuit 2004, and outputs the result.

Here, N denotes the number of frequency spectra of the specific frequency band signal transmitted from the optical signal transmitting apparatus. For example, when signals are present in two specific frequency bands as shown in FIG. 2, N can be calculated as N=2, and when signals are present in four specific frequency bands as shown in FIG. 3, N can be calculated as N=4. However, N is not limited to the above as long as N is greater than or equal to 2.

A chromatic dispersion value D can be calculated as illustrated with the following (Equation 1), using the time difference $\tau_{k-h}$ between time $T_k$ at the peak value of the k-th power calculating circuit 2003-*k* and time $T_h$ at the peak value of the h-th power calculating circuit 2003-*h* (1≤h≤N, 1≤k≤N, h≠k).

[Equation 1]

$$D = \frac{c\tau_{k-h}}{\lambda^2 B_{k-h}} = \frac{c(T_k - T_h)}{\lambda^2 B_{k-h}} \quad \text{(Equation 1)}$$

Here, c represents the speed of light, λ represents the center wavelength of the transmission signal, and $B_{k-h}$ represents the bandwidth between the center frequency of the k-th frequency band pass filter circuit 2002-*k* and the center frequency of the h-th frequency band pass filter circuit 2002-*h*. Here, it is assumed that the h-th frequency band pass filter circuit 2002-*h* is a pass filter having a frequency band higher than that of the k-th frequency band pass filter circuit 2002-*k*.

The chromatic dispersion value calculating circuit 2005 can calculate one up to N (N−1)/2 chromatic dispersion values using N sequences input from the N n-th power calculating circuits 2003-*n* (1≤n≤N, N≥2), and outputs a value selected from these chromatic dispersion values or the average of these calculated chromatic dispersion values as an output value D' to the chromatic dispersion compensating unit 1003. It is to be noted that in reality, the chromatic dispersion value to be output may be a value of (Equation 1) without $\lambda^2$ (that is, it does not have to be divided by $\lambda^2$). This is because, as described later, $\lambda^2$ will be canceled out and lost in (Equation 1) as it will be multiplied by $\lambda^2$ when substituting an estimated chromatic dispersion value for a weight W (ω) of each frequency ω used in the chromatic dispersion compensating unit 1003. That is to say, in reality, it is possible to calculate a chromatic dispersion compensation weight regardless of $\lambda^2$.

Here, as an example, a receiving operation when an alternating signal shown in FIG. 2 is time-division multiplexed with a transmission signal will be described with reference to FIG. 5.

Figure 6:
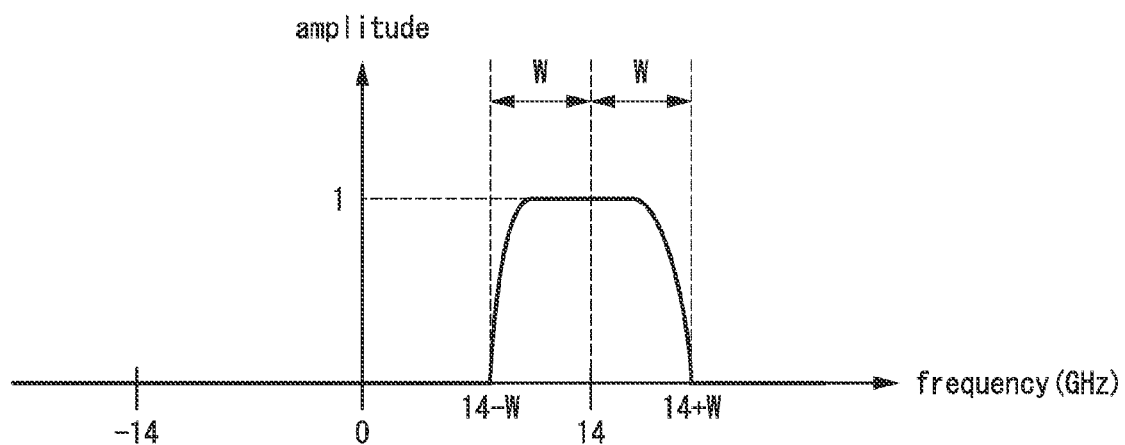
FIG. 6 is a diagram showing an example of a band pass filter in a first frequency band pass filter circuit in accordance with the same embodiment.
Figure 7:
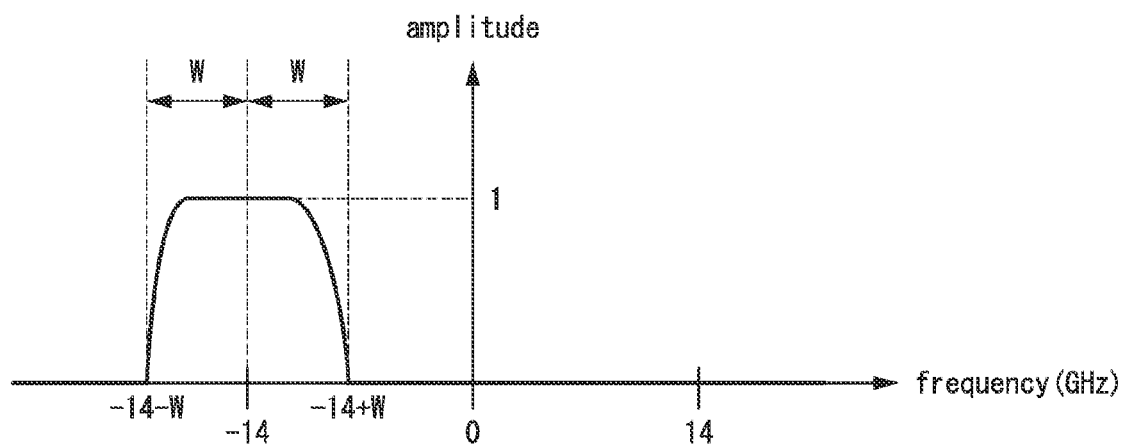
FIG. 7 is a diagram showing an example of a band pass filter in a second frequency band pass filter circuit in accordance with the same embodiment.

In this diagram, first, a digital received signal received by a receiver (not shown in the diagram) in the optical signal receiving apparatus is distributed into two sequences by the signal distributing circuit 2001. Next, in order to obtain a 14 GHz signal on the high frequency side, as shown in FIG. 6, the first frequency band pass filter circuit 2002-1 limits the band using a band pass filter of a bandwidth 2W, the passing band of which is (14−W) GHz to (14+W) GHz, and outputs the result thereof. Similarly, in order to obtain a −14 GHz signal on the low frequency side, as shown in FIG. 7, the second frequency band pass filter circuit 2002-2 limits the band using a band pass filter of a bandwidth 2W, the passing band of which is (−14−W) GHz to (−14+W) GHz, and outputs the result thereof.

Here, W is an arbitrary value greater than 0. By increasing W, the operation can still be performed even if the received specific frequency signal is shifted from the center frequency due to a frequency offset, a phase offset, or the like. Conversely, estimation accuracy can be improved by decreasing W because components other than the specific frequency band signal such as noise and interference components can be reduced.

The first power calculating circuit 2003-1 calculates the power value for each sample with respect to the signal sequence of the output result from the first frequency band pass filter circuit 2002-1, and outputs the result thereof to the delay time calculating circuit 2004. Here, when the input signal at an m sample time of the first power calculating circuit 2003-1 is a(m), the output value is $|a(m)|^2$. Here, |x| shows the absolute value of a complex number x.

Similarly, the second power calculating circuit 2003-2 calculates the power value for each sample with respect to the signal sequence of the output result from the second frequency band pass filter circuit 2002-2, and outputs the result thereof to the delay time calculating circuit 2004.

Figure 8:
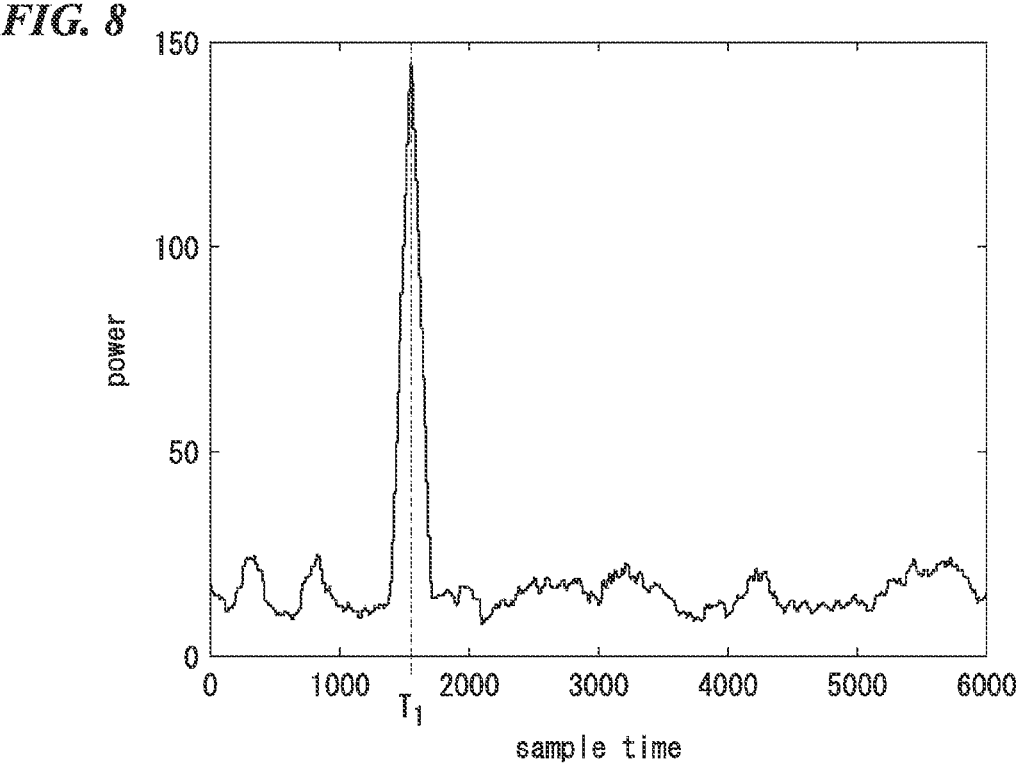
FIG. 8 is a diagram showing output results of the first frequency band pass filter circuit in accordance with the same embodiment.
Figure 9:
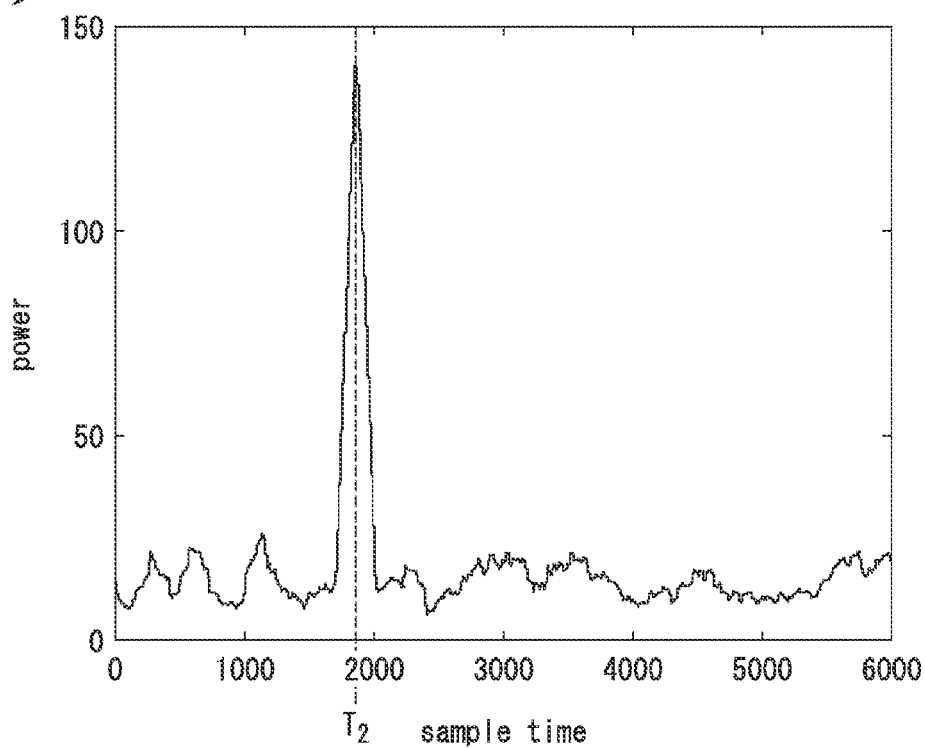
FIG. 9 is a diagram showing output results of the second frequency band pass filter circuit in accordance with the same embodiment.

The delay time calculating circuit 2004 receives the sequences output from the first power calculating circuit 2003-1 and the second power calculating circuit 2003-2, calculates sample times $T_1$ and $T_2$, at which the maximum value is obtained in each sequence, as shown in FIG. 8 and FIG. 9, calculates the time difference $\tau_{2-1} = T_2 - T_1$ therebetween, and outputs the result $\tau_{2-1}$ to the chromatic dispersion value calculating circuit 2005.

The chromatic dispersion value calculating circuit 2005 receives the delay time $\tau_{2-1}$ as an input value, and calculates a chromatic dispersion value D using the following (Equation 2).

[Equation 2]

$$D = \frac{c\tau_{2-1}}{\lambda^2 B_{2-1}} \quad \text{(Equation 2)}$$

The chromatic dispersion value calculating circuit 2005 calculates the chromatic dispersion value using (Equation 2), and outputs the result thereof as an output value D. In the manner described above, a chromatic dispersion value can be calculated using specific frequency band signals.

It is to be noted that the optical signal receiving apparatus described above outputs the chromatic dispersion value D as an output value; however, with use of a chromatic dispersion value calculated with (Equation 3), the weight W (ω) of each frequency for compensation in the chromatic dispersion compensating unit 1003 may be calculated, and the result thereof may be output as an output value.

[Equation 3]

$$W(\omega) = \exp\left(-j\frac{\lambda^2}{2\pi c}D'\omega^2\right) \quad \text{(Equation 3)}$$

As the band pass filter of the n-th frequency band pass filter circuit 2002-$n$ mentioned above, a generic band pass filter such as rectangular filer, a Nyquist filter, a Hanning window, a Kaiser window, and a Hamming window can be used.

The n-th power calculating circuit 2003-$n$ mentioned above outputs the power value $|a(m)|^2$ of the input signal $a(m)$; however, it may output a total value $a'(m')$ of consecutive Q samples of power of the input values. The total value $a'(m')$ is shown by the following (Equation 4).

[Equation 4]

$$a'(m') = \sum_{m=m'}^{m'+Q-1} |a(m)|^2 \quad \text{(Equation 4)}$$

By outputting the above total value, it is possible to reduce the estimation error caused by the noise and interference components. Moreover, it is also possible to increase the level of accuracy by calculating an expected value using power and time in the vicinity of the maximum value.

The delay time calculating circuit 2004 mentioned above uses a sample time at which power takes the maximum value; however, an arbitrary threshold value may be set, and the time at which this threshold value is exceeded, the time at which the power falls below the threshold value after exceeding the threshold value, or both of these times may be used. In this case, there is a method such that time positions where X % of the peak is observed are compared between a high frequency component and a low frequency component, and the time difference therebetween is measured.

Moreover, the signal component that passes through the band pass filter also includes signals other than alternating signals, interference components, and noise components. This is because a data signal includes a component within the passing band of the band pass filter, and optical noise includes a component within the passing band of the band pass filter. Therefore, a noise floor in a region where there is no peak value (a region of a data signal) and a peak may be detected, and with the noise floor taken as a reference, the time position where it rises to X % of the peak and the time position where it falls to X % of the peak for a high frequency component may be compared with that for a low frequency component, to thereby detect a delay time.

Furthermore, the delay time calculating circuit 2004 calculates a delay time between the maximum values; however, a plurality of peak values occur when a plurality of specific frequency band signal are repeatedly transmitted at constant time intervals (frame periods) $T_p$. As a result, there is a possibility that the maximum value of another frame is detected and a value greater than the delay time to be obtained essentially is calculated. In this case, errors can be eliminated by detecting time $T_n$ where the maximum value is observed within the constant time $T_p$, or by performing calculation under a condition such that the delay time difference τ is smaller than an arbitrary time difference $T_{max}$. Here, $T_{max}$ may be set to, for example, the maximum delay time difference calculated from the maximum chromatic dispersion value that can be calculated.

Moreover, the delay time calculating circuit 2004 may use a plurality of received signals including specific frequency band signals, calculate a plurality of delay times, and output the average value thereof as an output value. By doing so, noise and interference components can be reduced, and the level of accuracy is improved. Furthermore, it is possible to calculate the delay time by calculating an expected value of the time where a peak value occurs, using both power values and time values.

Second Embodiment

Figure 10:
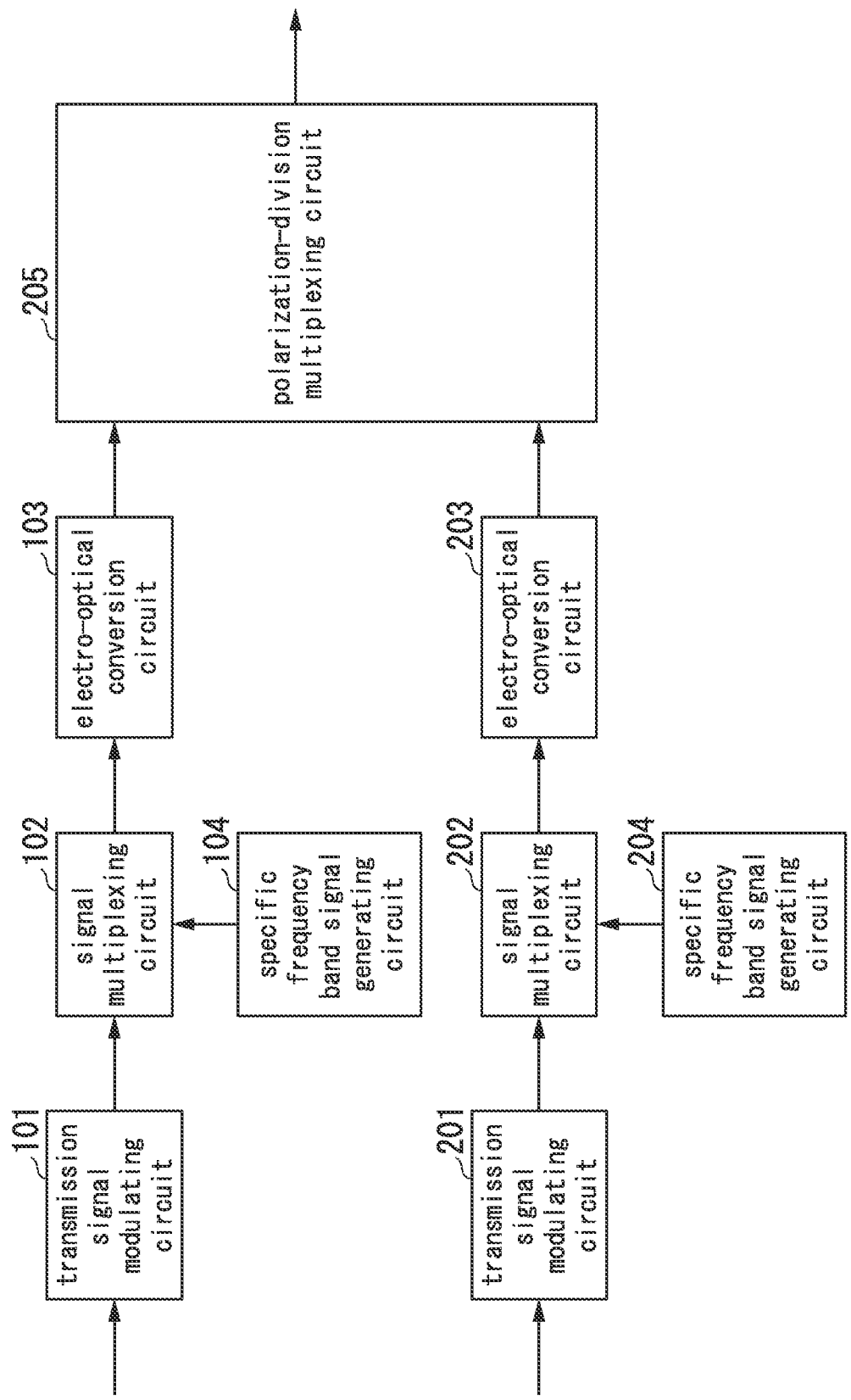
FIG. 10 is a block diagram showing the configuration of an optical signal transmitting apparatus in accordance with a second embodiment of the present invention.

FIG. 10 shows an example of the configuration of an optical signal transmitting apparatus in accordance with a second embodiment of the present invention. This diagram differs from the optical signal transmitting apparatus in accordance with the first embodiment in that a transmission signal modulating circuit 201, a signal multiplexing circuit 202, an electro-optical conversion circuit 203, a specific frequency band signal generating circuit 204, and a polarization-division multiplexing circuit 205 are added for polarization-division multiplexing.

The transmission signal modulating circuit 201, the signal multiplexing circuit 202, the electro-optical conversion circuit 203, and the specific frequency band signal generating circuit 204 respectively perform operations similar to those in the transmission signal modulating circuit 101, the signal multiplexing circuit 102, the electro-optical conversion circuit 103, and the specific frequency band signal generating circuit 104, and optical transmission signals are generated using data signal sequences to be polarization-division multiplexed. However, the specific frequency band signal generating circuits 104 and 204 may be shared between polarized waves. Moreover, the specific frequency band signal generating circuits 104 and 204 may generate and transmit different signals for the polarized waves, or the same signals may be multiplexed. When multiplexing the same specific frequency band signals, a single specific frequency band signal generating circuit may be shared instead of providing the specific frequency band signal generating circuits 104 and 204. By the sharing, the optical signal transmitting apparatus transmits the same specific frequency band signals with two orthogonal polarized waves, and the optical receiving apparatus can calculate a chromatic dispersion value even for signals which do not undergo polarization splitting.

Figure 11:
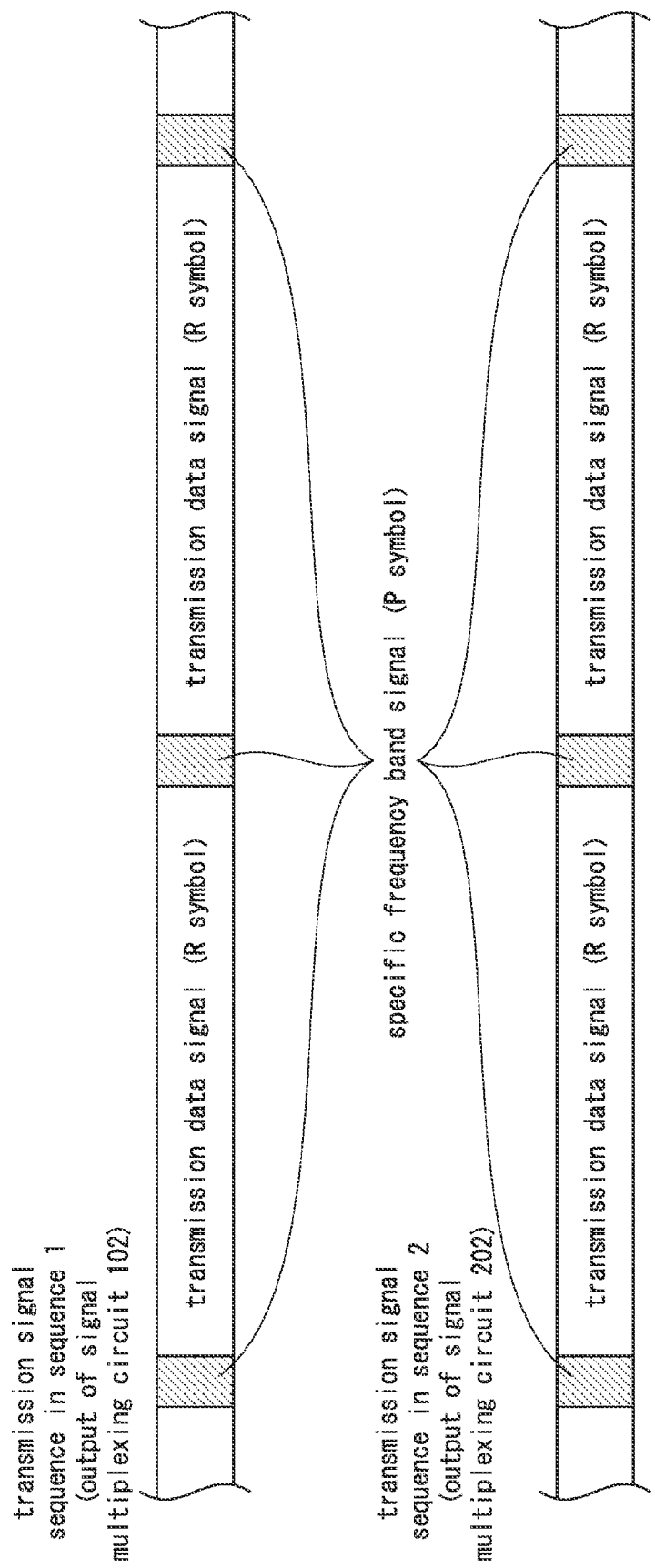
FIG. 11 is a diagram showing a frame format of a transmission signal in accordance with the same embodiment.

As an example, FIG. 11 shows a frame format at the time of multiplexing the same specific frequency band signals with data signals in the time domain, and transmitting them. As shown in the diagram, with respect to each of two sequences, a specific frequency band signal (e.g., an alternating signal) of P symbols is inserted for each transmission data signal of R symbols. The specific frequency band signals may all use the same sequence, or they may be different for respective sequences.

The generated signals to be transmitted with two polarized waves are polarization-division multiplexed by the polarization-division multiplexing circuit 205, and the multiplexed signal is transmitted as a transmission signal.

Figure 12:
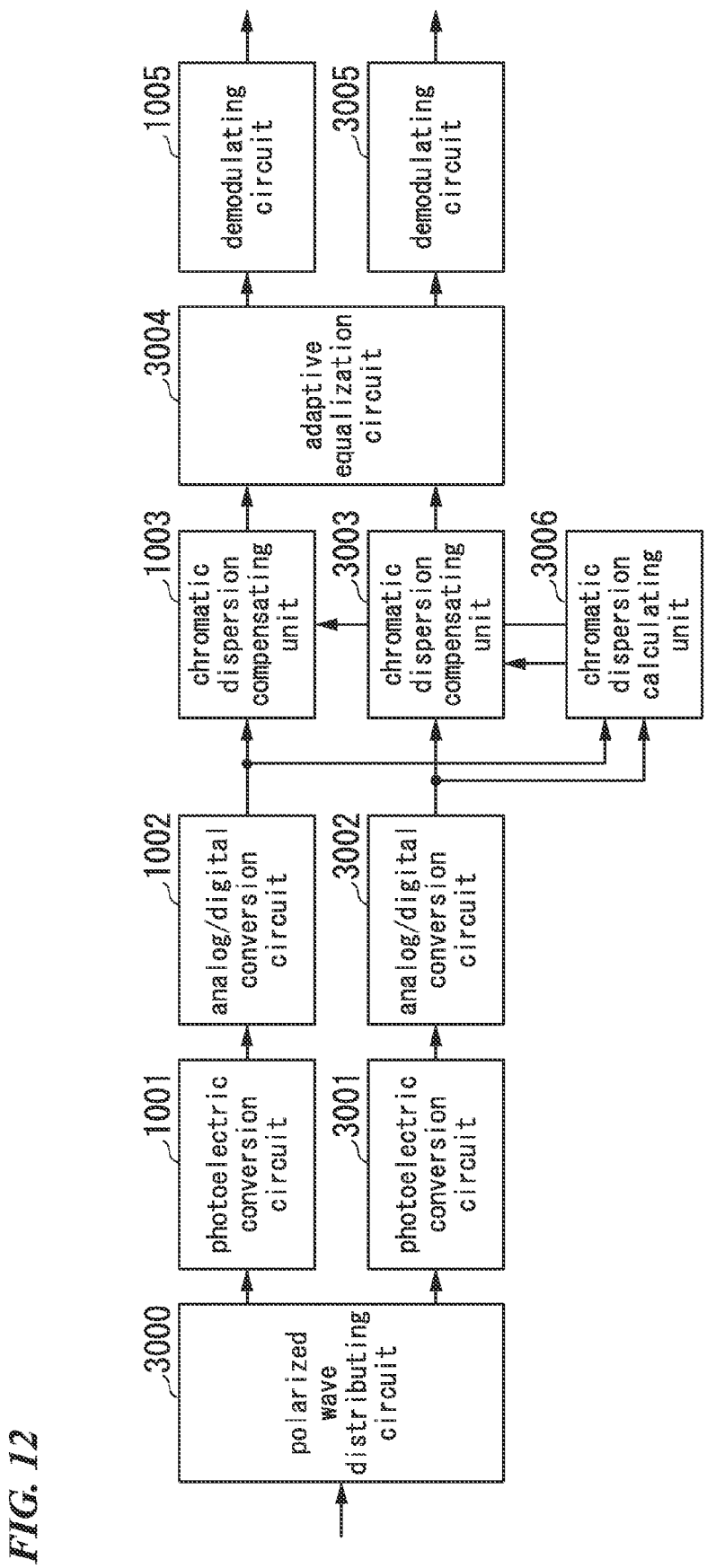
FIG. 12 is a block diagram showing the configuration of an optical signal receiving apparatus in accordance with the same embodiment.

FIG. 12 shows an example of the configuration of an optical signal receiving apparatus in accordance with the second embodiment of the present invention. This diagram differs from the optical signal receiving apparatus in accordance with the first embodiment in that there are further provided a polarized wave distributing circuit 3000, a photoelectric conversion circuit 3001, an analog/digital conversion circuit 3002, a chromatic dispersion compensating unit 3003, and a demodulating circuit 3005, and a chromatic dispersion calculating unit 3006 is provided instead of the chromatic dispersion calculating unit 1006, and an adaptive equalization circuit 3004 is provided instead of the adaptive equalization circuit 1004.

The polarized wave distributing circuit 3000 performs polarized wave distribution in an optical domain on a received optical signal, and outputs the distributed polarized waves to the photoelectric conversion circuits 1001 and 3001. By providing, for example, a polarization-diversity 90 degree hybrid coupler and a local oscillator light source as the polarized wave distributing circuit 3000, the received optical signal can be distributed into two orthogonal polarized waves. Here, in order to simplify the description, it is assumed that the two orthogonal polarized waves are respectively called an X polarized wave and a Y polarized wave, and the X polarized wave is output to the photoelectric conversion circuit 1001 and the Y polarized wave is output to the photoelectric conversion circuit 3001.

The photoelectric conversion circuit 3001 and the analog/digital conversion circuit 3002 respectively operate in a manner similar to the photoelectric conversion circuit 1001 and the analog/digital conversion circuit 1002. That is to say, the photoelectric conversion circuit 3001 performs photoelectric conversion, and the analog/digital conversion circuit 3002 performs analog/digital conversion and outputs a digital received signal. The chromatic dispersion calculating unit 3006 receives the output results from the analog/digital conversion circuits 1002 and 3002, calculates a chromatic dispersion value, and outputs the result thereof to the chromatic dispersion compensating units 1003 and 3003.

The chromatic dispersion compensating units 1003 and 3003 respectively receive the output signals from the analog/digital conversion circuits 1002 and 3002 as input signals, and perform chromatic dispersion compensation based on the chromatic dispersion value calculated by the chromatic dispersion calculating unit 3006. The adaptive equalization circuit 3004 receives the output signals from the chromatic dispersion compensating units 1003 and 3003, performs adaptive equalization to compensate signals distorted due to polarization mode dispersion, at the time of transmission/reception, or on the transmission line, performs polarization splitting to separate two signal sequences multiplexed on the transmitting side, and outputs the result. The demodulating circuits 1005 and 3005 respectively demodulate the two multiplexed polarized waves.

Figure 13:
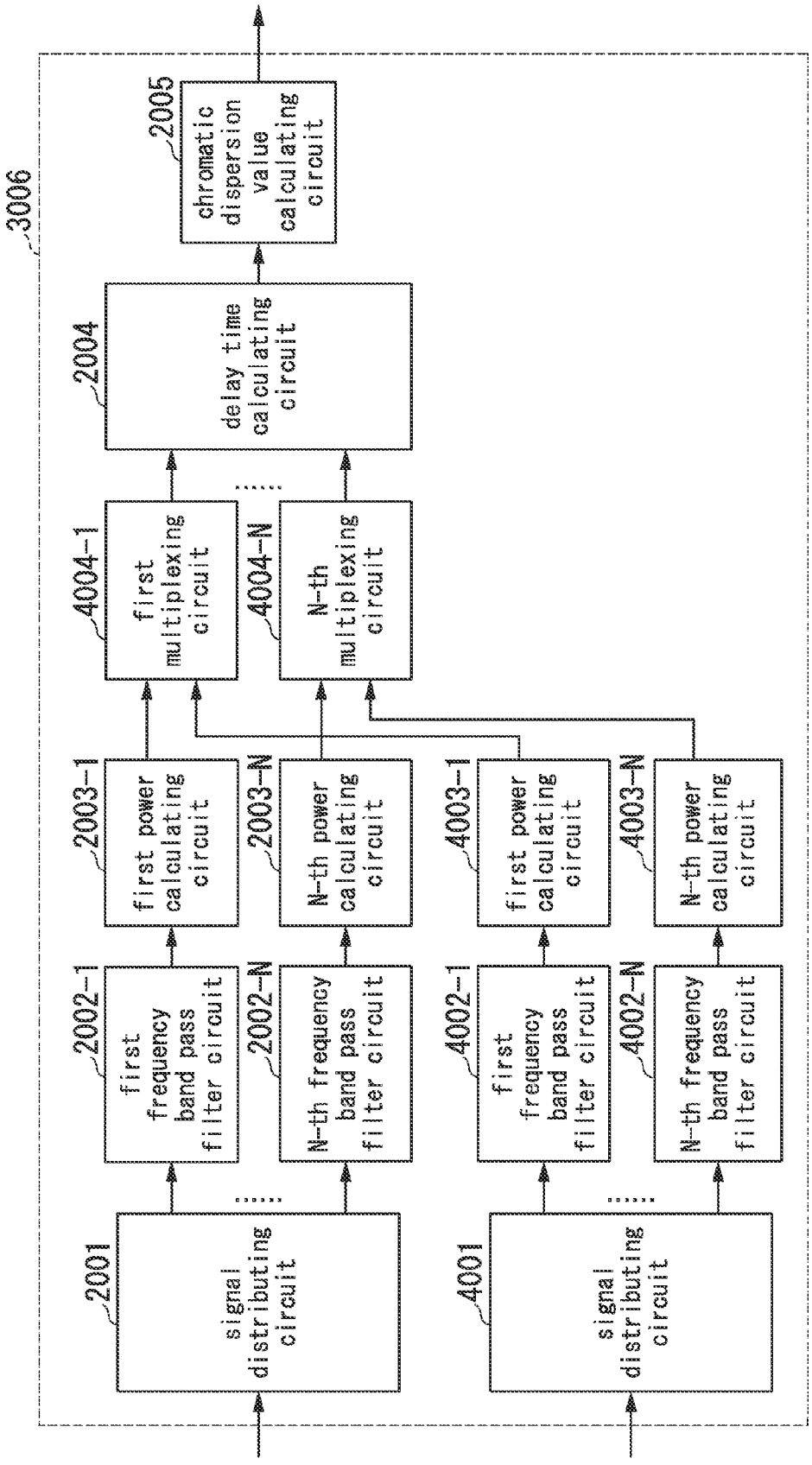
FIG. 13 is a block diagram showing the configuration of a chromatic dispersion calculating unit in accordance with the same embodiment.

FIG. 13 shows an example of the configuration of the chromatic dispersion calculating unit 3006 in accordance with the second embodiment. This diagram differs from the chromatic dispersion calculating unit 1006 in accordance with the first embodiment in that there are further provided a signal distributing circuit 4001, n-th frequency band pass filter circuits 4002-$n$ (1≤n≤N, N≥2), n-th power calculating circuits 4003-$n$ (1≤n≤N, N≥2), and n-th multiplexing circuits 4004-$n$ (1≤n≤N, N≥2).

The signal distributing circuits 2001 and 4001 respectively receive the X polarized wave and the Y polarized wave of the analog/digital conversion circuits 1002 and 3002 as input signals, distribute the input signals into N sequences, and output the results thereof. With respect to the X polarized wave, the n-th frequency band pass filter circuit 2002-$n$ (1≤n≤N, N≥2) allows specific frequency signals to pass using a similar frequency band pass filter, and outputs the result thereof. With respect to the Y polarized wave, the n-th frequency band pass filter circuit 4002-$n$ (1≤n≤N, N≥2) allows specific frequency signals to pass using a similar frequency band pass filter, and outputs the result thereof. With respect to the X polarized wave sequence, the n-th power calculating circuit 2003-$n$ (1≤n≤N, N≥2) calculates a power value for each sample, and outputs the result thereof to the n-th multiplexing circuit 4004-$n$ (1≤n≤N, N≥2). With respect to the Y polarized wave sequence, the n-th power calculating circuit 4003-$n$ (1≤n≤N, N≥2) calculates a power value for each sample, and outputs the result thereof to the n-th multiplexing circuit 4004-$n$ (1≤n≤N, N≥2).

The n-th multiplexing circuit 4004-$n$ performs synthesis on the signal sequences of the power values of the X polarized wave and the Y polarized wave output from the n-th power calculating circuits 2003-$n$ and 4003-$n$, and outputs the result thereof. For example, when the m-th (m is a time-series index) input of the n-th multiplexing circuit 4004-$n$ is $x_n(m)$ and $y_n(m)$, the output is $ax_n(m)+by_n(m)$. Here, a and b are arbitrary real numbers greater than 0, and it is possible to change the ratio of multiplexing the power values of the X polarized wave and the Y polarized wave output from the n-th power calculating circuits 2003-$n$ and 4003-$n$ by changing a and b in accordance with information such as noise and interference. Moreover, since it may be considered that there is a delay difference between the X polarized wave and the Y polarized wave due to the influence on the transmission line and in the circuits, multiplexing may be performed after shifting it by q (q is an integer) samples. In this case, the output value is $ax_n(m)+by_n(m-q)$. As a method for determining q, the optical signal receiving apparatus may be separately provided with a timing detecting circuit and a skew adjusting circuit, and q may be determined from the timing difference calculated therein. Alternatively, q may be adjusted so that the output values of the n-th power calculating circuits 2003-$n$ and 4003-$n$ exceed a threshold value or become maximum at the same time in a certain constant section.

N sequences multiplexed by the n-th multiplexing circuits 4004-$n$ (1≤n≤N, N≥2) are input to the delay time calculating circuit 2004 as input values. The delay time calculating circuit 2004 detects sample times $T_n$ at which the maximum values (peak values) of the power are obtained from the sequences output from the N n-th multiplexing circuits 4004-1 to 4004-N (1≤n≤N, N≥2), and calculates the time difference between the peak values. The chromatic dispersion value calculating circuit 2005 calculates a chromatic dispersion value from the delay time calculated by the delay time calculating circuit 2004, and outputs the result thereof.

In the optical signal transmitting apparatus, the optical signal receiving apparatus, and the chromatic dispersion calculating unit 3006 in the second embodiment, it is presumed that two polarized waves are multiplexed and transmitted; however, it is also possible to multiplex and transmit three or more transmission signal sequences. In this case, it is sufficient that the optical signal transmitting apparatus is provided with transmission signal modulating circuits, signal multiplexing circuits, electro-optical conversion circuits, and specific frequency band signal generating circuits for sequences to be multiplexed, and the polarization-division multiplexing circuit multiplexes and transmits three or more optical transmission signals. Furthermore, as for the optical signal receiving apparatus, the polarized wave distributing circuit distributes a received optical signal into three or more sequences, and the optical signal receiving apparatus is provided with three or more photoelectric conversion circuits, analog/digital conversion circuits, chromatic dispersion compensating units, and demodulating circuits in accordance with the number of distributed sequences. The adaptive equalization circuit performs adaptive equalization for outputting signals of the number of sequences multiplexed in the optical signal transmitting apparatus, based on the input of signals of the number of sequences distributed in the polarized wave distributing circuit. The chromatic dispersion calculating unit calculates chromatic dispersion based on the input of the number of sequences distributed in the polarized wave distributing circuit, and outputs the calculated result to the respective chromatic dispersion compensating units. It is to be noted that the number of multiplexing of transmission signals in the optical signal transmitting apparatus (or the number of signals multiplexed by the polarization-division multiplexing circuit) does not always have to equal the number of distributions of the polarized wave distributing circuit in the optical signal receiving apparatus.

Moreover, the optical signal transmitting apparatus, the optical signal receiving apparatus, and the chromatic dispersion calculating unit 3006 in accordance with the second embodiment presume that two polarized waves are multiplexed and transmitted; however, it is also possible to transmit signals without performing polarization-division multiplexing. In this case, it is sufficient that the optical signal transmitting apparatus is provided with transmission signal modulating circuits, signal multiplexing circuits, electro-optical conversion circuits, and specific frequency band signal generating circuits for sequences to be multiplexed, and signals are transmitted without having the polarization-division multiplexing circuit provided. Furthermore, as for the optical signal receiving apparatus, an optical signal received by the polarized wave distributing circuit is distributed into two or more sequences, and the optical signal receiving apparatus is provided with two or more photoelectric conversion circuits, analog/digital conversion circuits, chromatic dispersion compensating units, and demodulating circuits in accordance with the number of distributed sequences. The adaptive equalization circuit performs adaptive equalization based on the inputs from the chromatic dispersion compensating units for the number of sequences distributed in the polarized wave distributing circuit. Since a transmitted signal is not polarization-division multiplexed, the adaptive equalization circuit needs to demodulate only signals of one sequence, and the output is one sequence. Moreover, the chromatic dispersion calculating unit calculates chromatic dispersion based on the inputs from the analog/digital conversion circuits for the number of sequences distributed in the polarized wave distributing circuit, and the calculated result is output to the chromatic dispersion compensating units of respective sequences.

Third Embodiment

Next, an optical signal receiving apparatus of a third embodiment will be described. In the optical signal receiving apparatus in accordance with the third embodiment, the chromatic dispersion calculating unit 3006 of the optical signal receiving apparatus shown in FIG. 12 has a configuration shown in FIG. 14 instead of the configuration shown in FIG. 13.

Figure 14:
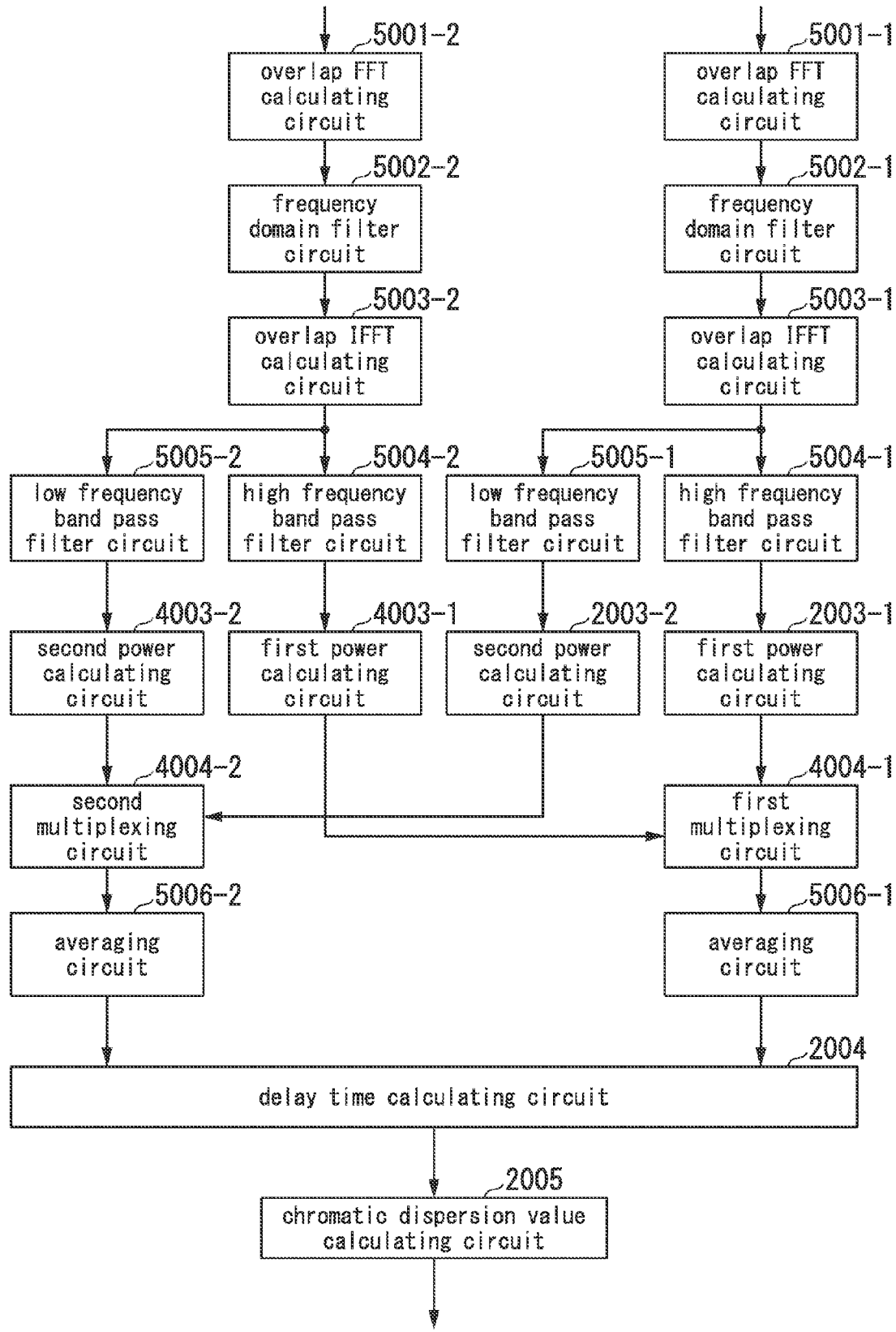
FIG. 14 is a block diagram showing the configuration of a chromatic dispersion calculating unit in an optical signal receiving apparatus in accordance with a third embodiment of the present invention.

FIG. 14 shows an example of the configuration of the chromatic dispersion calculating unit 3006 when the same alternating signals shown in FIG. 2 for two polarized waves are used as specific frequency band signals, and they are time-division multiplexed and transmitted. Signal light including the alternating signals shown in FIG. 2 are coherent-received, and the X polarized wave and the Y polarized wave are respectively input to overlap FFT (fast Fourier transform) calculating circuits 5001-1 and 5001-2 shown in FIG. 14. The overlap FFT calculating circuits 5001-1 and 5001-2 perform FFT while overlapping FFT windows to convert the X polarized wave and the Y polarized wave respectively into a frequency domain, and output the results. A method for performing FFT while overlapping is disclosed in (Reference Document 1) R. Kudo, T. Kobayashi, K. Ishihara, Y. Takatori, A. Sano, E. Yamada, H. Masuda, Y. Miyamoto, and M. Mizoguchi, "Single carrier transmission with two-stage overlap frequency domain equalisation for long-haul optical systems," Electronics Letters, vol. 45, issue 3, pp. 180-182, January 2009.

Figure 15:
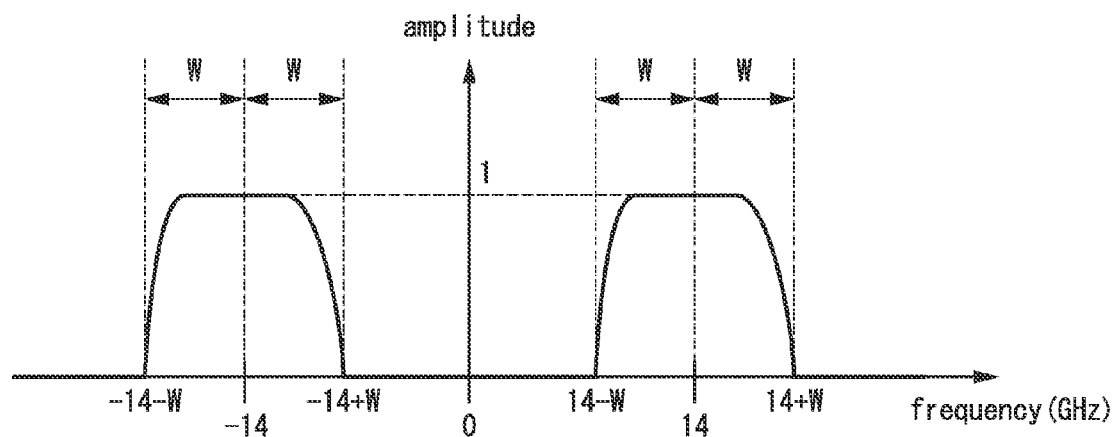
FIG. 15 is a diagram showing an example of a band pass filter in a frequency domain filter circuit in accordance with the same embodiment.

In frequency domain filter circuits 5002-1 and 5002-2, the X polarized wave and the Y polarized wave are respectively multiplied by filters which pass only the specific frequency band signals and signals in the vicinity thereof, using band pass filters. FIG. 15 shows an example thereof. As shown in this diagram, band limitation is performed using band pass filters, the passing bands of which are (−14−W) GHz to (−14+W) GHz and (14−W) GHz to (14+W) GHz, and the result thereof is output. With this type of filter circuit, it is possible to form filters which allow only the alternating signals of FIG. 2 and signals in the vicinity thereof to pass, and remove interference and noise components of the other bands.

Signals the bands of which have been limited by the frequency domain filter circuits 5002-1 and 5002-2 are respectively output to overlap IFFT (inverse FFT) calculating circuits 5003-1 and 5003-2. The overlap IFFT calculating circuits 5003-1 and 5003-2 perform IFFT while overlapping to obtain signal sequences in the time domain.

It is to be noted that the chromatic dispersion compensating filter assumed for frequency domain equalization is used as an example because schemes for compensating for dispersion in a frequency domain have the benefit of reducing the amount of calculation when compensating for a large dispersion value; however, it is similarly possible to set the passing band of the filter using a chromatic dispersion compensating filter that performs equalization in the time domain.

Moreover, when chromatic dispersion is compensated for by means of digital signal processing, an equalizer for chromatic dispersion compensation should be provided. Therefore, the above example uses this equalizer as a filter which allows only alternating signals to pass selectively. As a result, it becomes possible to share the chromatic dispersion calculating unit and the equalizer circuit of the chromatic dispersion compensating unit, and thus circuit size can be made small when actually fabricating the circuits, and it also has an advantageous effect of reducing power consumption. However, when there is circuit space for separately preparing a band pass filter portion for chromatic dispersion estimation, by having chromatic dispersion calculating units in parallel, it is possible to calculate dispersion even in a situation where the apparatus is in operation and the chromatic dispersion compensating circuit is operating.

Needless to say, the optical signal receiving apparatus of the third embodiment may be used only for chromatic dispersion calculation. In this case, the apparatus can be operated by replacing the chromatic dispersion calculating circuit shown in FIG. 14 with a new chromatic dispersion calculating unit. Inputs of the overlap FFT calculating circuits 5001-1 and 5001-2 in this new chromatic dispersion calculating unit are the outputs of the analog/digital conversion circuits 1002 and 3002. Moreover, in this case, it is possible to operate the apparatus by detecting a time section where a specific frequency band signal is present in a received signal sequence, and performing FFT and IFFT of a FFT window size greater than the time section. In this case, the overlap FFT calculating circuits 5001-1, 5001-2 and the overlap IFFT calculating circuits 5003-1, 5003-2 do not require FFT and IFFT to be operated while overlapping. Accordingly, it is possible to reduce the amount of calculation.

Next, high frequency band pass filter circuits 5004-1 and 5004-2 separates only high frequency components from the signal sequence having only signal components of only two frequency bands shown in FIG. 15 as a result of the band limitation in the frequency domain filter circuits 5002-1 and 5002-2. Similarly, low frequency band pass filter circuits 5005-1 and 5005-2 separates only low frequency components from the signal sequences having only signal components of only two frequency bands shown in FIG. 15 as a result of the band limitation in the frequency domain filter circuits 5002-1 and 5002-2.

Figure 16:
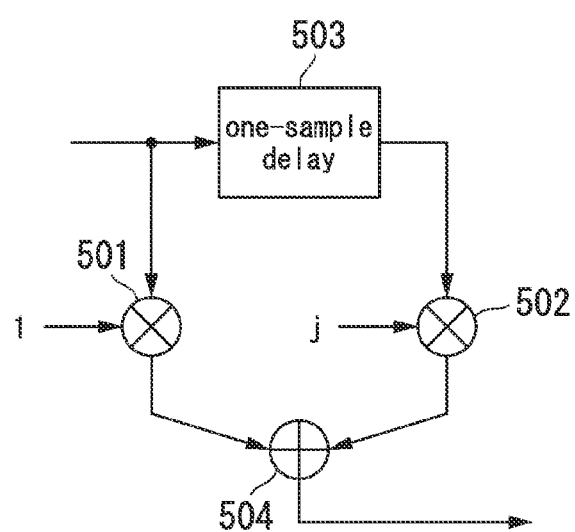
FIG. 16 is a diagram showing an example of a high frequency band pass filter circuit in accordance with the same embodiment.
Figure 17:
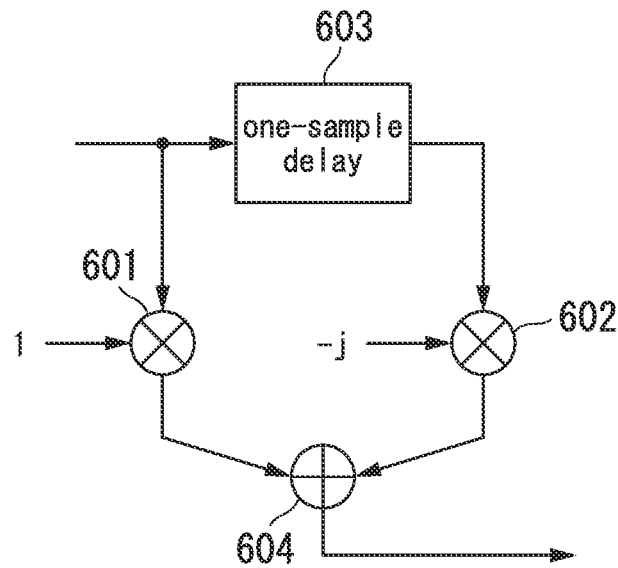
FIG. 17 is a diagram showing an example of a low frequency band pass filter circuit in accordance with the same embodiment.

FIG. 16 shows an example of the configuration of the simplest form of the high frequency band pass filter circuits 5004-1 and 5004-2. FIG. 17 shows an example of the configuration of the simplest form of the low frequency band pass filter circuits 5005-1 and 5005-2.

The high frequency band pass filter circuits 5004-1 and 5004-2, and the low frequency band pass filter circuits 5005-1 and 5005-2 may be configured with 2-tap delay interference filters shown in FIG. 16 and FIG. 17. In the high frequency band pass filter circuit shown in FIG. 16, an input signal is output to a multiplier 501 which performs multiplication by 1 and to a delay circuit 503, a multiplier 502 which performs multiplication by j being provided on the subsequent stage thereof. Then, the result of multiplying the input signal by 1 and the result of multiplying the input signal output from the delay circuit 503 by j are added by an adder 504, and the result thereof is output. Moreover, in the low frequency band pass filter circuit shown in FIG. 17, an input signal is output to a multiplier 601 which performs multiplication by 1 and to a delay circuit 603, a multiplier 602 which performs multiplication by –j being provided on the subsequent stage thereof. Then, the result of multiplying the input signal by 1 and the result of multiplying the input signal output from the delay circuit 603 by –j are added by an adder 604, and the result thereof is output.

Figure 18A:
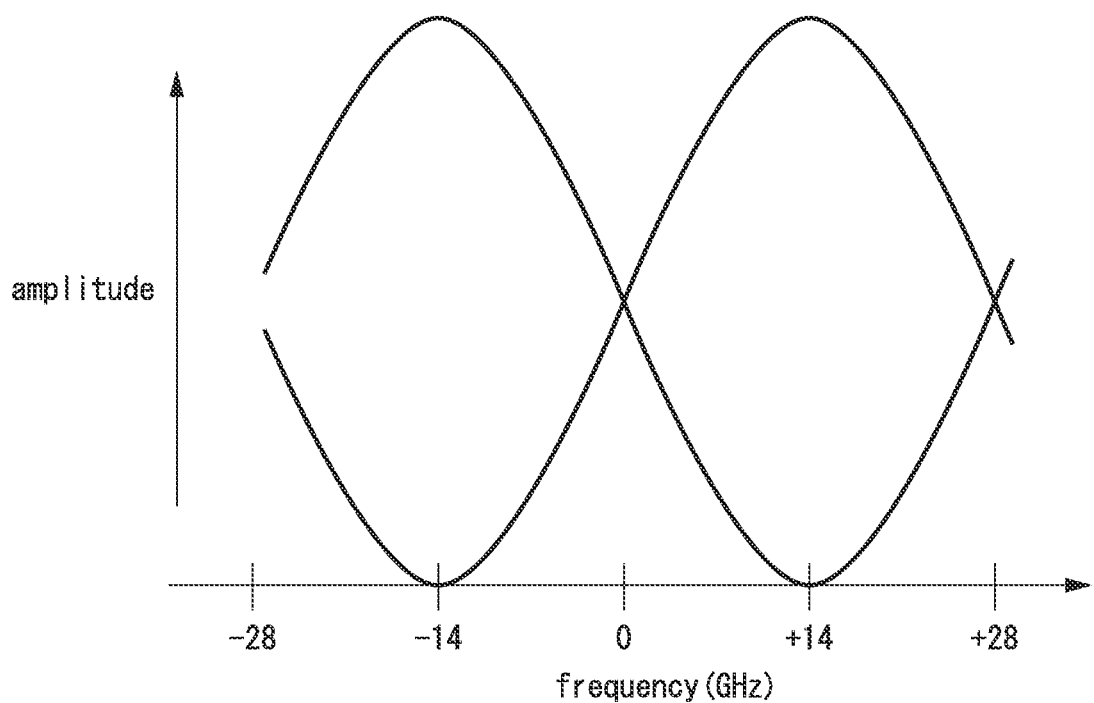
FIG. 18A is a diagram showing transmission characteristics of the high frequency band pass filter circuit and the low frequency band pass filter circuit in accordance with the same embodiment.

Transmission characteristics shown in FIG. 18A can be obtained with these filters, and thus high frequency signals and low frequency signals can be separated. By combining these characteristics with the characteristics of the band pass filters on the previous stage which allow two frequencies to pass selectively, two narrow spectrum components generated from the alternate signals can be separated into the high frequency side and low frequency side.

However, when a band pass filter can be prepared for chromatic dispersion estimation, this type of two-stage configuration is not necessary, and two narrow spectrum components of the alternating signal can be separated and extracted separately by preparing a high-frequency side band pass filter and a low-frequency side band pass filter respectively.

Averaging circuits 5006-1 and 5006-2 respectively average Q consecutive samples obtained in the period at which alternating signals arrive, based on the outputs of the first multiplexing circuit 4004-1 and the second multiplexing circuit 4004-2, and thereby interference and noise can be reduced and peak values of power can be detected. It is preferable that Q is the number of samples that is the same as the sequence length of the alternating signal, that is to say, it is the number of samples obtained by (the number of oversampling)×(the number of symbols of specific frequency band signal), or it is the number of samples smaller than this.

The present embodiment assumes that oversampling is performed at a sampling rate which is an integer multiple of twice or more the symbol rate. Moreover, it is possible to detect correct values even in a situation where components are biased to one of the signals by adding the signals of the X polarized wave and the Y polarized wave.

With the output results of the averaging circuits 5006-1 and 5006-2 taken as input values, the delay time calculating circuit 2004 calculates the delay time difference between the high frequency spectrum component and the low frequency spectrum component. The chromatic dispersion value calculating circuit 2005 can calculate a dispersion value from the calculated delay time difference.

In the above description, the overlap IFFT calculating circuits are provided on the subsequent stage of the frequency domain filter circuits. However, since the delay time difference between the high frequency band signal and the low frequency band signal is determined by the slope of the phase in the frequency domain, it is also possible to calculate the delay time difference using the phases of peak signals. In this case, no overlap IFFT calculating circuit is required, and thus the circuit size can be made smaller.

Moreover, when using the above configuration, the signal power in the frequency domain filter circuits is such that every time a specific frequency band signal is received the power value in the band significantly rises. Therefore, frame timing is detected by monitoring the power value of a signal within the band, thereby making it possible to operate the chromatic dispersion estimating circuit (i.e., the chromatic dispersion calculating unit) in the section in the vicinity thereof.

Figure 18B:
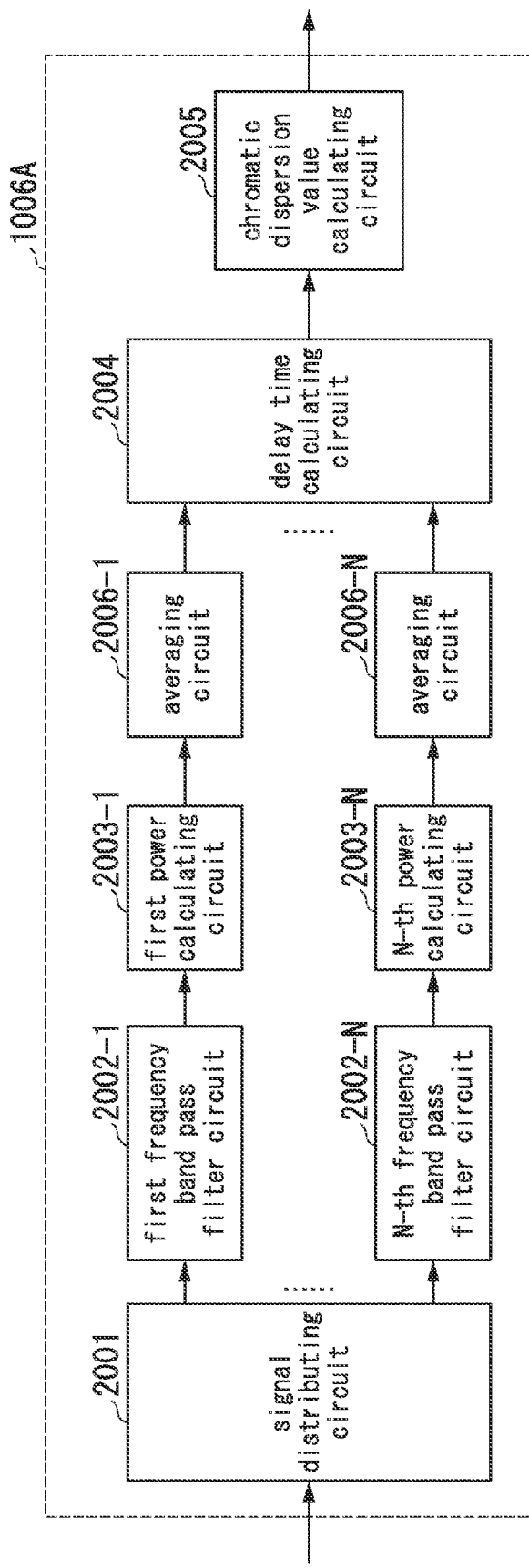
FIG. 18B is a block diagram showing the configuration of the chromatic dispersion calculating unit when averaging circuits are provided between power calculating circuits and a delay time calculating circuit in the first embodiment of the present invention.

It is to be noted that as shown as a chromatic dispersion calculating unit 1006A in FIG. 18B, an averaging circuit 2006-$n$ (1≤n≤N, N≥2) may be provided between each n-th power calculating circuit 2003-$n$ (1≤n≤N, N≥2) of the optical signal receiving apparatus in accordance with the first embodiment and the delay time calculating circuit 2004, and each averaging circuit 2006-$n$ may average a predetermined number of consecutive samples obtained in the period at which alternating signals arrive, based on the output of the n-th power calculating circuit 2003-$n$ on the previous stage, and may output the result thereof to the delay time calculating circuit 2004.

Figure 18C:
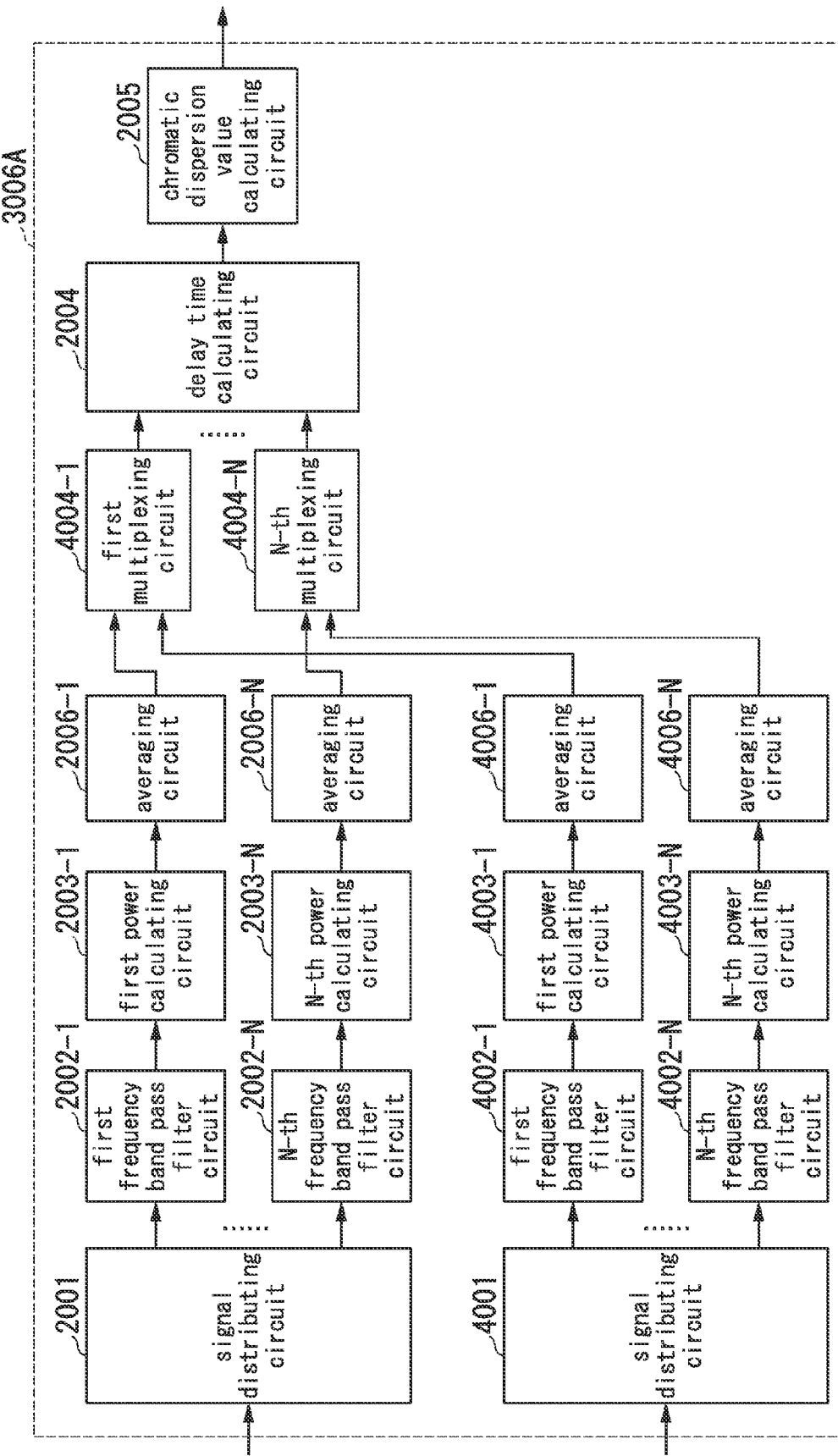
FIG. 18C is a block diagram showing the configuration of the chromatic dispersion calculating unit when averaging circuits are provided between power calculating circuits and multiplexing circuits in the second embodiment of the present invention.

Similarly, as shown as a chromatic dispersion calculating unit 3006A in FIG. 18C, an averaging circuit 2006-$n$ (1≤n≤N, N≥2) may be provided between each of the n-th power calculating circuit 2003-$n$ (1≤n≤N, N≥2) of the optical signal receiving apparatus in accordance with the second embodiment and the n-th multiplexing circuit 4004-$n$, an averaging circuit 4006-$n$ (1≤n≤N, N≥2) may be provided between each of the n-th power calculating circuit 4003-$n$ (1≤n≤N, N≥2) and the n-th multiplexing circuit 4004-$n$, and each of the averaging circuits 2006-$n$ and 4006-$n$ may average a predetermined number of consecutive samples obtained in the period at which alternating signals arrive, based on each of the outputs of the n-th power calculating circuits 2003-$n$ and 4003-$n$ on the previous stage, and may output the result thereof to the n-th multiplexing circuit 4004-$n$.

Fourth Embodiment

Figure 19:
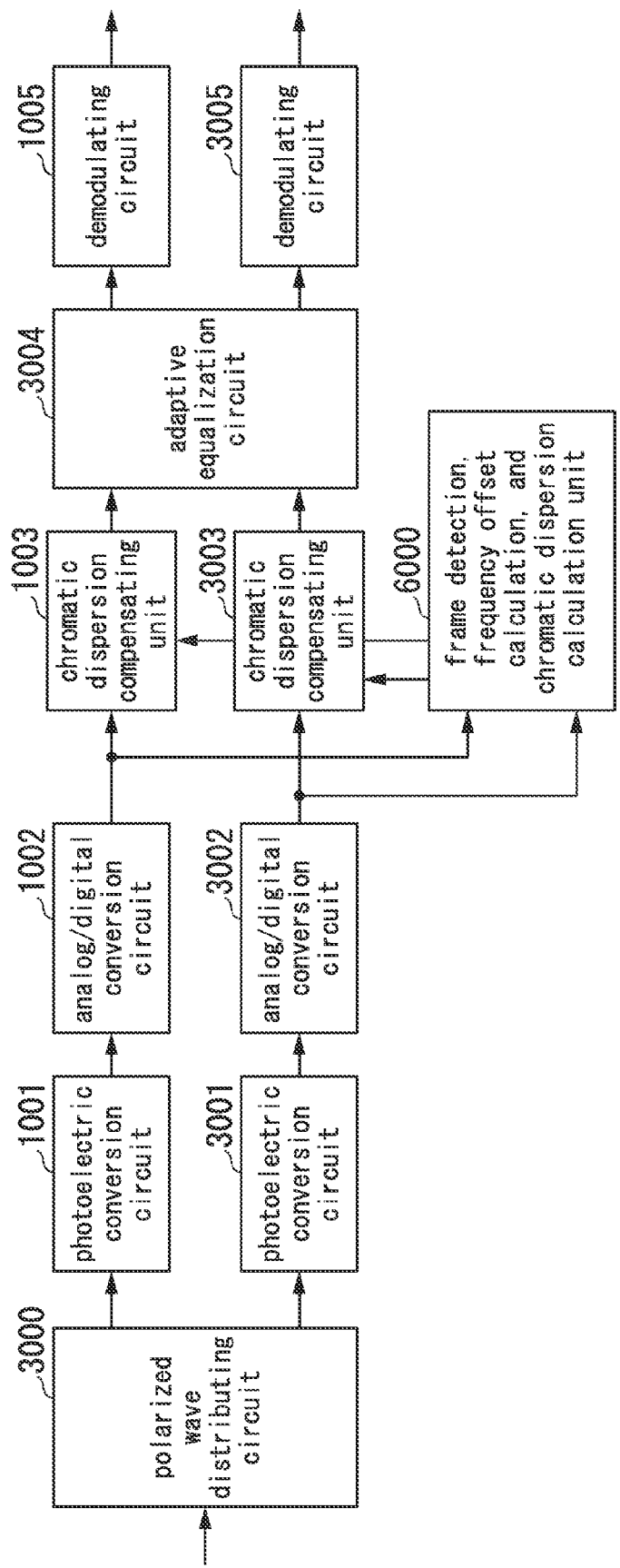
FIG. 19 is a block diagram showing the configuration of an optical signal receiving apparatus in accordance with a fourth embodiment of the present invention.

Next, an optical signal receiving apparatus in accordance with a fourth embodiment of the present invention will be described. FIG. 19 shows an example of the configuration of the optical signal receiving apparatus of the fourth embodiment. The optical signal receiving apparatus in accordance with the fourth embodiment differs from the optical signal receiving apparatus of the second embodiment shown in FIG. 12 in that there are provided a frame detection, frequency offset calculation, and chromatic dispersion calculation unit 6000 shown in FIG. 20, instead of the chromatic dispersion calculating unit 3006.

Figure 20:
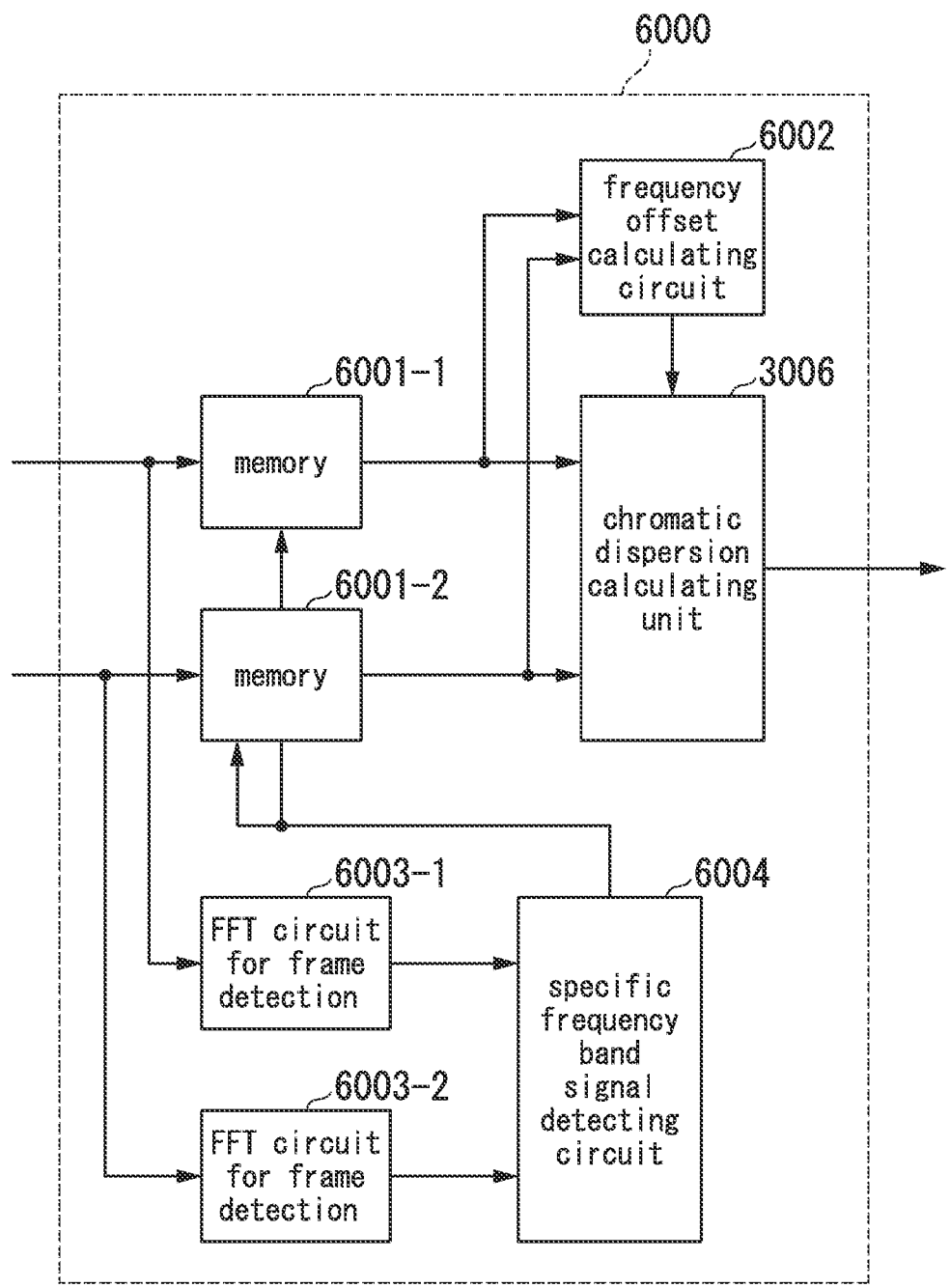
FIG. 20 is a diagram showing the configuration of a frame detection, frequency offset calculation, and chromatic dispersion calculation unit in accordance with the same embodiment.

FIG. 20 shows an example of the configuration of the frame detection, frequency offset calculation, and chromatic dispersion calculation unit 6000 shown in FIG. 19. In this diagram, 6000-1 and 6001-2 denote memories, 6002 denotes a frequency offset calculating circuit, 6003-1 and 6003-2 denote FFT circuits for frame detection, and 6004 denotes a specific frequency band signal detecting circuit. Moreover, the frame detection, frequency offset calculation, and chromatic dispersion calculation unit 6000 is configured to be provided with the chromatic dispersion calculating unit 3006 in the second embodiment, in addition to these components.

The FFT circuits for frame detection 6003-1 and 6003-2 perform FFT on the received signal sequences of respective polarized waves. The specific frequency band signal detecting circuit 6004 calculates power of the frequencies in the vicinity of specific frequency band signals, based on the outputs from the FFT circuits for frame detection 6003-1 and 6003-2. The memories 6001-1 and 6001-2 respectively extract, from the received signal sequences output from the analog/digital conversion circuits 1002 and 3002, L samples which include the time section of the received signal sequences including the specific frequency band signals detected in the specific frequency band signal detecting circuit 6004 as well as sections therebefore and thereafter, and store them. The frequency offset calculating circuit 6002 calculates a frequency offset using the specific frequency band signals, from the signal sequences of L samples output from the memories 6001-1 and 6001-2. The chromatic dispersion calculating unit 3006 calculates a chromatic dispersion value, based on the signal sequences of L samples output from the memories 6001-1 and 6001-2 and the frequency offset output from the frequency offset calculating circuit 6002.

Figure 21A:
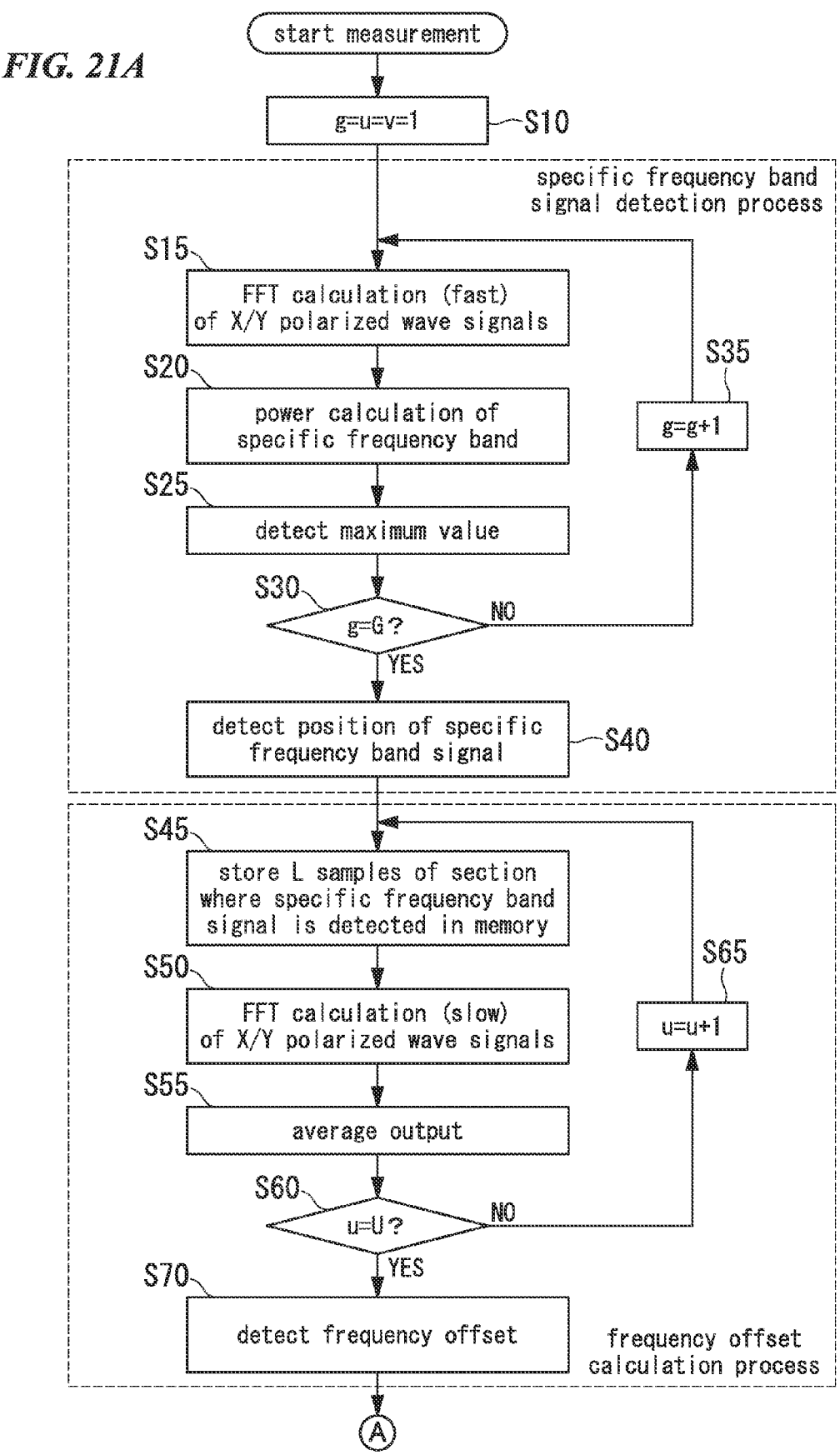
FIG. 21A is a flow chart showing a process of the optical signal receiving apparatus in accordance with the same embodiment.
Figure 21B:
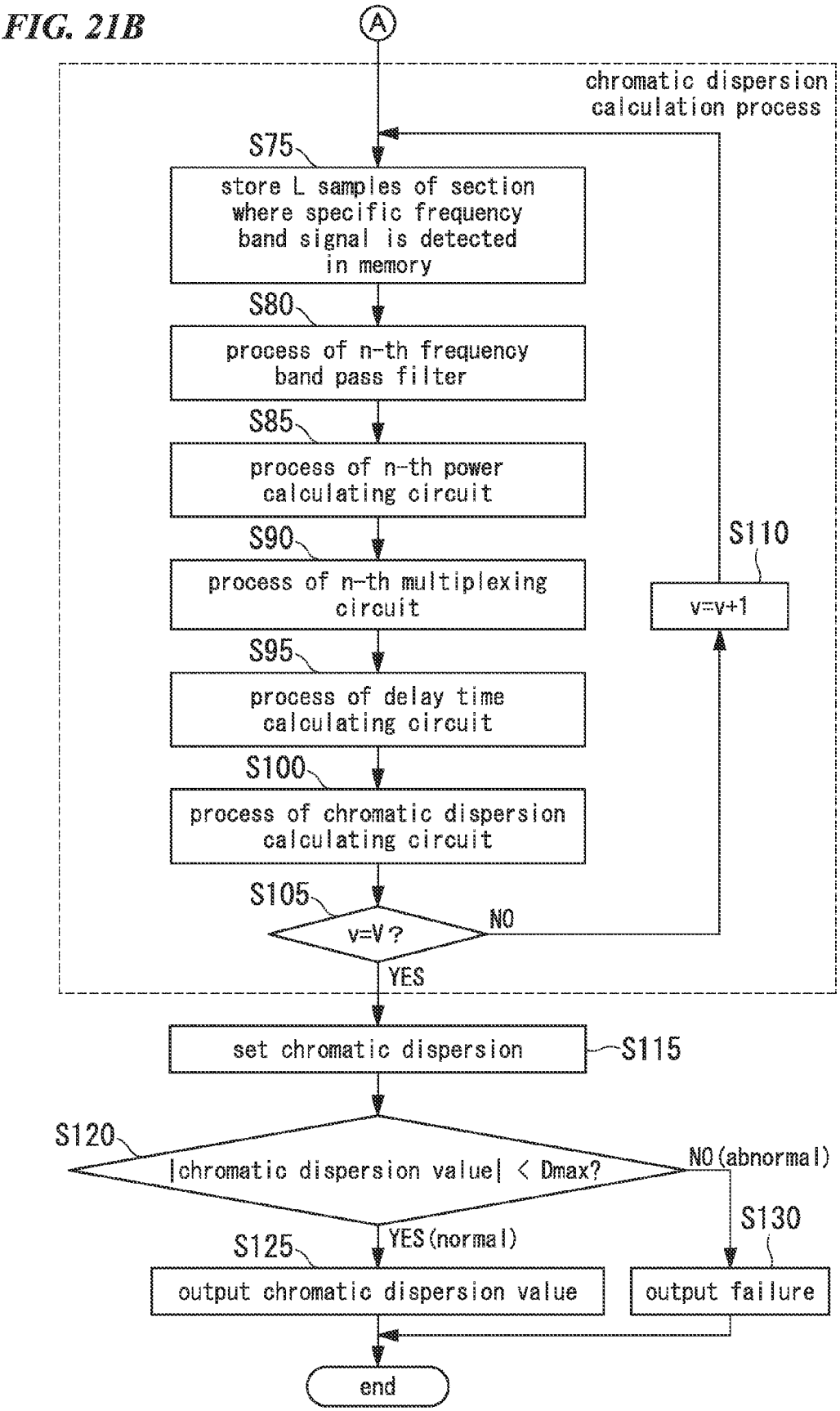
FIG. 21B is a flow chart showing a process of the optical signal receiving apparatus in accordance with the same embodiment.

FIG. 21A and FIG. 21B show an example of flow charts for describing the process of the frame detection, frequency offset calculation, and chromatic dispersion calculation unit 6000.

Hereinafter, the process of the frame detection, frequency offset calculation, and chromatic dispersion calculation unit 6000 will be described, using the configuration shown in FIG. 20 and the flow charts shown in FIG. 21A and FIG. 21B. Here, it is to be noted that it is assumed that specific frequency band signals are time-division multiplexed and transmitted at constant periods.

In FIG. 21A, first, the frame detection, frequency offset calculation, and chromatic dispersion calculation unit 6000 substitutes 1 for variables g, u, and v, which are used for counting the number of repetitions of the process (step S10).

Next, a frame detection process, that is, a specific frequency band signal detection process will be described.

The FFT circuit for frame detection 6003-1 takes the received signal sequence of the X polarized wave output from the analog/digital conversion circuit 1002 as an input and performs FFT transform, and the FFT circuit for frame detection 6003-2 takes the received signal sequence of the Y polarized wave output from the analog/digital conversion circuit 3002 as an input and performs FFT transform (step S15). FFT is operated in real time on the received signal sequences. Here, FFT may be performed on the received signal sequences while overlapping, or it may be performed at arbitrary intervals. For example, when the number of symbols of a specific frequency band signal is 80, the number of oversampling on the receiving side is 2, and the number of points of FFT for frame detection is 64, by setting the arbitrary intervals to 96 (=80×2−64) samples, an alternating signal is always included in any of FFT windows, and the amount of FFT calculation can be reduced.

Subsequently, the specific frequency band signal detecting circuit 6004 calculates power of the frequencies in the vicinity of specific frequency band signals, using the output results from the FFT circuits for frame detection 6003-1 and 6003-2 (step S20). For example, when the optical signal transmitting apparatus transmits a specific frequency band signal as shown in FIG. 2, a filter as shown in FIG. 15 is used to calculate the total power value within the filter. This is performed in the frame period $T_p$, and the maximum value within this period is detected (step S25). The specific frequency band signal detecting circuit 6004 determines whether or not g has reached the number of repetitions G (step S30), and if it has not been reached, 1 is added to g (step S35) and the process from step S15 is performed, and if it has been reached, the position in which the maximum value is detected in repeatedly executed step S25 is output to the memories 6001-1 and 6000-2 (step S40). That is to say, the specific frequency band signal detecting circuit 6004 performs the operation of step S15 to step S25 G times (G≥1) on the different received signal sequences, and the position in which the maximum value is observed in the period $T_p$, that is, the position of the specific frequency band signal is detected, and the result thereof is output to the memories 6001-1 and 6001-2. However, although, in the description above, the maximum value within the frame period $T_p$ is detected, an arbitrary power threshold value may be set and the position in which this power threshold value is exceeded may be detected.

Next, a frequency offset calculation process will be described.

The memories 6001-1 and 6001-2 respectively extract, from the received signal sequences output from the analog/digital conversion circuits 1002 and 3002, L samples which include the time section including a specific frequency band signal detected in the specific frequency band signal detecting circuit 6004 as well as sections therebefore and thereafter, and store them (step S45). Then, the memories 6001-1 and 6001-2 output the signal sequences of the L samples to the frequency offset calculating circuit 6002, and the frequency offset calculating circuit 6002 calculates a frequency offset using the specific frequency band signals (step S50). This calculation method is such that FFT transform is performed on the signal sequence of the L samples, the frequency at which the amplitude or the power of the frequency component becomes the maximum value, or the frequency of the centroid position is calculated, the offset amount f the specific frequency band signal from the center frequency is calculated, and this value is output as a frequency offset calculation value. Here, it is to be noted that in the frequency offset calculation process, the frequency offset calculating circuit 6002 performs this operation U times (U≥1) on the L samples which include the section including a different specific frequency band signal as well as sections therebefore and thereafter, and calculates an average or the like, thereby improving the level of accuracy in calculating the frequency offset (step S55). To this end, the frequency offset calculating circuit 6002 determines whether or not u has reached the number of repetitions U (step S60), and if it has not been reached, 1 is added to u (step S65) and the process from step S45 is performed, and if it has been reached, the frequency offset calculation value, which has been averaged in step S55 executed immediately therebefore, is output to the chromatic dispersion calculating unit 3006 (step S70).

Next, a chromatic dispersion calculation process will be described with reference to FIG. 21B.

First, as with step S45, the memories 6001-1 and 6001-2 respectively extract, from the received signal sequences output from the analog/digital conversion circuits 1002 and 3002, L samples which include the time section including the specific frequency band signal detected in the specific frequency band signal detecting circuit 6004 as well as sections therebefore and thereafter, and store them (step S75).

The chromatic dispersion calculating unit 3006 receives the L samples output from the memories 6001-1 and 6001-2, which include the time section including the specific frequency band signal as well as the sections therebefore and thereafter, as an input, and calculates a chromatic dispersion value. This calculation is performed as described in the second embodiment.

That is to say, the n-th frequency band pass filter circuit 2002-$n$ and the n-th frequency band pass filter circuit 4002-$n$ ($1 \leq n \leq N$, $N \geq 2$) respectively allow specific frequency signals with respect to the X polarized wave and the Y polarized wave to pass (step S80). With respect to the sequences of the X polarized wave and the Y polarized wave, the n-th power calculating circuit 2003-$n$ and the n-th power calculating circuit 4003-$n$ ($1 \leq n \leq N$, $N \geq 2$) respectively calculate a power value for each sample, and output the result to the n-th multiplexing circuit 4004-$n$ ($1 \leq n \leq N$, $N \geq 2$) (step S85). The n-th multiplexing circuit 4004-$n$ performs synthesis on the input signal sequences of the power values of the X polarized wave and Y polarized wave, and outputs to the delay time calculating circuit 2004 (step S90). The delay time calculating circuit 2004 detects sample times $T_n$ where the maximum power values (peak values) are observed from the input sequences, and calculates the time difference between the peak values (step S95). The chromatic dispersion value calculating circuit 2005 calculates a chromatic dispersion value from the calculated delay time (step S100).

Furthermore, in the above process, it is also possible to operate the chromatic dispersion calculating unit 3006, using the calculated frequency offset value output from the frequency offset calculating circuit 6002. In this case, the calculated frequency offset value may be input to the signal distributing circuits 2001 and 4001 in the chromatic dispersion calculating unit 3006, the received signal sequences of the L samples output from the memories 6001-1 and 6001-2 may be compensated for the frequency offset first, and then the signals may be distributed. Alternatively, the calculated frequency offset value may be input to the n-th frequency band pass filter circuits 2002-1 to 2002-N and 4002-1 to 4002-N ($1 \leq n \leq N$, $N \geq 2$), the frequency offset may be compensated for, and then the band pass filters may be operated. In this way, it is possible to calculate chromatic dispersion while compensating for the frequency offset which occurs in the optical signal receiving apparatus, and thus the level of calculation accuracy is improved.

The chromatic dispersion calculating unit 3006 performs this process V times (V$\geq$1) on the L samples, which include the section including a different specific frequency band signal as well as the sections therebefore and thereafter, and calculates an average or the like, thereby improving the level of accuracy in calculating the chromatic dispersion value. To this end, the chromatic dispersion calculating unit 3006 determines whether or not v has reached the number of repetitions V (step S105), and if it has not been reached, 1 is added to v (step S110) and the process from step S75 is performed, and if it has been reached, the average of chromatic dispersion values calculated in repeatedly performed step S100 is calculated (step S115).

Then, the chromatic dispersion calculating unit 3006 determines whether or not the chromatic dispersion value calculated in step S115 is smaller than the absolute value Dmax of the maximum value of possible values (step S120), and if it is smaller than this, the chromatic dispersion calculation process is ended and the result is output to the chromatic dispersion compensating units 1003 and 3003 (step S125), and if it is greater than or equal to this, the fact that calculation has been failed is output (step S130).

It is to be noted that if the calculation is failed, the frame detection, frequency offset calculation, and chromatic dispersion calculation unit 6000 may be operated again to perform frame detection, frequency offset calculation, and chromatic dispersion calculation.

With use of the optical signal receiving apparatus of the fourth embodiment described above, the chromatic dispersion calculating circuit is no longer required to operate in real time, and thus it is possible to operate the apparatus with a clock slower than that of the optical signal receiving apparatuses of the other embodiments. As a result, it is possible to reduce the circuit size and power consumption.

Figure 21D:
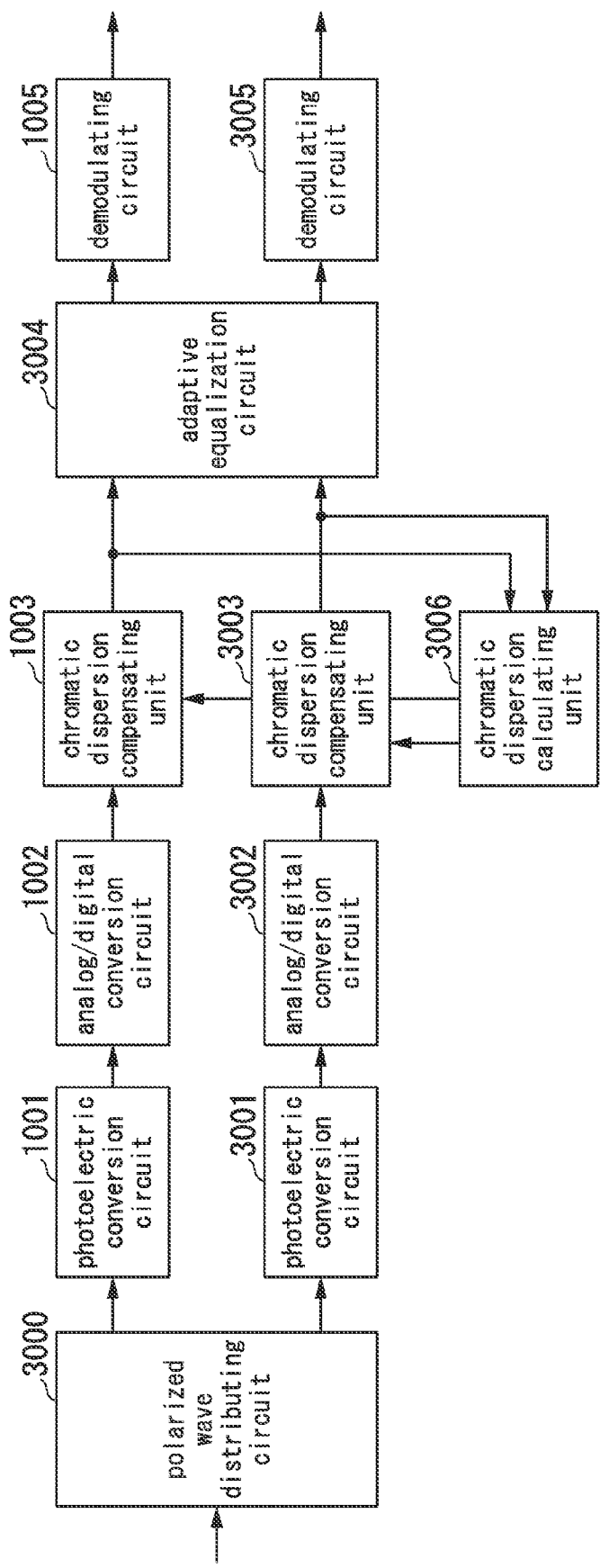
FIG. 21D is a block diagram showing the configuration of the optical signal receiving apparatus in a case of calculating chromatic dispersion, using output values of the chromatic dispersion compensating units instead of output values of analog/digital conversion circuits in the second embodiment of the present invention.

In the first to third embodiments, input values of the chromatic dispersion calculating unit are output values from the analog/digital conversion circuits; however, output values from the chromatic dispersion compensating units may be used as the input values to calculate chromatic dispersion. For example, in the case of FIG. 4, as shown in FIG. 21C, instead of an output value of the analog/digital conversion circuit 1002, an output value of the chromatic dispersion compensating unit 1003 is input to the chromatic dispersion calculating unit 1006. Moreover, in the case of FIG. 12, as shown in FIG. 21D, instead of an output value of the analog/digital conversion circuit 1002, an output value of the chromatic dispersion compensating unit 1003 is input to the chromatic dispersion calculating unit 3006, and instead of an output value of the analog/digital conversion circuit 3002, an output value of the chromatic dispersion compensating unit 3003 is input to the chromatic dispersion calculating unit 3006. In these cases, the apparatus can be operated by setting the chromatic dispersion value to 0 ps/nm as an initial value for the chromatic dispersion compensating unit, that is to say, by setting a weight W($\omega$) of each frequency $\omega$ used in the chromatic dispersion compensating unit to 1. Furthermore, in the case of calculating chromatic dispersion using an output value from the chromatic dispersion compensating unit as an input value of the chromatic dispersion calculating unit, an input value of the signal distributing circuit is an output value from the chromatic dispersion compensating unit; however, the chromatic dispersion calculating unit can calculate chromatic dispersion with the same configuration. With the chromatic dispersion calculating circuit operated using the output value of the chromatic dispersion compensating unit as the input value, even if the chromatic dispersion value varies in time while the communication system is in operation, by estimating in the chromatic dispersion calculating circuit the difference in variation of chromatic dispersion in a certain period, the estimated result can be input to the chromatic dispersion compensating unit.

Moreover, in the fourth embodiment, input values of the frame detection, frequency offset calculation, and chromatic dispersion calculation unit 6000 are output values from the analog/digital conversion circuits 1002 and 3002; however, output values from the chromatic dispersion compensating units 1003 and 3003 may be used as input values to calculate chromatic dispersion. For example, in the case of FIG. 19, instead of an output value of the analog/digital conversion circuit 1002, an output value of the chromatic dispersion compensating unit 1003 is input to the frame detection, frequency offset calculation, and chromatic dispersion calculation unit 6000, and instead of an output value of the analog/digital conversion circuit 3002, an output value of the chromatic dispersion compensating unit 3003 is input to the frame detection, frequency offset calculation, and chromatic dispersion calculation unit 6000. In this case, the apparatus can be operated by setting the chromatic dispersion value to 0 ps/nm as the initial value for the chromatic dispersion compensating units 1003 and 3003, that is to say, by setting a weight W(ω) of each frequency ω used in the chromatic dispersion compensating units 1003 and 3003 to 1. Moreover, in the case of calculating chromatic dispersion using the output values from the chromatic dispersion compensating units 1003 and 3003 as the input values of the frame detection, frequency offset calculation, and chromatic dispersion calculation unit 6000, input values of the memories 6000-1 and 6000-2 and the FFT circuits for frame detection 6003-1 and 6003-2 are output values from the chromatic dispersion compensating units 1003 and 3003; however, the frame detection, frequency offset calculation, and chromatic dispersion calculation unit 6000 can perform frame detection, frequency offset calculation, and chromatic dispersion calculation, with the same configuration. By operating the frame detection, frequency offset calculation, and chromatic dispersion calculation unit 6000 using the output values from the chromatic dispersion compensating units 1003 and 3003 as the input values, even if frame synchronization is lost while the communication system is in operation, or a frequency offset and a chromatic dispersion value varies in time, these can be compensated for in a certain period.

Hereinafter, advantageous effects of the first to fourth embodiments of the present invention will be described.

Figure 22:
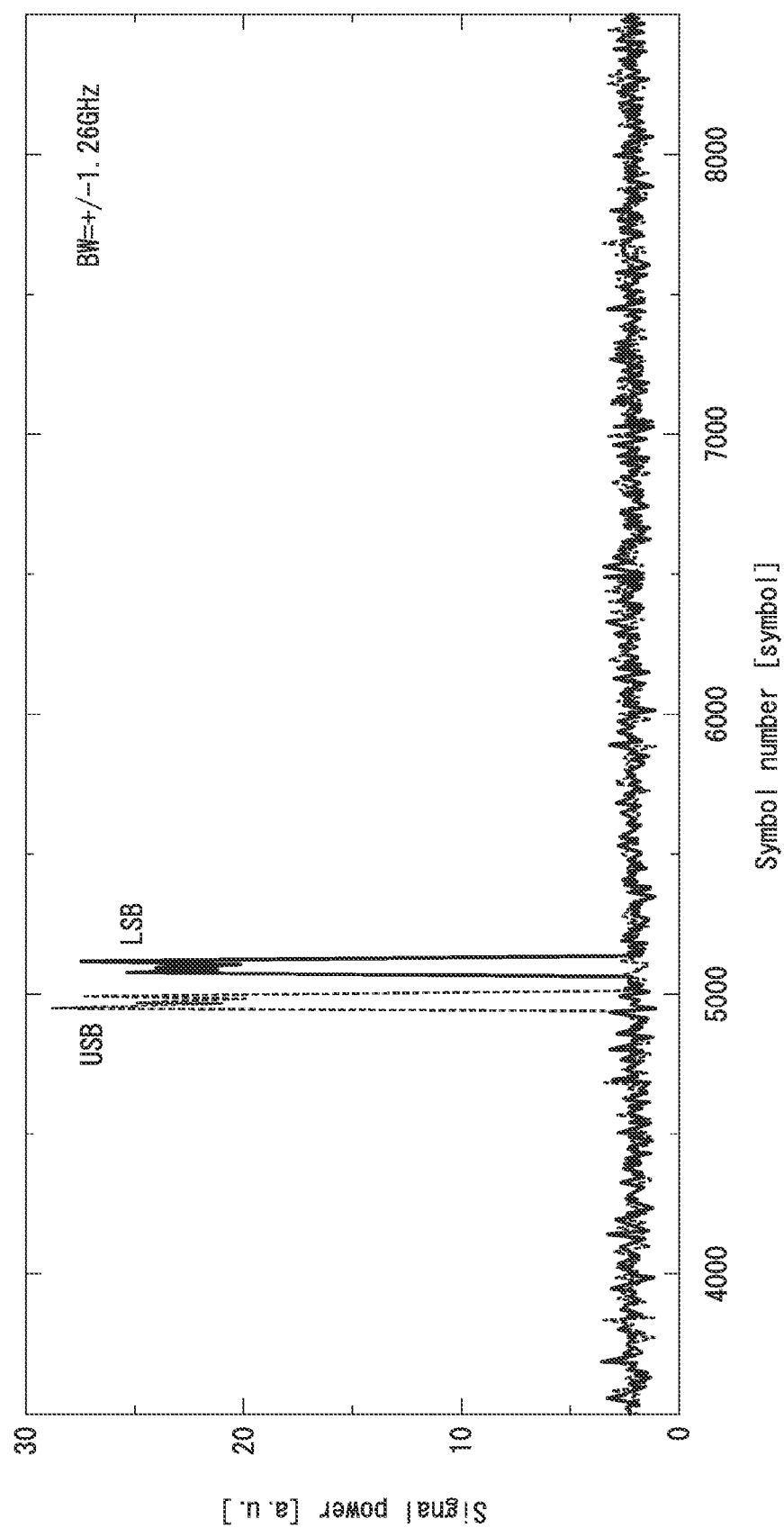
FIG. 22 is a diagram showing a difference in arrival time between a high frequency band signal and a low frequency band signal.
Figure 23A:
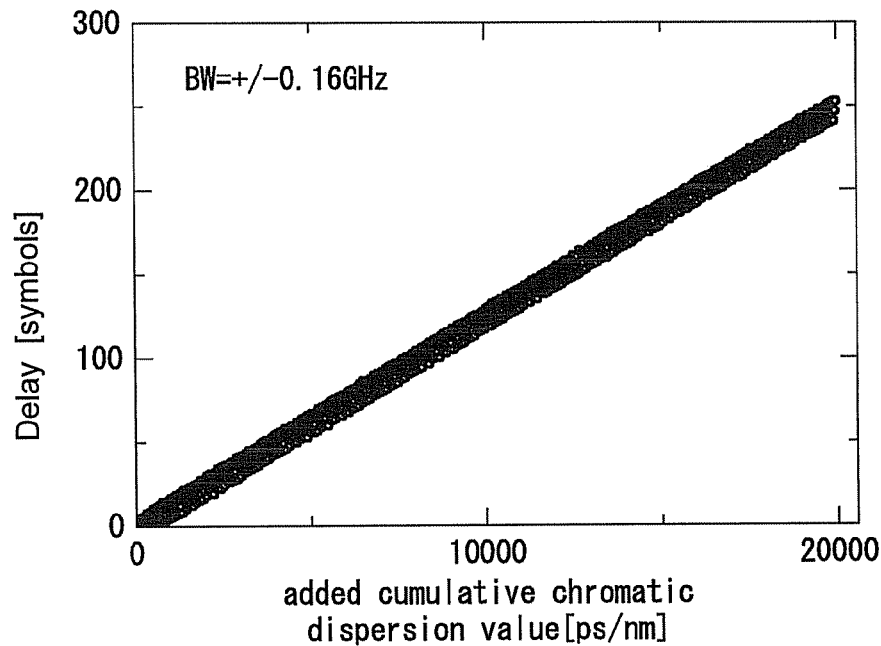
FIG. 23A is a diagram showing estimation accuracy of the first to fourth embodiments of the present invention in which a chromatic dispersion value is taken as a parameter.
Figure 23B:
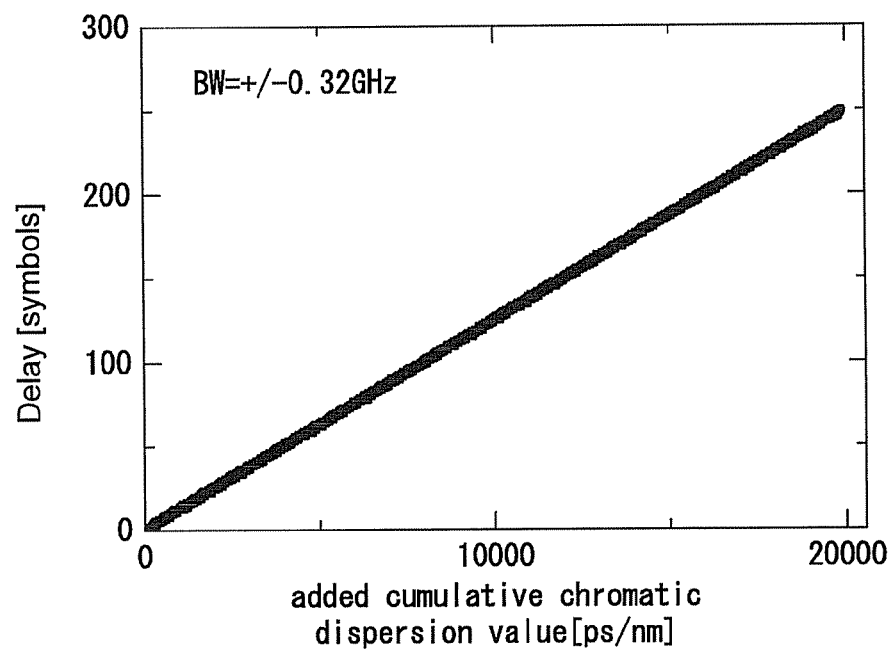
FIG. 23B is a diagram showing estimation accuracy of the first to fourth embodiments of the present invention in which a chromatic dispersion value is taken as a parameter.
Figure 23C:
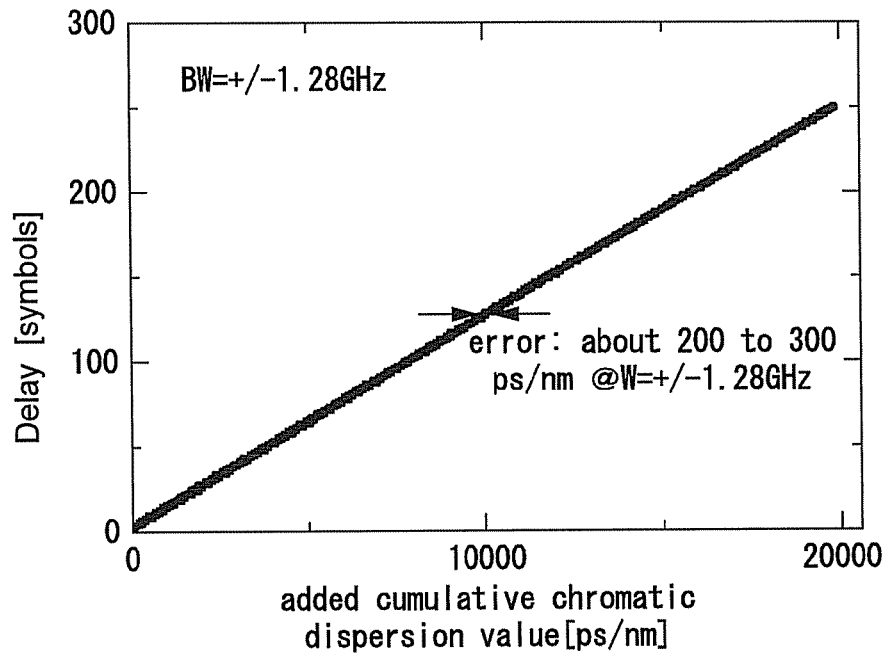
FIG. 23C is a diagram showing estimation accuracy of the first to fourth embodiments of the present invention in which a chromatic dispersion value is taken as a parameter.
Figure 23D:
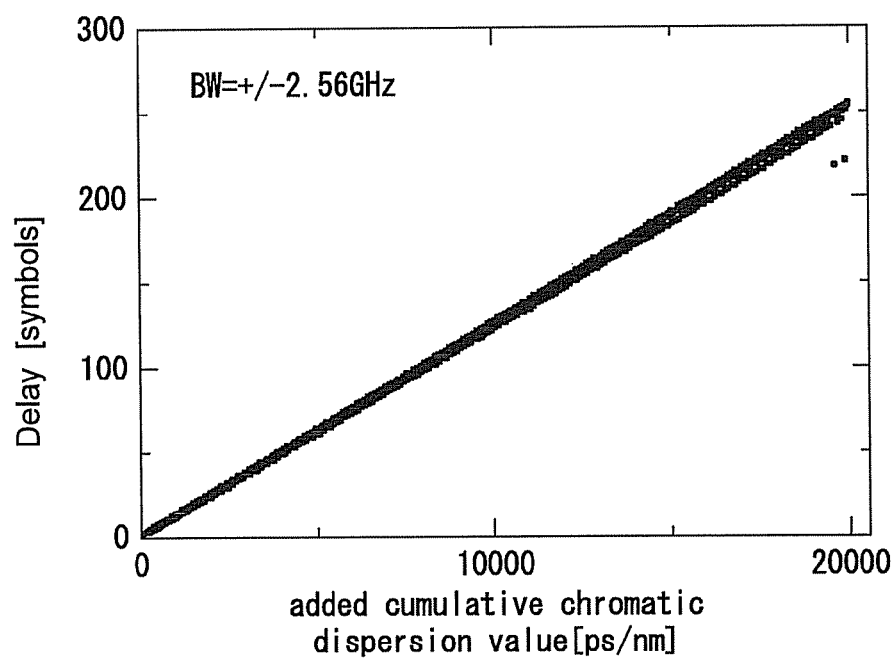
FIG. 23D is a diagram showing estimation accuracy of the first to fourth embodiments of the present invention in which a chromatic dispersion value is taken as a parameter.

FIG. 22 shows a simulated result of the difference in an arrival time when a chromatic dispersion value is set to 20000 ps/nm, a transmission symbol rate is 28 GSymbol/s, a sampling frequency of the optical signal receiving apparatus is 56 GHz, a frame length is 32768 symbols, the length of an alternating signal is 64 symbols, and the number of averaging frames is set to 15 times. It can be seen that a difference is observed between the arrival times of a high frequency band signal (USB, upper sideband) and a low frequency band signal (LSB, lower sideband).

FIG. 23A to FIG. 23D are diagrams each showing observed delays of the USB and LSB with the number of symbols on the Y axis, when the chromatic dispersion value caused by a transmission line is changed from zero to 20000 ps/nm. It can be understood that the difference in the arrival time between the USB and the LSB increases in proportion to the chromatic dispersion value. Therefore, conversely, dispersion can be estimated from this difference in the arrival time. When considering QPSK and polarization-division multiplexing with reference to 130560 bits, i.e., the number of bits of OTU (optical transport unit) 4, which transfers 100 GbE (Giga bit Ethernet (registered trademark)), one frame is 32640 symbols, and thus a value close thereto is set in evaluating the simulation. In the four graphs, the set transmission bandwidth W of the band pass filter is changed, and the bandwidth is changed to ±0.16, ±0.32, ±1.28, ±2.56 GHz, respectively. The results show that the error is smallest when W=±1.28 GHz, and the error in detected chromatic dispersion tend to be reduced when the bandwidth is wide to some extent. On the other hand, if the bandwidth is excessively widened, the passing band of various data other than alternating signals becomes widened, and consequently selectivity of alternative signals is reduced and detection sensitivity becomes deteriorated. In these results, approximately ±1.28 GHz is preferred. By expanding the passing band further, there is a possibility for performance improvement.

Figure 24:
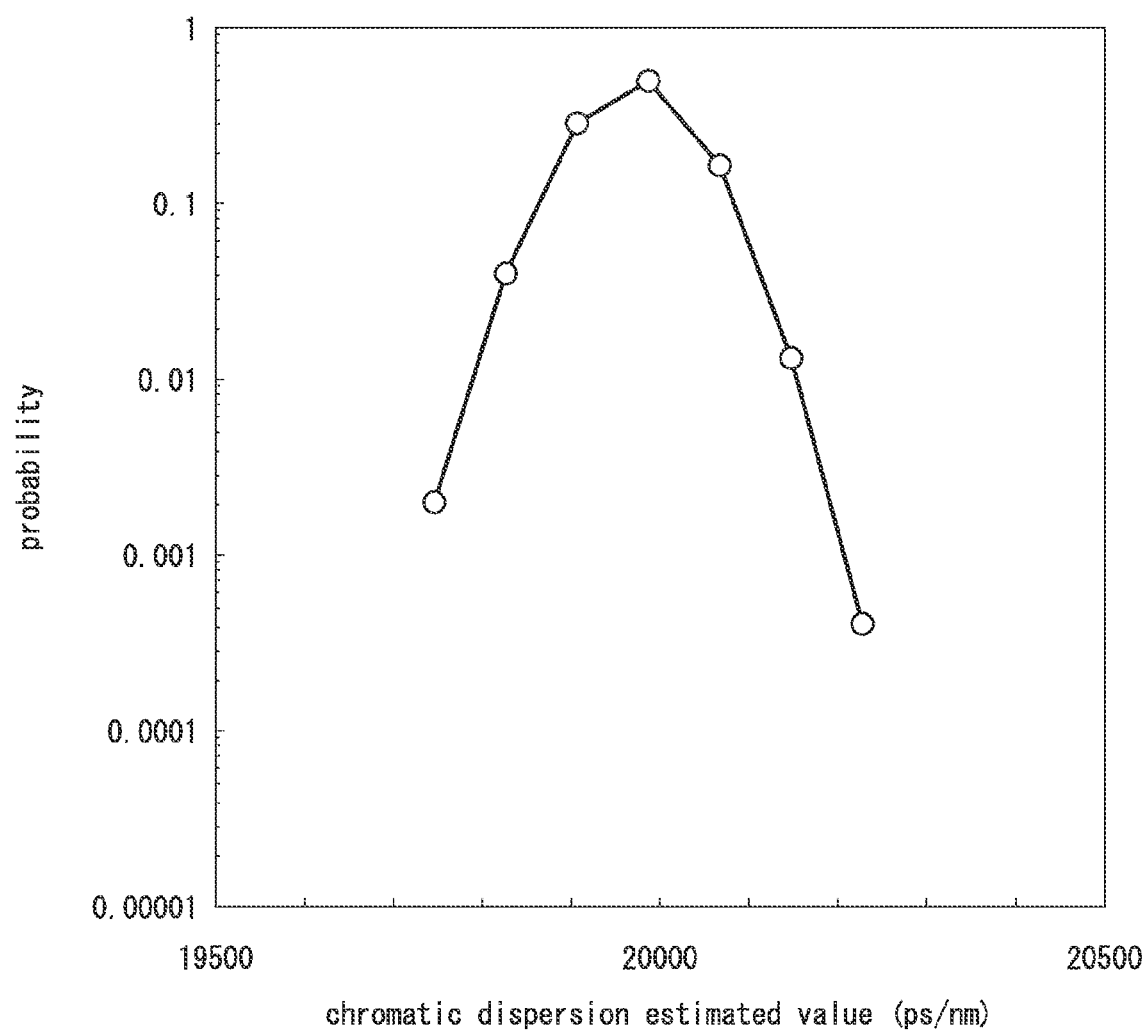
FIG. 24 is a diagram showing estimation accuracy of the first to fourth embodiments of the present invention in which a chromatic dispersion value is 20000 ps/nm.

FIG. 24 shows the calculation accuracy of this proposed technique where a chromatic dispersion value is 20000 ps/nm and polarization mode dispersion is 0.8 ps/√km. As can be seen from the diagram, the chromatic dispersion value can be calculated at a high level of accuracy of approximately ±200 ps/nm. Moreover, calculation is performed using received signals of 18 µs, and thus the calculation speed of chromatic dispersion is extremely high.

Fifth Embodiment

Next, a fifth embodiment of the present invention will be described.

Figures 25, 26:
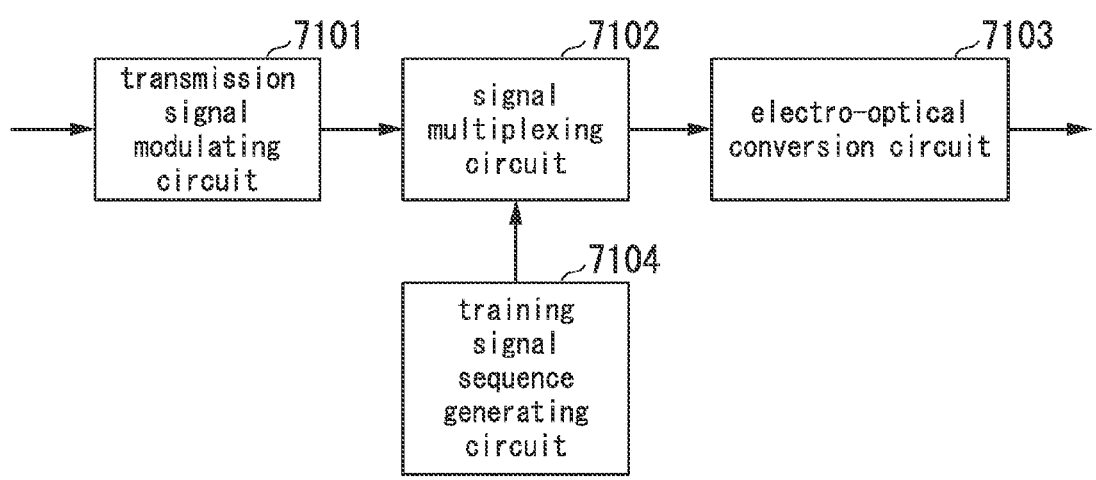
FIG. 25 is a block diagram showing an example of the configuration of an optical signal transmitting apparatus in accordance with a fifth embodiment of the present invention.
FIG. 26 is a diagram showing an example of a training signal sequence in accordance with the same embodiment.

FIG. 25 shows an example of the configuration of an optical signal transmitting apparatus in accordance with a fifth embodiment of the present invention. In this diagram, 7101 denotes a transmission signal modulating circuit, 7102 denotes a signal multiplexing circuit, 7103 denotes an electro-optical conversion circuit, and 7104 denotes a training signal sequence generating circuit.

The transmission signal modulating circuit 7101 modulates a binary sequence of data to be transmitted, and outputs a transmission symbol sequence. Examples of the modulation scheme include BPSK (binary phase shift keying) modulation, QPSK (quadrature phase shift keying) modulation, and QAM (quadrature amplitude modulation); however, another modulation scheme may be employed. The training signal sequence generating circuit 7104 generates a first specific frequency band signal sequence with power concentrated in two or more specific frequency bands, and second specific frequency band signal sequences with power concentrated in a specific frequency band different from those two or more specific frequency bands of the first specific frequency band signal sequence, generates a signal sequence in which the second specific frequency band signal sequences are respectively time-division multiplexed immediately before and immediately after the first specific frequency band signal sequence, as a training signal sequence, and outputs the generated training signal sequence. It is to be noted that the training signal sequence generating circuit 7104 may generate second specific frequency band signal sequences which do not have signal power in the specific frequency bands used by the first specific frequency band signal sequence.

The signal multiplexing circuit 7102 receives outputs of the transmission signal modulating circuit 7101 and the training signal sequence generating circuit 7104 as inputs, inserts (multiplexes in the time domain) the training signal sequence output from the training signal sequence generating circuit 7104 into the transmission symbol sequence, which is an output signal from the transmission signal modulating circuit 7101 in an arbitrary signal period Ns, and outputs the resultant signal sequence. The electro-optical conversion circuit 7103 receives the output of the signal multiplexing circuit 7102 as an input, performs electro-optical conversion on the signal sequence, and outputs an optical signal.

FIG. 26 shows a training signal sequence. As shown in this diagram, the second specific frequency band signal sequences are respectively time-division multiplexed immediately before and immediately after the first specific frequency band signal sequence. It is to be noted that a training signal may be referred to as a reference signal, a pilot signal, a known signal, or the like.

Here, as the specific frequency band signal sequences, for example, alternating signals that are point-symmetric with respect to the origin on an IQ plane may be used. As an example, a specific frequency band signal sequence can be generated by generating BPSK signals and alternately using two signal points like −S, S, −S, S, ..., −S, S, or by generating QPSK signals and generating (S, S), (−S, −S), (S, S), (−S, −S), ..., (S, S), (−S, −S) or (S, −S), (−S, S), (S, −S), (−S, S), ..., (S, −S), (−S, S). Here, S denotes an arbitrary real number. Moreover, α and β in the notation (α, β) respectively denote signal components of a real part and an imaginary part, and it may be expressed as α+jβ as a complex number. j is an imaginary unit.

Moreover, it is possible to use alternating signals in which a single signal is repeated M times (M is an arbitrary positive number) like −S, −S, S, S, −S, −S, S, S, . . . , −S, −S, S, S. Furthermore, it is possible to generate a specific frequency band signal having peaks in four or more frequency bands by mixing or convoluting signals corresponding to the number of a plurality of repetitions. Moreover, it is also possible to generate a specific frequency band signal having peaks in two or more frequency bands by generating and adding a plurality of sinusoidal waves with different periods. Furthermore, it is possible to generate a specific frequency band signal by transmitting signals only for specific subcarriers by means of an orthogonal frequency division multiplexing (OFDM) scheme.

With use of the above method, a first specific frequency band signal sequence and second specific frequency band signal sequences are generated, and a training signal sequence is generated.

Here, an example is considered in which, in transmission of a transmission signal of 12.5 Gbaud, a training signal sequence is generated using alternating signals of QPSK signals (S, S) and (−S, −S) as the first specific frequency band signal sequence and using a signal sequence with a single signal repeated twice in a manner such as QPSK signals (S, S), (S, S), (−S, −S), (−S, −S), (S, S), . . . , (S, S), (S, S), (−S, −S), (−S, −S) as the second specific frequency band signal sequence.

Figure 27:
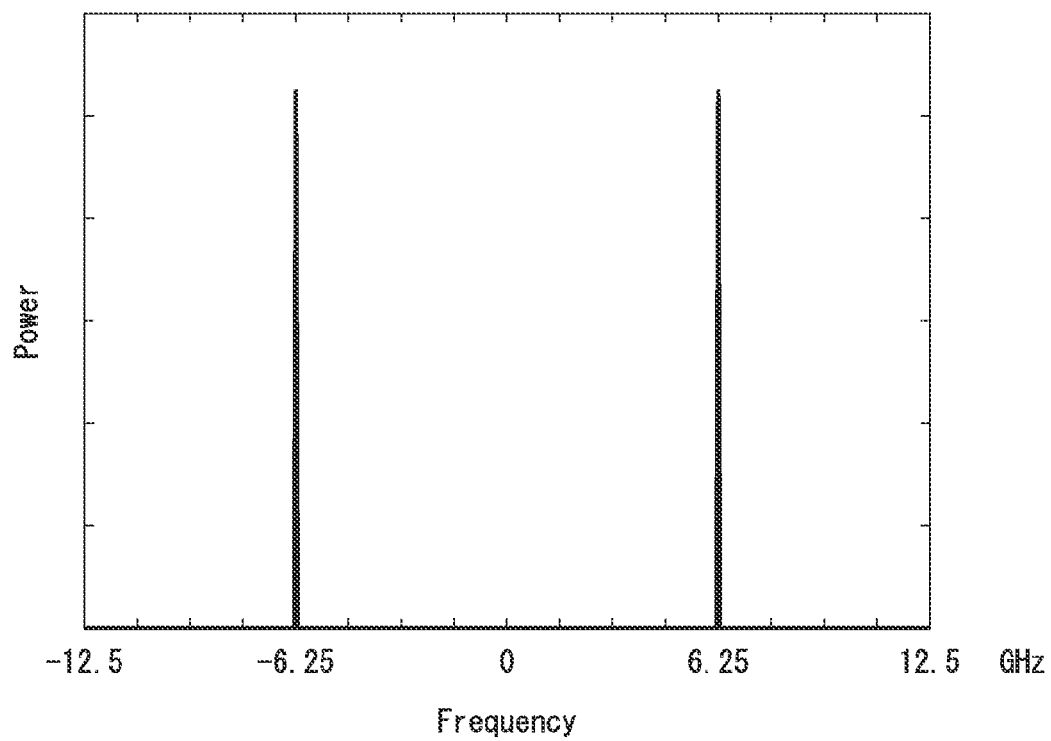
FIG. 27 is a diagram showing an example of a frequency spectrum of a first specific frequency band signal sequence in accordance with the same embodiment.
Figure 28:
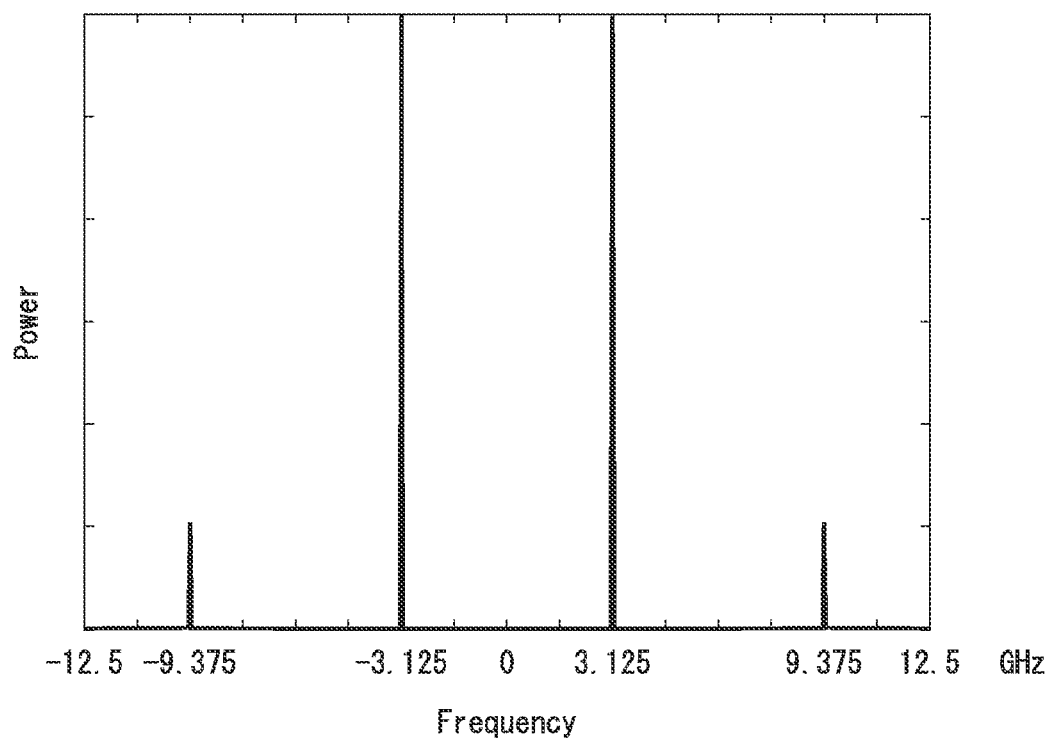
FIG. 28 is a diagram showing an example of a frequency spectrum of a second specific frequency band signal sequence in accordance with the same embodiment.

FIG. 27 shows a frequency spectrum of the first specific frequency band signal sequence. FIG. 28 shows a frequency spectrum of the second specific frequency band signal sequence. It is to be noted that the signal represented as negative in the frequency domain is an alias component of a signal corresponding to an electrical signal in a range of 12.5 to 25 GHz; however, the electrical signal is converted into a negative region with respect to a carrier frequency when the electrical signal is up-converted into an optical signal, and therefore FIG. 27 and FIG. 28 use such notation.

In the case of the first specific frequency band signal sequence shown in FIG. 27, it can be seen that two signals with an interval of 12.5 GHz are formed on the high frequency side at 6.25 GHz and the low frequency side at −6.25 GHz. Moreover in the case of the second specific frequency band signal sequence shown in FIG. 28, it can be seen that a total of four spectra are formed, namely, two spectra with a high level of power on the high frequency side at 3.125 GHz and the low frequency side at −3.125 GHz, and two spectra with a low level of power on the high frequency side at 9.375 GHz and the low frequency side at −9.375 GHz. That is to say, the power of the frequency spectrum of the second specific frequency band signal sequence concentrates in frequency bands different from the band where the power of the frequency spectrum of the first specific frequency band signal sequence concentrates.

With use of specific frequency band signals as the training signal sequence, signal lights respectively have a frequency spectrum with a small spread, and thus deterioration in waveforms caused by chromatic dispersion is unlikely. Moreover, since the frequency spectra are apart from each other, a difference occurs in arrival times when chromatic dispersion occurs. With this understanding, it is possible to calculate a chromatic dispersion value using a method described below.

Furthermore, by inserting the second specific frequency band signal sequences with the power concentrating in the frequency band different from those of the first specific frequency band signal sequence, before and after the first specific frequency band signal sequence, and transmitting them as a training signal sequence, it is possible to prevent transmission symbol signal sequences before and after the training signal from interfering with the frequency band used by the first specific frequency band signal sequence. Moreover, with the method described below, the second specific frequency band signal sequences are removed by a BPF (band pass filter) when the chromatic dispersion value is calculated, and therefore the level of accuracy in calculating the chromatic dispersion value is improved.

Here, it is preferable that the frequency interval between the frequency band with concentrated power in the first specific frequency band signal sequence and the frequency band with concentrated power in the second specific frequency band signal sequence is set to a value greater than the maximum value of a frequency offset that may occur between the optical signal receiving apparatus and the optical signal transmitting apparatus (e.g., a frequency offset between lasers used in the optical signal receiving apparatus and the optical signal transmitting apparatus). By setting the frequency interval to the value greater than the maximum value of the preliminarily anticipated frequency offset, it is possible for the receiving side to easily distinguish the first specific frequency band signal sequence from the second specific frequency band signal sequence.

The specific frequency band signals generated by the training signal sequence generating circuit 7104 are input to the signal multiplexing circuit 7102, and the signal multiplexing circuit 7102 multiplexes them in the time domain at specific positions in the transmission signal input from the transmission signal modulating circuit 7101, to be transmitted as an optical signal from the electro-optical conversion circuit 7103.

Figure 29:
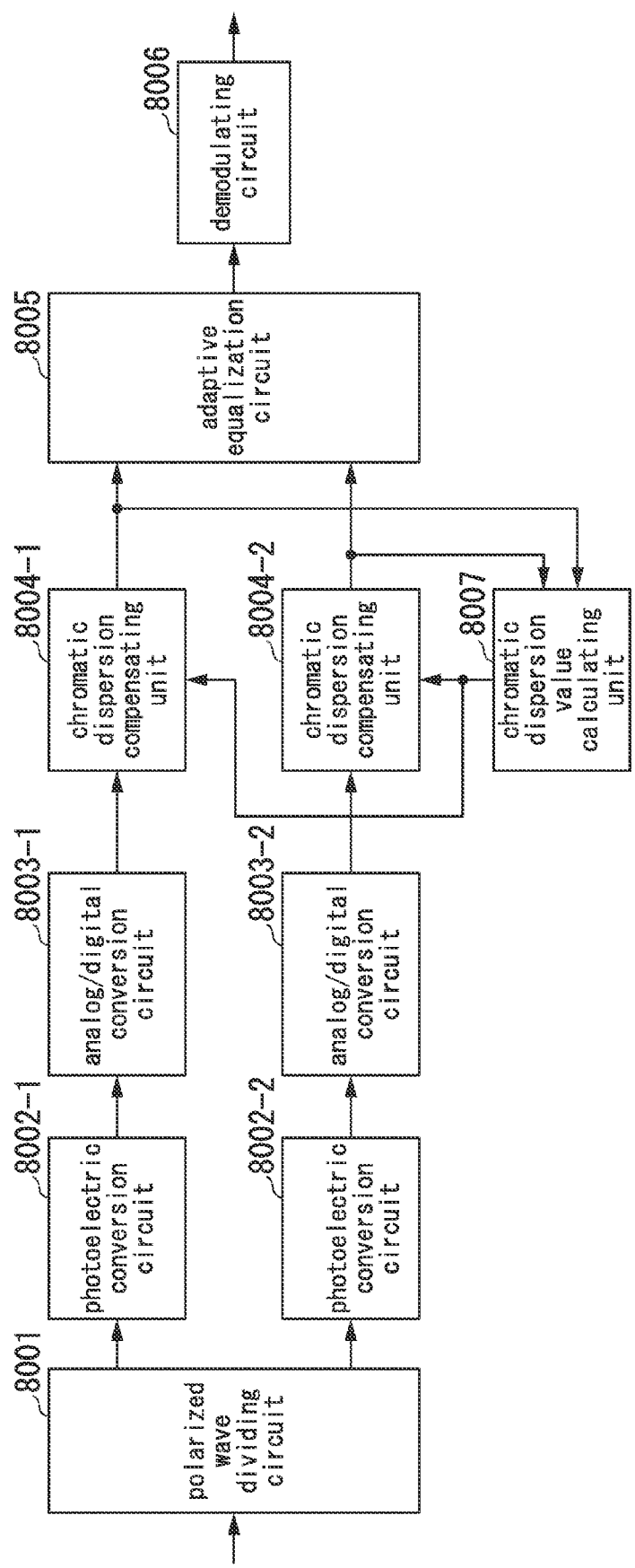
FIG. 29 is a block diagram showing an example of the configuration of an optical signal receiving apparatus in accordance with the same embodiment.

FIG. 29 shows an example of the configuration of the optical signal receiving apparatus in accordance with the fifth embodiment of the present invention. In this diagram, 8001 denotes a polarized wave dividing circuit, 8002-1 and 8002-2 denote photoelectric conversion circuits, 8003-1 and 8003-2 denote analog/digital conversion circuits, 8004-1 and 8004-2 denote chromatic dispersion compensating units, 8005 denotes an adaptive equalization circuit, 8006 denotes a demodulating circuit, and 8007 denotes a chromatic dispersion value calculating unit.

The polarized wave dividing circuit 8001 performs polarized wave division on a received optical signal in an optical domain, and outputs the divided polarized waves to the photoelectric conversion circuits 8002-1 and 8002-2. By providing, for example, a polarization-diversity 90 degree hybrid coupler and a local oscillator light source, the polarized wave dividing circuit 8001 can divide the received optical signal into two orthogonal polarized waves. Here, in order to simplify the description, the two orthogonal polarized waves are respectively called an X polarized wave and a Y polarized wave, and the X polarized wave is output to the photoelectric conversion circuit 8002-1 and the Y polarized wave is output to the photoelectric conversion circuit 8002-2.

The photoelectric conversion circuit 8002-$i$ (i=1, 2) receives the X polarized wave or the Y polarized wave of the received optical signal transmitted through an optical fiber, converts the input polarized wave into an electrical signal, and outputs the result thereof to the analog/digital conversion circuit 8003-$i$. Specifically, the photoelectric conversion circuits 8002-1 and 8002-2 use local oscillator light to separate orthogonal components from the optical electric field of the input signal light, and convert the separated components into electrical analog signals. The analog/digital conversion circuit 8003-*i* (i=1, 2) receive the electrical signals from the photoelectric conversion circuit 8002-*i* and perform an analog/digital conversion, and output the converted digital received signals. The digital received signals output from the analog/digital conversion circuit 8003-*i* (i=1, 2) are input to the chromatic dispersion compensating units 8004-*i*. The chromatic dispersion compensating units 8004-1 and 8004-2 receive the digital received signals, compensate for distortion in the signals caused by chromatic dispersion based on a chromatic dispersion value calculated by the chromatic dispersion value calculating unit 8007, and output the results thereof. The chromatic dispersion value calculating unit 8007 receives the output results of the chromatic dispersion compensating units 8004-1 and 8004-2, calculates a chromatic dispersion value, and outputs the calculated result to the chromatic dispersion compensating units 8004-1 and 8004-2 as an output value. The adaptive equalization circuit 8005 receives the digital received signals, which have been compensated by the chromatic dispersion compensating units 8004-1 and 8004-2, compensates the signals distorted due to polarization mode dispersion, at the time of transmission/reception, or on the transmission line, and outputs the result thereof. The demodulating circuit 8006 receives the digital received signals compensated by the adaptive equalization circuit 8005, demodulates the received signals, and outputs the demodulated result.

Here, the chromatic dispersion compensating units 8004-1 and 8004-2, and the adaptive equalization circuit 8005 operate with the method disclosed in Reference Document 2 below.

(Reference Document 2) R. Kudo, T. Kobayashi, K. Ishihara, Y. Takatori, A. Sano, and Y. Miyamoto, "Coherent optical single carrier transmission using overlap frequency domain equalization for long-haul optical systems," J. Lightw. Technol., vol. 27, no. 16, pp. 3721-3728, August 2009.

Moreover, it is assumed that the chromatic dispersion compensating units 8004-1 and 8004-2 set a chromatic dispersion value 0 ps/nm as an initial value, and update this value based on the chromatic dispersion value calculated by the chromatic dispersion value calculating unit 8007. Furthermore, in the configuration shown in FIG. 29, the inputs of the chromatic dispersion value calculating unit 8007 are the outputs of the chromatic dispersion compensating units 8004-1 and 8004-2; however, the outputs of the analog/digital conversion circuits 8003-1 and 8003-2 may be used as the inputs.

Figure 30:
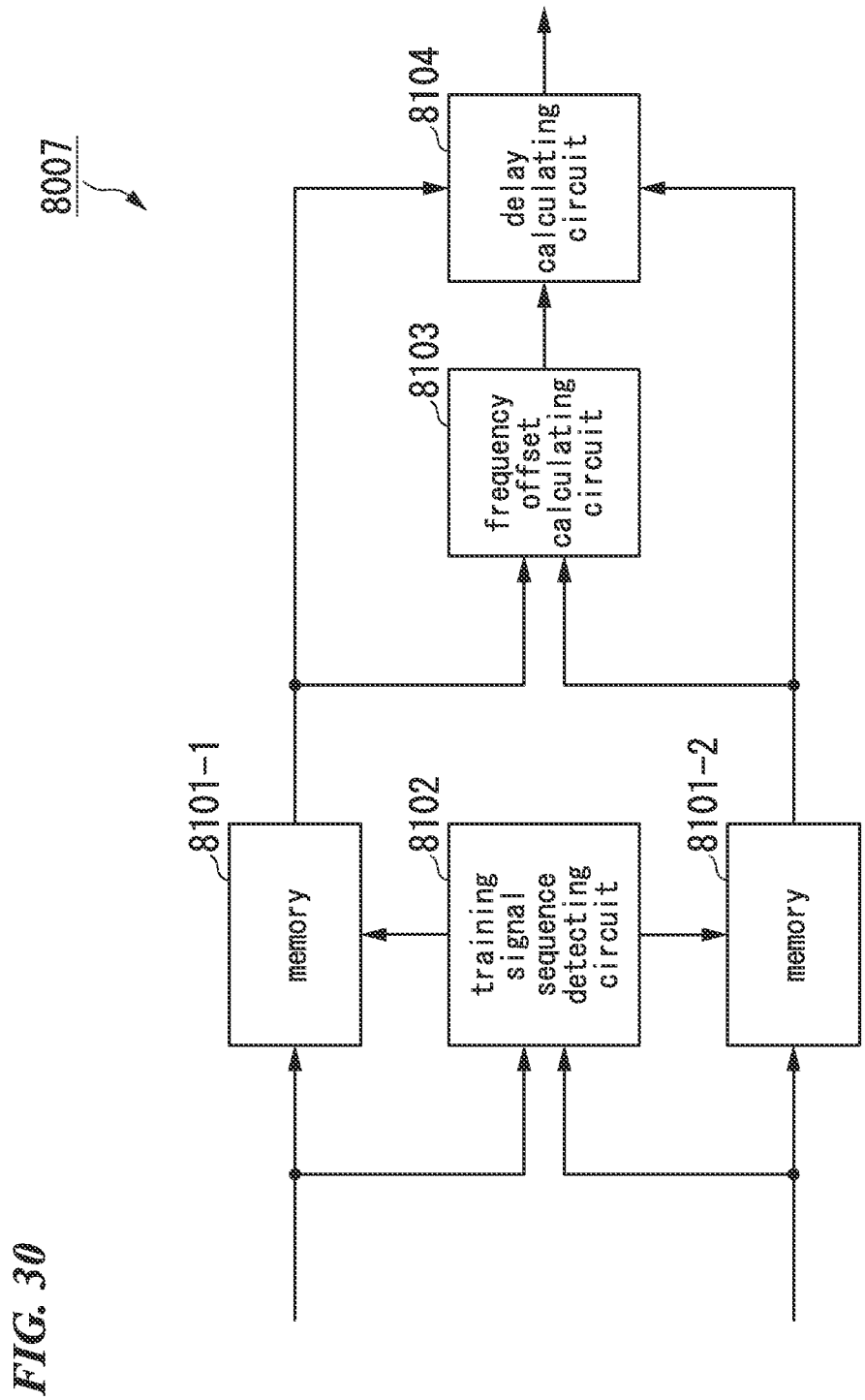
FIG. 30 is a diagram showing an example of the configuration of a chromatic dispersion value calculating unit in accordance with the same embodiment.

FIG. 30 shows an example of the configuration of the chromatic dispersion value calculating unit 8007 in accordance with the fifth embodiment of the present invention. In this diagram, 8101-1 and 8101-2 denote memories, 8102 denotes a training signal sequence detecting circuit, 8103 denotes a frequency offset calculating circuit, and 8104 denotes a delay calculating circuit.

The memory 8101-*i* (i=1, 2) receives the signal sequence of the X polarized wave or the Y polarized wave output from the chromatic dispersion compensating unit 8004-*i* as an input signal, and the memory buffers only the signal sequence of the section including the training signal sequence and the sections therebefore and thereafter based on the output of the training signal sequence detecting circuit 8102, and outputs the signal sequence. Signal sequences in the other sections are removed.

The training signal sequence detecting circuit 8102 receives the signal sequences of the X polarized wave and the Y polarized wave output from the chromatic dispersion compensating units 8004-1 and 8004-2, and detects an inserted position of the training signal sequence. Here, for example, the method for detecting the inserted position of the training signal sequence calculates the signal power of the band where the first specific frequency band signal sequence or the second specific frequency band signal sequence may exist (a band for which an influence of a frequency offset is also taken into consideration) in the section corresponding to an insertion period Ns of the training signal sequence, and detects the time at which a peak is present or a certain threshold value is exceeded as the inserted position of the training signal sequence.

Based on the inserted position of the training signal sequence detected above, the training signal sequence detecting circuit 8102 outputs a control signal to the memories 8101-1 and 8101-2 so that only the signal sequence of the section including the training signal sequence and the sections therebefore and thereafter are buffered in the memories.

The frequency offset calculating circuit 8103 receives the output signal sequences from the memories 8101-1 and 8101-2, calculates a frequency offset, and outputs the result of the frequency offset calculation to the delay calculating circuit 8104. Here, as the method for calculating the frequency offset, there is a method for finding a frequency offset by calculating the frequency offset amount of the first specific frequency band signal sequence or the second specific frequency band signal sequence. Specifically, when the first specific frequency band signal sequence shown in FIG. 27 is transmitted, the optical signal receiving apparatus essentially receives a signal sequence in which peak power values of the frequency spectrum are present at ±6.25 GHz as shown in FIG. 27. However, when a frequency offset is present, peak values are present at ±6.25 GHz+$\Delta f$, and thus the frequency offset can be calculated by calculating the difference $\Delta f$ from the detected peak values.

The delay calculating circuit 8104 receives the outputs from the memories 8101-1 and 8101-2 and the frequency offset calculating circuit 8103 and calculates a delay.

Figure 31:
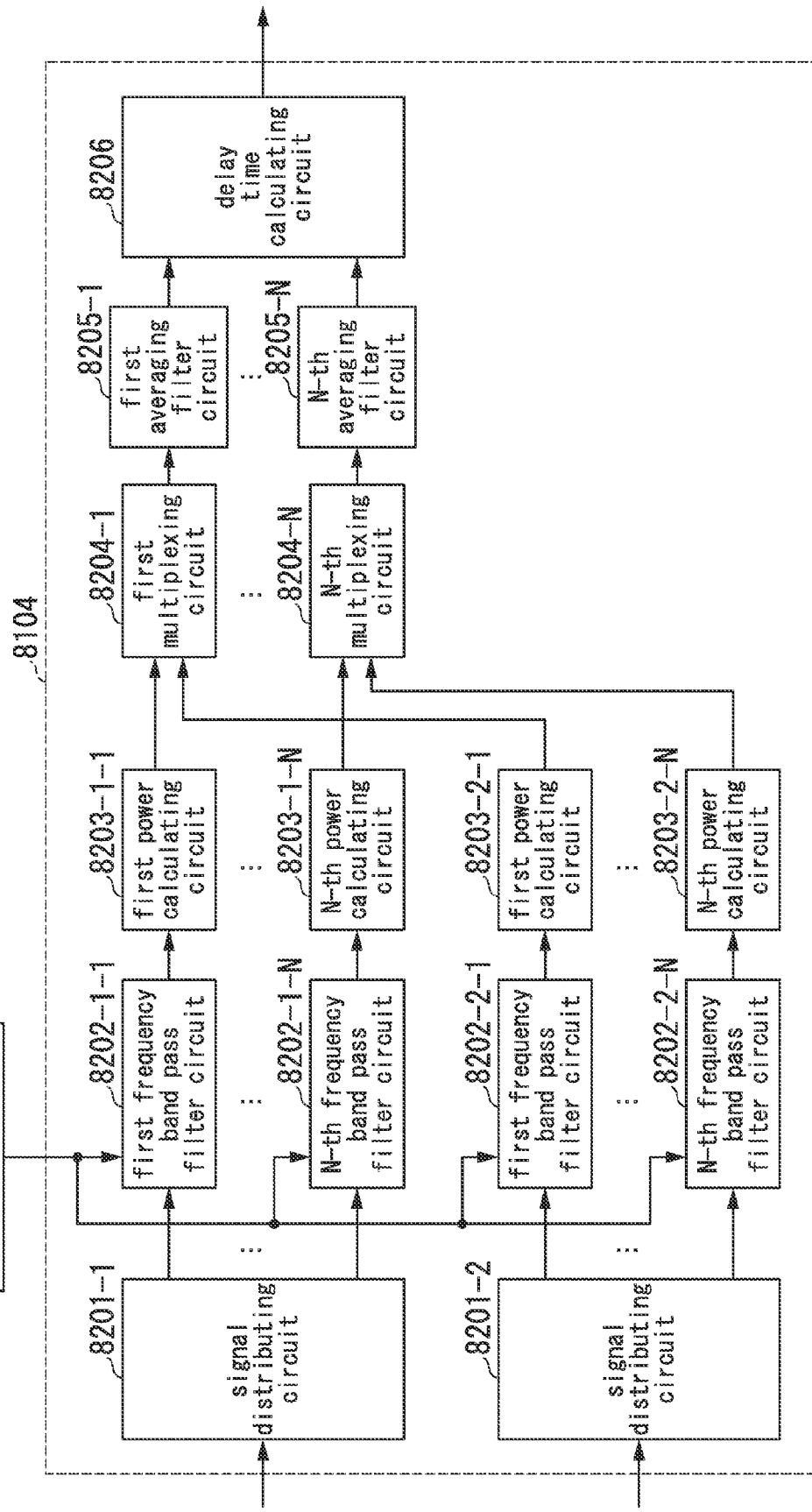
FIG. 31 is a diagram showing an example of the configuration of a delay calculating circuit in accordance with the same embodiment.

FIG. 31 shows an example of the configuration of the delay calculating circuit 8104 in accordance with the fifth embodiment. In this diagram, 8201-1 and 8201-2 denote signal distributing circuits, 8202-1-*n* and 8202-2-*n* ($1 \leq n \leq N$, $N \geq 2$) denote n-th frequency band pass filter circuits, 8203-1-*n* and 8203-2-*n* ($1 \leq n \leq N$, $N \geq 2$) denote n-th power calculating circuits, 8204-*n* ($1 \leq n \leq N$, $N \geq 2$) denotes an n-th multiplexing circuit, 8205-*n* ($1 \leq n \leq N$, $N \geq 2$) denotes an n-th averaging filter circuit, and 8206 denotes a delay time calculating circuit.

The signal distributing circuit 8201-1 receives the X polarized wave of the chromatic dispersion compensating unit 8004-1 as an input signal, branches this input signal to N same sequences, and outputs the result to the n-th frequency band pass filter circuit 8202-1-*n* ($1 \leq n \leq N$, $N \geq 2$). The signal distributing circuit 8201-2 receives the Y polarized wave of the chromatic dispersion compensating unit 8004-2 as an input signal, branches this input signal to N same sequences, and outputs the result to the n-th frequency band pass filter circuit 8202-2-*n* ($1 \leq n \leq N$, $N \geq 2$). The n-th frequency band pass filter circuit 8202-1-*n* ($1 \leq n \leq N$, $N \geq 2$) compensates the X polarized wave, which is an output signal from the signal distributing circuit 8201-1, for a frequency offset based on the frequency offset calculated by the frequency offset calculating circuit 8103, then allows a specific frequency signal to pass using a similar frequency band pass filter, and outputs the result thereof. The n-th frequency band pass filter circuit 8202-2-*n* ($1 \leq n \leq N$, $N \geq 2$) compensates the Y polarized wave, which is an output signal from the signal distributing circuit 8201-2, for a frequency offset based on the frequency offset calculated by the frequency offset calculating circuit 8103, then allows a specific frequency signal to pass using a similar frequency band pass filter, and outputs the result thereof. Alternatively, the n-th frequency band pass filter circuits 8202-1-$n$ and 8202-2-$n$ ($1 \leq n \leq N$, $N \geq 2$) shift the center frequency of the frequency band pass filters in accordance with the value of the frequency offset calculated by the frequency offset calculating circuit 8103, then allow the X polarized wave and the Y polarized wave to pass, and output the result thereof. It is to be noted that the filter circuits of the n-th frequency band pass filter circuits 8202-1-$n$ and 8202-2-$n$ ($1 \leq n \leq N$, $N \geq 2$) are filter circuits which allow the same frequency band to pass, and the frequency band pass filters are set so as to include part or all of specific frequency band signals of frequency bands that are different for the respective sequences n.

The n-th power calculating circuit 8203-1-$n$ ($1 \leq n \leq N$, $N \geq 2$) calculates a power value or the absolute value of the amplitude for each sample of the sequence of the X polarized wave output from the n-th frequency band pass filter circuit 8202-1-$n$, and outputs the result thereof to the n-th multiplexing circuit 8204-$n$. The n-th power calculating circuit 8203-2-$n$ ($1 \leq n \leq N$, $N \geq 2$) calculates a power value or the absolute value of the amplitude for each sample of the sequence of the Y polarized wave output from the n-th frequency band pass filter circuit 8202-2-$n$, and outputs the result thereof to the n-th multiplexing circuit 8204-$n$.

The n-th multiplexing circuit 8204-$n$ ($1 \leq n \leq N$, $N \geq 2$) performs synthesis on the signal sequences of the power values of the X polarized wave and the Y polarized wave output from the n-th power calculating circuits 8203-1-$n$ and 8203-2-$n$, and outputs the result. For example, when m-th (m is a time-series index) inputs of the n-th multiplexing circuit 8204-$n$ are $x_n(m)$ and $y_n(m)$, the output is $ax_n(m)+by_n(m)$. Here, a and b are arbitrary real numbers greater than 0, and it is possible to change the ratio of multiplexing the power values of the X polarized wave and the Y polarized wave output from the n-th power calculating circuits 8203-1-$n$ and 8203-2-$n$ by changing a and b in accordance with information on noise, interference, or the like. Moreover, since it may be considered that there is a delay difference between the X polarized wave and the Y polarized wave due to the influence on the transmission line and in the circuits, multiplexing may be performed after shifting it by q (q is an integer) samples. In this case, the output value is $ax_n(m)+by_n(m-q)$. As a method for determining q, the optical signal receiving apparatus may be separately provided with a timing detecting circuit and a skew adjusting circuit, and q may be determined from the timing difference calculated therein. Alternatively, q may be adjusted so that the output values of the n-th power calculating circuits 8203-1-$n$ and 8203-2-1-$n$ exceeds a threshold value or they become maximum at the same time in a constant section.

N sequences multiplexed by the n-th multiplexing circuit 8204-$n$ ($1 \leq n \leq N$, $N \geq 2$) are input as input values to the n-th averaging filter circuit 8205-$n$, and the n-th averaging filter circuit 8205-$n$ performs averaging by summing Q consecutive signals for each input sequence as shown in the following equation.

[Equation 5]

$$s'_n(m') = \sum_{m=m'}^{m'+Q-1} s_n(m) \quad \text{(Equation 5)}$$

Here, $s_n(m)$ represents an output signal of the n-th multiplexing circuit 8204-$n$ at time m, and $s'_n(m')$ represents an output signal of the n-th averaging filter circuit 8205-$n$ ($1 \leq n \leq N$, $N \geq 2$). With use of the averaging filters, noise and interference can be reduced. Moreover, a value obtained by multiplying the number of the signals by the number of oversampling), the rectangular wave output from the n-th multiplexing circuit 8204-$n$ ($1 \leq n \leq N$, $N \geq 2$) can be converted into a triangle wave by setting Q so as to be equal to the number of signals of the first specific frequency band signal sequences (when oversampling is performed, and it becomes easier to detect a peak value in the delay time calculating circuit 8206.

The delay time calculating circuit 8206 detects a sample time $T_n$ at which the maximum value (a peak value) of power is obtained from each of the sequences output from the N n-th averaging circuit 8205-$n$ ($1 \leq n \leq N$, $N \geq 2$), calculates the time difference between the peak values or a chromatic dispersion value obtained from the value thereof, and outputs the result.

Here, N denotes the number of frequency spectra of a first specific frequency band signal transmitted from the optical signal transmitting apparatus. For example, when signals are present in two specific frequency bands as shown in FIG. 27, N can be calculated as N=2. However, N is not limited to the above as long as N is greater than or equal to 2.

When a chromatic dispersion value D' is calculated by the delay time calculating circuit 8206, the chromatic dispersion value D' can be calculated as illustrated with the following (equation 6), using the time difference $\tau_{k-h}$ between time $T_k$ at the peak value of the output sequence of the k-th averaging filter circuit 8205-$k$ and time $T_h$ at the peak value of the output sequence of the h-th averaging filter circuit 8205-$h$ ($1 \leq h \leq N$, $1 \leq k \leq N$, $h \neq k$).

[Equation 6]

$$D' = \frac{c\tau_{k-h}}{\lambda^2 B_{k-h}} = \frac{c(T_k - T_h)}{\lambda^2 B_{k-h}} \quad \text{(Equation 6)}$$

Here, c represents the speed of light, $\lambda$ represents the center wavelength of a transmission signal, and $B_{k-h}$ represents the bandwidth between the center wavelength of the k-th frequency band pass filter circuit 8202-1-$k$ (or 8202-2-$k$) and the center wavelength of the h-th frequency band pass filter circuit 8202-1-$h$ (or 8202-2-h). Here, it is assumed that the h-th frequency band pass filter circuit 8202-1-$h$ (or 8202-2-h) is a band pass filter having a frequency band higher than that of the k-th frequency band pass filter circuit 8202-1-$k$ (or 8202-2-$k$).

The delay time calculating circuit 8206 can calculate one up to N (N−1)/2 delay times using N sequences input from the N n-th averaging filter circuits 8205-$n$ ($1 \leq n \leq N$, $N \geq 2$), and outputs a value selected from these delay times, the average of these calculated delay times, or a chromatic dispersion value calculated from the value thereof as an output value to the chromatic dispersion compensating units 8004-1 and 8004-2. It is to be noted that in reality, the chromatic dispersion value to be output may be a value of (Equation 6) without $\lambda^2$ (that is, it does not have to be divided by $\lambda^2$). This is because, as described below, $\lambda^2$ will be canceled out and lost in (Equation 6) as it will be multiplied by $\lambda^2$ when substituting a calculated chromatic dispersion value for a weight W ($\omega$) of each frequency $\omega$ used in the chromatic dispersion compensating units 8004-1 and 8004-2. That is to say, in reality, it is possible to calculate a chromatic dispersion compensation weight regardless of $\lambda^2$.

[Equation 7]

$$W(\omega) = \exp\left(-j\frac{\lambda^2}{2\pi c}D'\omega^2\right) \quad \text{(Equation 7)}$$

Here, D' represents the calculated chromatic dispersion value.

In the optical signal receiving apparatus of the fifth embodiment, the polarized wave dividing circuit divides the received optical signal into two sequences of X and Y polarized waves, and the optical signal receiving apparatus is provided with two photoelectric conversion circuits, two analog/digital conversion circuits, two chromatic dispersion compensating units, two signal distributing circuits, two sets of n-th frequency band pass filter circuits ($1 \leq n \leq N$, $N \geq 2$), and two sets of n-th power calculating circuits ($1 \leq n \leq N$, $N \geq 2$) in accordance with the number of divided sequences; however, signal processing may be performed using only either one of the X polarized wave and the Y polarized wave. In this case, the above circuits only need to be provided for a single sequence, and the n-th multiplexing circuits ($1 \leq n \leq N$, $N \geq 2$) are not required. Moreover, when the signal distributing circuit distributes the input signal into three or more sequences, it is sufficient that the above circuits are provided for the number of distributed sequences, and multiplexing is performed with the n-th multiplexing circuit ($1 \leq n \leq N$, $N \geq 2$).

The delay calculating circuit 8104 in the fifth embodiment is provided with the averaging filters on the subsequent stage of the multiplexing circuits; however, this order may be reversed. In this case, it is sufficient that 2N n-th averaging filter circuits are provided so as to correspond to the n-th power calculating circuits 8203-1-1 to 8203-1-N, and 8203-2-1 to 8203-2-N, and averaging filtering is performed on the output of each n-th power calculating circuit, and then outputs of the n-th averaging filter circuits corresponding to the same frequency band (sequence) are multiplexed with a multiplexing circuit.

It is to be noted that the memories 8101-1 and 8101-2, the training signal sequence detecting circuit 8102, and the frequency offset calculating circuit 8103 are not always required. For example, when detection of a training signal sequence and calculation of a frequency offset can be executed with external functions of the chromatic dispersion value calculating unit 8007, the detected value and the calculated value may be used; alternatively, when these values are preliminarily known, they can also be set manually. When the memories 8101-1 and 8101-2 and the training signal sequence detecting circuit 8102 are not provided, the frequency offset calculating circuit 8103 receives the signal sequences of the X and Y polarized waves output from the chromatic dispersion compensating units 8004-1 and 8004-2 and calculates a frequency offset.

Here, with reference to FIG. 31, an example of a reception operation will be described when the first specific frequency band signal sequence and the second specific frequency band signal sequence shown in FIG. 27 and FIG. 28 are time-division multiplexed, as a training signal sequence, with a transmission signal. It is to be noted that it is assumed that N is 2.

Figure 32:
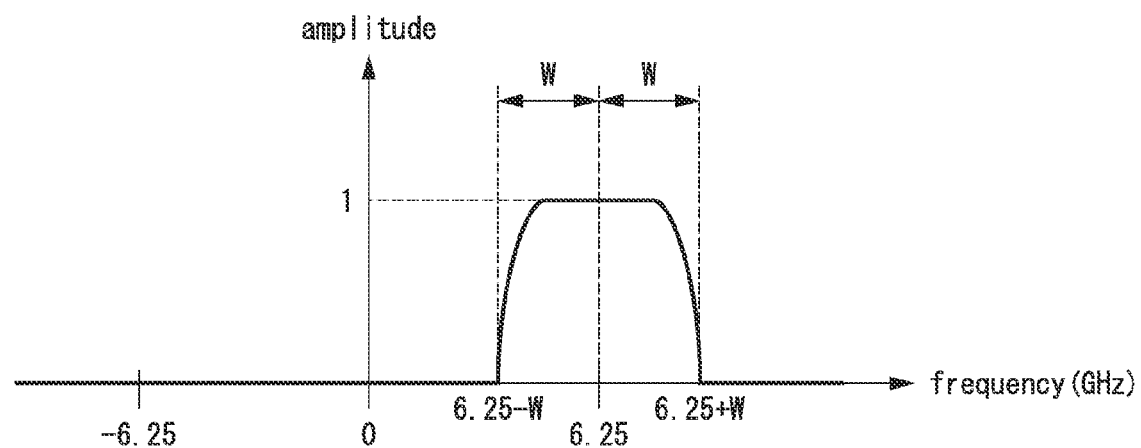
FIG. 32 is a diagram showing an example of a band pass filter in a first frequency band pass filter circuit in accordance with the same embodiment.
Figure 33:
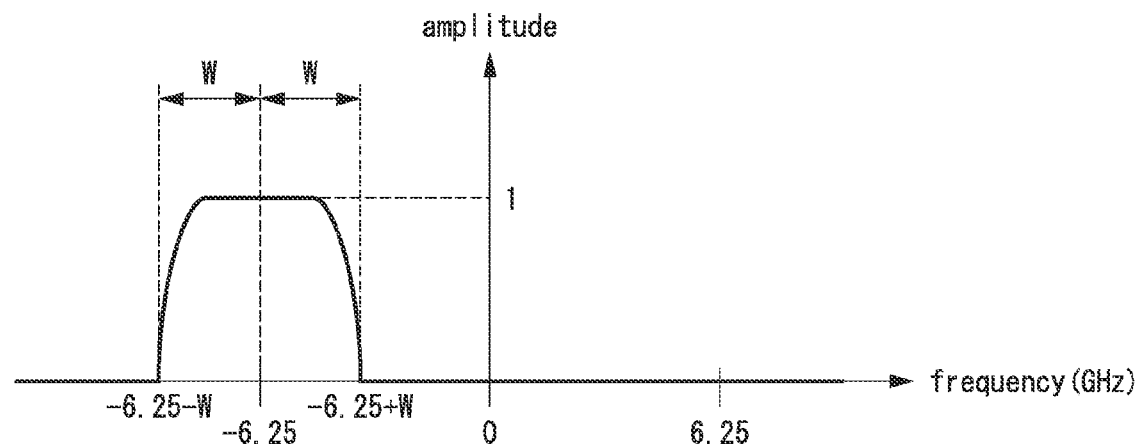
FIG. 33 is a diagram showing an example of a band pass filter in a second frequency band pass filter circuit in accordance with the same embodiment.

In FIG. 31, first, each of the signal distributing circuit 8201-1 and 8201-2 distributes a digital received signal received by a receiver (not shown in the diagram) in the optical signal receiving apparatus into two sequences. Next, in order to obtain 6.25 GHz signals on the high frequency side in the X polarized wave and the Y polarized wave, as shown in FIG. 32, the first frequency band pass filter circuit 8202-1-1 and 8202-2-1 limit the band using a band pass filter having a bandwidth 2W, the passing band of which is (6.25−W) GHz to (6.25+W) GHz, and outputs the result thereof. Similarly, in order to obtain −6.25 GHz signals on the low frequency side in the X polarized wave and the Y polarized wave, as shown in FIG. 33, the second frequency band pass filter circuit 8202-1-2 and 8202-2-2 limit the band using a band pass filter having a bandwidth 2W, the passing band of which is (−6.25−W) GHz to (−6.25+W) GHz, and outputs the result thereof.

Here, W is an arbitrary value greater than 0. By increasing W, the operation can still be performed even if the received specific frequency signals shift from the center frequency due to a frequency offset, a phase offset, or the like. Conversely, estimation accuracy can be improved by decreasing W because components other than the specific frequency band signals such as noise and interference components can be reduced. Moreover, by setting W so that the frequency component of the second specific frequency band signal sequence will not be included, the time signals immediately before and immediately after the first specific frequency band signal sequence can be removed, and the level of accuracy in calculating the chromatic dispersion value is improved.

The first power calculating circuit 8203-1-1 calculates a power value or the absolute value of amplitude for each sample of the signal sequence of the output result of the first frequency band pass filter circuit 8202-1-1, and outputs the result thereof to the first multiplexing circuit 8204-1. The first power calculating circuit 8203-2-1 calculates a power value or the absolute value of amplitude for each sample of the signal sequence of the output result of the first frequency band pass filter circuit 8202-2-1, and outputs the result thereof to the first multiplexing circuit 8204-1. Here, when the input signals of the first power calculating circuits 8203-1-1 and 8203-2-1 at an m sample time are a(m), the output values are $|a(m)|^2$ or $|a(m)|$. Here, $|x|$ shows the absolute value of a complex number x.

Similarly, the second power calculating circuit 8203-1-2 calculates a power value for each sample of the signal sequence of the output result of the second frequency band pass filter circuit 8202-1-2, and outputs the result thereof to the second multiplexing circuit 8204-2. The second power calculating circuit 8203-2-2 calculates a power value for each sample of the signal sequence of the output result of the second frequency band pass filter circuit 8202-2-2, and outputs the result thereof to the second multiplexing circuit 8204-2.

The first multiplexing circuit 8204-1 receives the sequences output from the first power calculating circuits 8203-1-1 and 8203-2-1, performs multiplexing, and outputs the result thereof. Similarly, the second multiplexing circuit 8204-2 receives the sequences output from the second power calculating circuits 8203-1-2 and 8203-2-2, performs multiplexing, and outputs the result thereof.

The first averaging filter circuit 8205-1 receives the sequence output from the first multiplexing circuit 8204-1, performs averaging, and outputs the result thereof. Similarly, the second averaging filter circuit 8205-2 receives the sequence output from the second multiplexing circuit 8204-2, performs averaging, and outputs the result thereof.

Figure 34:
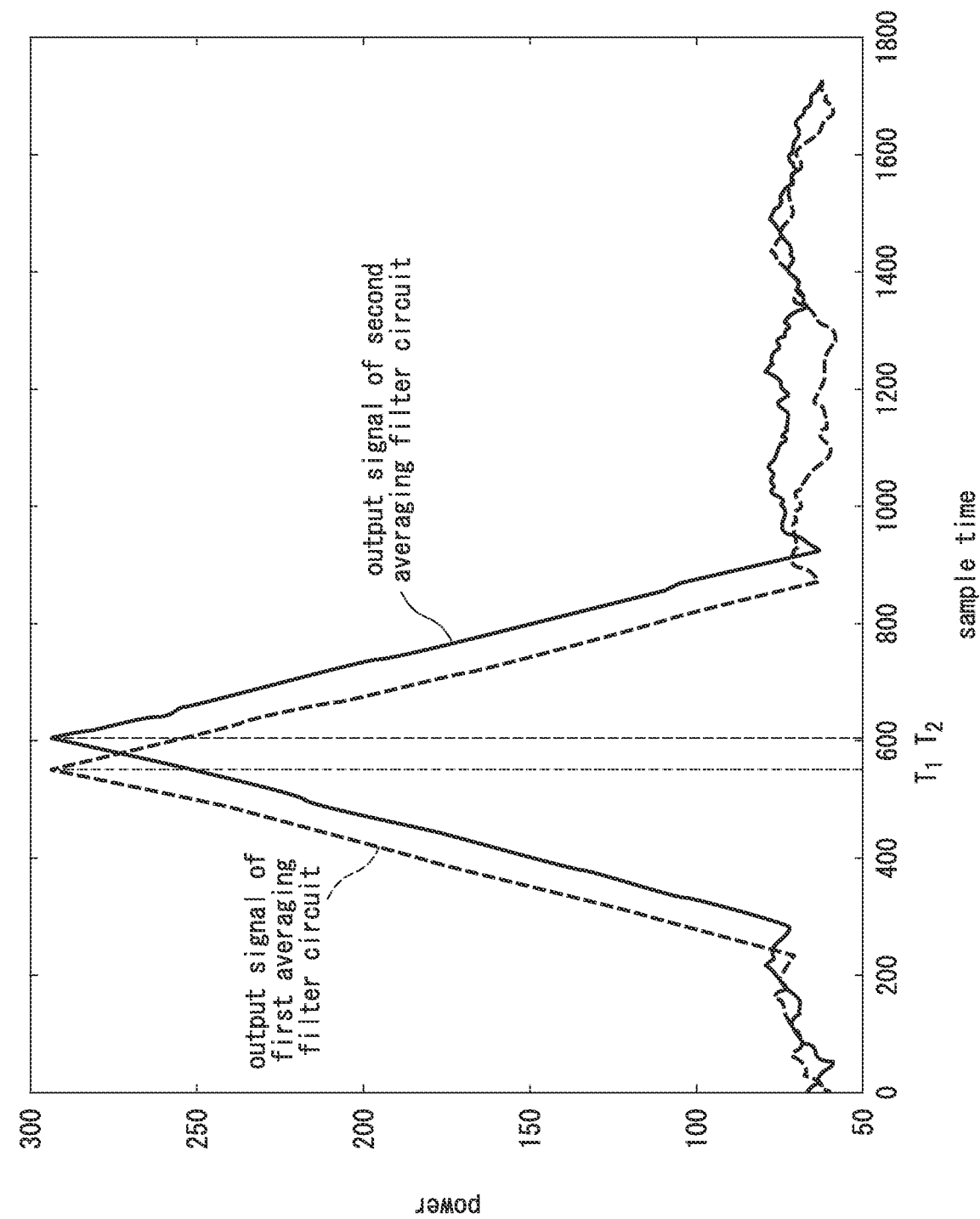
FIG. 34 is a diagram showing output results of a first averaging filter circuit and a second averaging filter circuit in accordance with the same embodiment.

FIG. 34 is a diagram showing output results of the first averaging filter circuit 8205-1 and the second averaging filter circuit 8205-2. The delay time calculating circuit 8206 receives the sequences output from the first averaging filter circuit 8205-1 and the second averaging filter circuit 8205-2, detects sample times $T_1$ and $T_2$ where power takes its maximum value in each sequence as shown in FIG. 34, and calculates the time difference $\tau_{2-1} = T_2 - T_1$. Moreover, it is also possible to calculate a chromatic dispersion value D' based on (Equation 6), using the above time difference $\tau_{2-1}$.

In the manner described above, a chromatic dispersion value can be calculated using the first specific frequency band signal sequence. It is to be noted that by inserting the second specific frequency band signal sequence with the power concentrating only in specific frequencies different from those of the first specific frequency band signal sequence as the training signal sequence before and after the first specific frequency band signal sequence, the transmission signal sequences before and after the training signal sequence is prevented from interfering with the frequency band used by the first specific frequency band signal sequence. As a result, peaks clearly emerge in the power value as shown in FIG. 34, and it is possible to accurately detect the sample times $T_1$ and $T_2$ when the power takes its maximum value. Moreover, as mentioned above, since the second specific frequency band signal sequence is removed by the n-th frequency band pass filter circuits 8202-1-1, 8202-1-2, 8202-2-1, and 8202-2-2, when calculating the delay time difference, signals of the second specific frequency band signal sequence immediately before and immediately after the first specific frequency band signal sequence are removed, and only the first specific frequency can be extracted. As a result, the level of accuracy in estimating the chromatic dispersion is improved.

As the band pass filters of the n-th frequency band pass filter circuits 8202-1-$n$ and 8202-2-$n$ described above, a generic band pass filter such as a rectangular filer, a Nyquist filter, a Hanning window, a Kaiser window, and a Hamming window may be used. Furthermore, the speed of calculation can be increased by performing filtering with a band pass filter in the frequency domain after converting a signal sequence into a signal in the frequency domain by means of fast Fourier transform (FFT) or discrete Fourier transform (DFT) when using a frequency band pass filter, and converting the signal of the frequency domain obtained by the filtering into a signal in the time domain by means of inverse fast Fourier transform (IFFT) or inverse discrete Fourier transform (IDFT).

The n-th averaging filter circuit 8205-$n$ described above can reduce estimation errors caused by noise and interference components by summing and outputting Q consecutive signal sequences; however, another method may be used. For example, it is possible to increase the level of accuracy by calculating an expected value using the power and time in the vicinity of the maximum value.

The delay time calculating circuit 8206 mentioned above uses sample times at which the power takes the maximum value; however, an arbitrary threshold value may be set, and the time at which this threshold value is exceeded, the time at which the value falls below the threshold value after exceeding the threshold value, or both of these times may be used. In this case, there is a method such that time positions where X % of the peak is observed are compared between the high frequency component and the low frequency component, and the time difference therebetween is measured.

Moreover, signal components that pass through the band pass filter also includes signals other than alternating signals, interference components, and noise components. This is because a data signal includes a component within the passing band of the band pass filter, and the optical noise includes a component within the passing band of the band pass filter. Therefore, the noise floor in a region where there is no peak value (a region of a data signal) and a peak may be detected, and with the noise floor taken as a reference, the time position where it rises to X % of the peak and the time position where it falls to X % of the peak for a high frequency component may be compared with those for a low frequency component, to thereby detect a delay time.

Moreover, the delay time calculating circuit 8206 may calculate a plurality of delay times using a plurality of received signals including a training signal sequence in each period Ns, and may output the average value thereof as an output value. By doing so, noise and interference components can be reduced, and the level of accuracy is improved. Furthermore, it is also possible to calculate the delay time by calculating expected values of the times where peak values occur, using the values of both power and time.

As the second specific frequency band signal sequence, the training signal sequence configuration above uses a signal sequence in which the power of the frequency spectrum of the second specific frequency band signal sequence is concentrating in a frequency band different from the bands where the power of the frequency spectrum of the first specific frequency band signal sequence is concentrating. However, alternatively, no signal may be transmitted in the section where the second specific frequency band signal sequence is to be inserted or a signal with extremely small power compared to the signal power of the first specific frequency band signals may be transmitted.

Moreover, since the first specific frequency band signal is used for estimating chromatic dispersion, a signal with the power concentrating in two or more specific frequencies is used therefor. In contrast, since the second specific frequency band signal sequence does not always have to be a signal with the power concentrating in two or more frequency bands different from the frequency of the first specific frequency band signal, a signal sequence including only a DC (direct current) component (a component having only frequency zero) may be transmitted as the second specific frequency band signal. For example, it is possible to generate signals which have only a DC component by consecutively transmitting (S, S).

Furthermore, as shown in FIG. 26, in the training signal sequence configuration above, the same second specific frequency band signal sequences are inserted immediately before and immediately after the first specific frequency band signal sequence; however, different sequences may be used for immediately therebefore and immediately thereafter. In this case, it is sufficient that a signal sequence with the power of the frequency spectrum concentrating in the frequency bands different from the band with concentrated power in the frequency spectrum of the first specific frequency band signal sequence is used.

For example, when alternating signals of QPSK signals (S, S) and (−S, −S) shown in FIG. 27 are used as the first specific frequency band signal sequence, and a signal sequence in which a single signal is repeated twice, such as QPSK signals (S, S), (S, S), (−S, −S), (−S, −S), (S, S), . . . , (S, S), (S, S), (−S, −S), (−S, −S) as shown in FIG. 28, is used as the signal sequence immediately before the first specific frequency band signal sequence, a signal sequence of a phase opposite thereto, such as QPSK signals (−S, −S), (−S, −S), (S, S), (S, S), (−S, −S), . . . , (−S, −S), (−S, −S), (S, S), (S, S), may be used as the signal sequence immediately after the first specific frequency band signal sequence. By doing so, the frequency spectra of the signals immediately before and immediately after the first specific frequency band signal sequence mutually cancel out in the frequency domain, and therefore it is possible to reduce the level of influence on the first specific frequency band signal sequence.

Moreover, as an example, the above fifth embodiment assumes a case where a training signal sequence is generated with an alternating signal of QPSK signals (S, S) and (−S, −S) taken as a first specific frequency band signal sequence, and with a signal sequence in which a single signal is repeated twice, such as QPSK signals (S, S), (S, S), (−S, −S), (−S, −S), (S, S), . . . , (S, S), (S, S), (−S, −S), (−S, −S), taken as a second specific frequency band signal sequence. However, by displacing the phase of the first specific frequency band signal sequence from the phase of the second specific frequency band signal sequence, it is possible to reduce interference between both signals. For example, when alternating signals of QPSK signals (S, S) and (−S, −S) are used as the first specific frequency band signal sequence, alternating signals in which the phase thereof is shifted by $\pi/2$ with respect to the alternating signals of the first specific frequency band signal sequence, such as QPSK signals (S, −S), (S, −S), (−S, S), (−S, S), (S, −S) . . . , (S, −S), (S, −S), (−S, S), (−S, S), are used as the second specific frequency band signal sequence.

The fifth embodiment does not particularly mention restrictions on the frequency interval between the first specific frequency band signal sequence and the second specific frequency band signal sequence. However, as the second specific frequency band signal sequence, a signal sequence may be used that has power of the frequency spectrum concentrating in a portion that is apart from the band where power of the frequency spectrum of the first specific frequency band signal sequence is concentrating by a predetermined value F or more. By doing so, it is possible to prevent the second specific frequency band signal sequence from being erroneously detected as the first specific frequency band signal sequence due to the influence of a frequency offset or the like.

It is to be noted that the above description uses the training signal sequence generating circuit 7104, which generates two different specific frequency band signal sequences and uses them as a training signal; however, it is also possible to use three or more different specific frequency band signal sequences. Furthermore, in addition to the two different specific frequency band signal sequences, a known signal may be added and it may be inserted as a training signal.

Sixth Embodiment

Next, a sixth embodiment of the present invention will be described. Here, the difference from the fifth embodiment is described.

Figure 35:
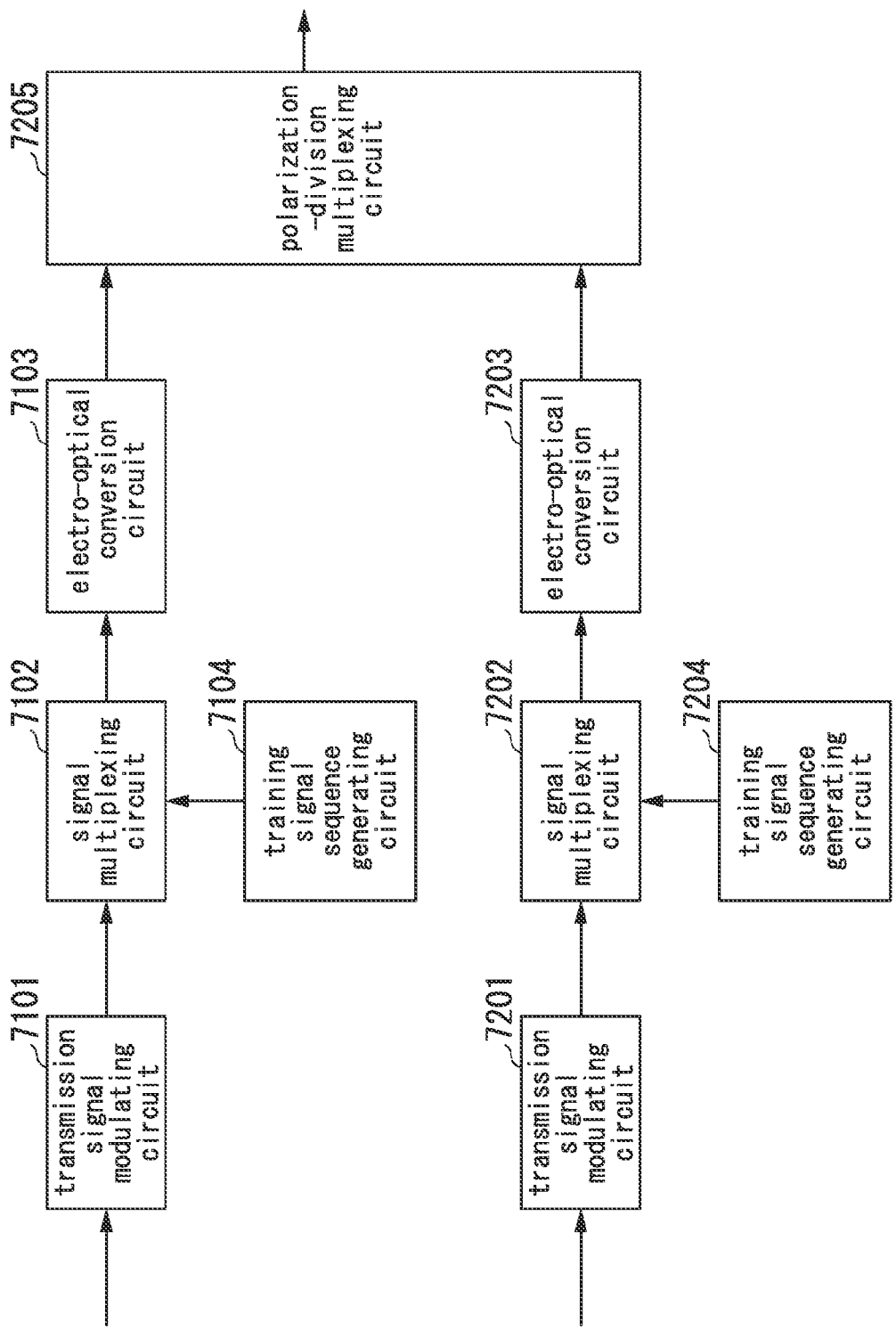
FIG. 35 is a block diagram showing an example of the configuration of an optical signal transmitting apparatus in accordance with a sixth embodiment of the present invention.

FIG. 35 shows an example of the configuration of an optical signal transmitting apparatus in accordance with the sixth embodiment of the present invention. This diagram differs from the optical signal transmitting apparatus of the fifth embodiment in that a transmission signal modulating circuit 7201, a signal multiplexing circuit 7202, an electro-optical conversion circuit 7203, a training signal sequence generating circuit 7204, and a polarization-division multiplexing circuit 7205 are added for polarization-division multiplexing.

The transmission signal modulating circuit 7201, the signal multiplexing circuit 7202, the electro-optical conversion circuit 7203, and the training signal sequence generating circuit 7204 respectively perform operations similar to those of the transmission signal modulating circuit 7101, the signal multiplexing circuit 7102, the electro-optical conversion circuit 7103, and the training signal sequence generating circuit 7104, and optical transmission signals are generated using data signal sequences to be polarization-division multiplexed. However, the training signal sequence generating circuits 7104 and 7204 may be shared between polarized waves. Moreover, the training signal sequence generating circuits 7104 and 7204 may generate and transmit signals in which part or all of their sequences are different between polarized waves, or they may generate and multiplex the same signals. When multiplexing the same training signal sequences, a single training signal sequence generating circuit may be shared instead of providing the training signal sequence generating circuits 7104 and 7204. By the sharing, the optical signal transmitting apparatus transmits the same specific frequency band signals with two orthogonal polarized waves, and the optical receiving apparatus can calculate a chromatic dispersion value even for signals which do not undergo polarization splitting.

Figure 36:
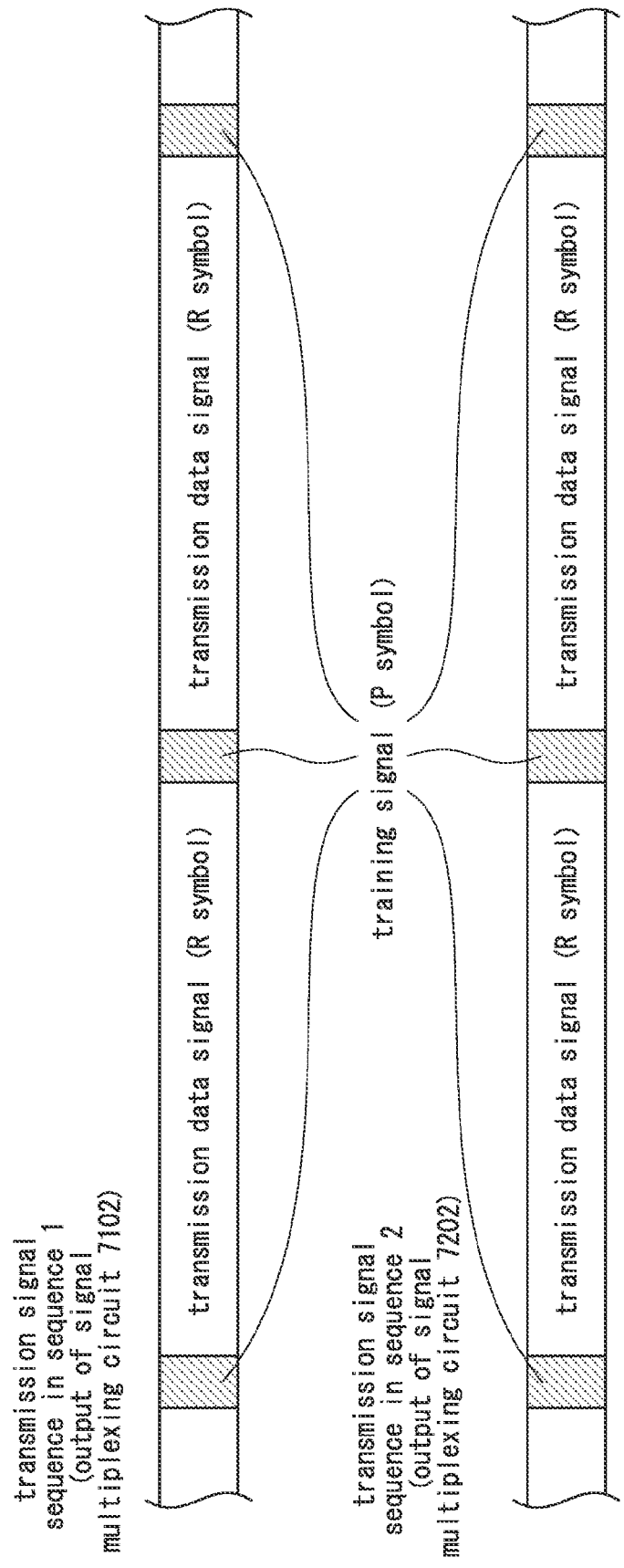
FIG. 36 is a diagram showing a frame format of a transmission signal in accordance with the same embodiment.

As an example, FIG. 36 shows a frame format when time-division multiplexing the same specific frequency band signals and data signals, and transmitting them. As shown in the diagram, with respect to each of two sequences, a training signal of P symbols is inserted for each transmission data signal of R symbols. The training signals may all use the same sequences, or they may be different for respective sequences. Moreover, the signals may be transmitted on different polarization planes for respective sequences. By transmitting training signals on different polarization planes, even if a polarization rotation occurs on the transmission line, the receiving side can still receive at least either one of the signals.

The signals to be transmitted with two polarized waves generated by the electro-optical conversion circuits 7103 and 7203 are polarization-division multiplexed by the polarization-division multiplexing circuit 7205, and the multiplexed signal is transmitted as a transmission signal.

Figure 37:
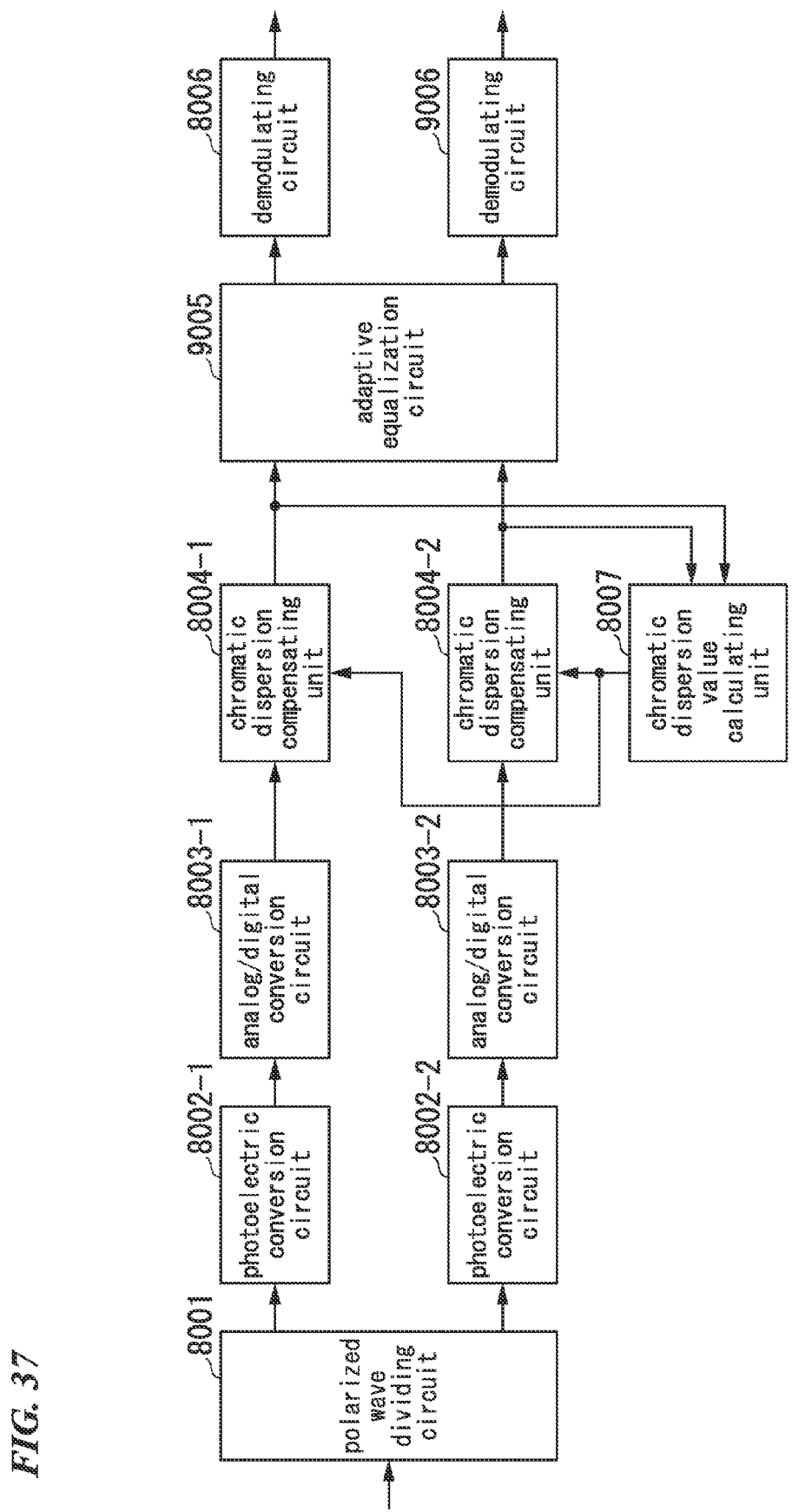
FIG. 37 is a block diagram showing an example of the configuration of an optical signal receiving apparatus in accordance with the same embodiment.

FIG. 37 shows an example of the configuration of an optical signal receiving apparatus in accordance with the sixth embodiment of the present invention. This diagram differs from the optical signal receiving apparatus of the fifth embodiment in that a demodulating circuit 9006 is further provided, and an adaptive equalization circuit 9005 is provided instead of the adaptive equalization circuit 8005.

The adaptive equalization circuit 9005 separates the polarization-division multiplexed signals, and outputs signal sequences of the respective polarized waves to the demodulating circuits 8006 and 9006, respectively. Moreover, the two demodulating circuits 8006 and 9006 demodulate the signal sequences of the polarized waves respectively input thereto from the adaptive equalization circuit 9005.

Hereinafter, advantageous effects of the fifth and sixth embodiments of the present invention will be described.

Figure 38:
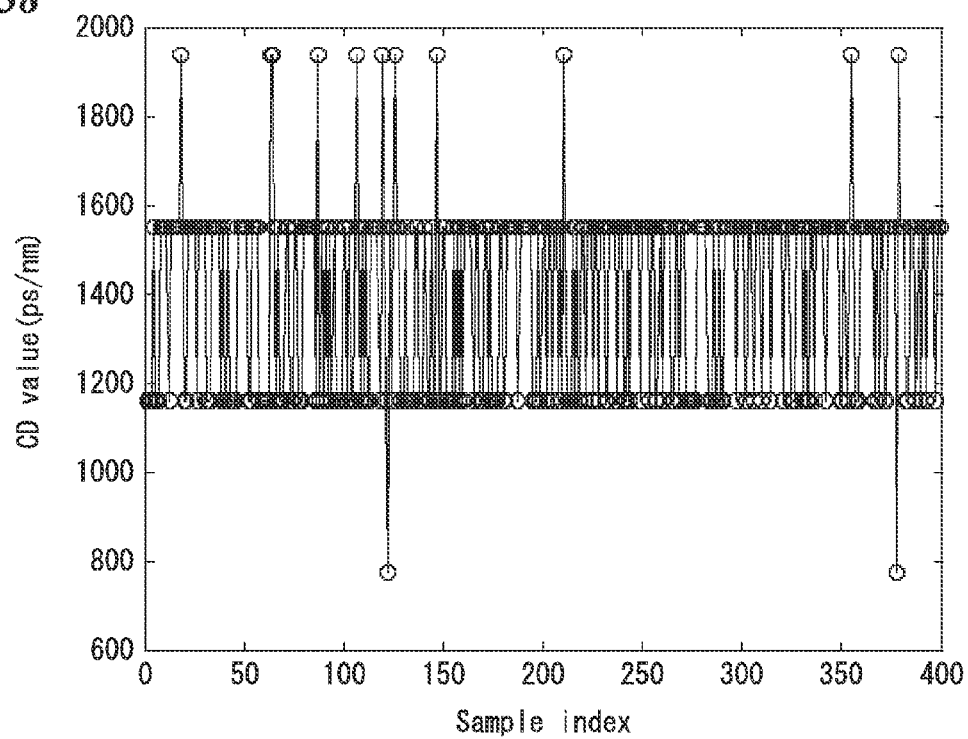
FIG. 38 is a diagram showing the results of chromatic dispersion calculation values at the time of using a first specific frequency band signal and second frequency band signals as a training signal sequence.

FIG. 38 shows an experiment result in which a first specific frequency band signal and second specific frequency band signals were used as a training signal sequence, and chromatic dispersion values were calculated 400 times for respective training signal sequences and plotted. The transmission baud rate was 12.5 Gbaud, and the center wavelength was 1574 nm. The transmission line was a single mode fiber (SMF), and 80 km transmission was carried out. Moreover, a plurality of frames were transmitted, where a transmission frame format of each frame was such that the first specific frequency band signal sequence included 160 symbols, the second specific frequency band signal sequences respectively included 16 symbols therebefore and thereafter, the length of the training signal sequence was 192 symbols, and the number of data symbols was 1500 symbols.

Figure 39:
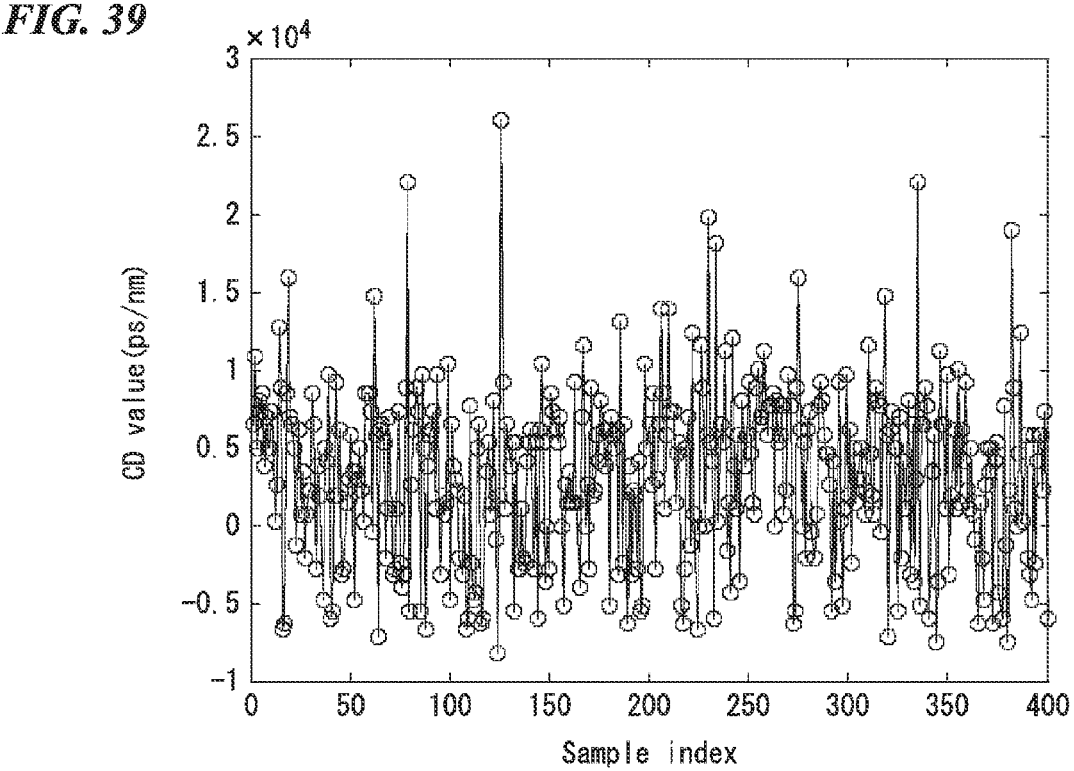
FIG. 39 is a diagram showing the results of chromatic dispersion calculation values at the time of using only first specific frequency band signals and not using second frequency band signals as a training signal sequence.
Figure 40:
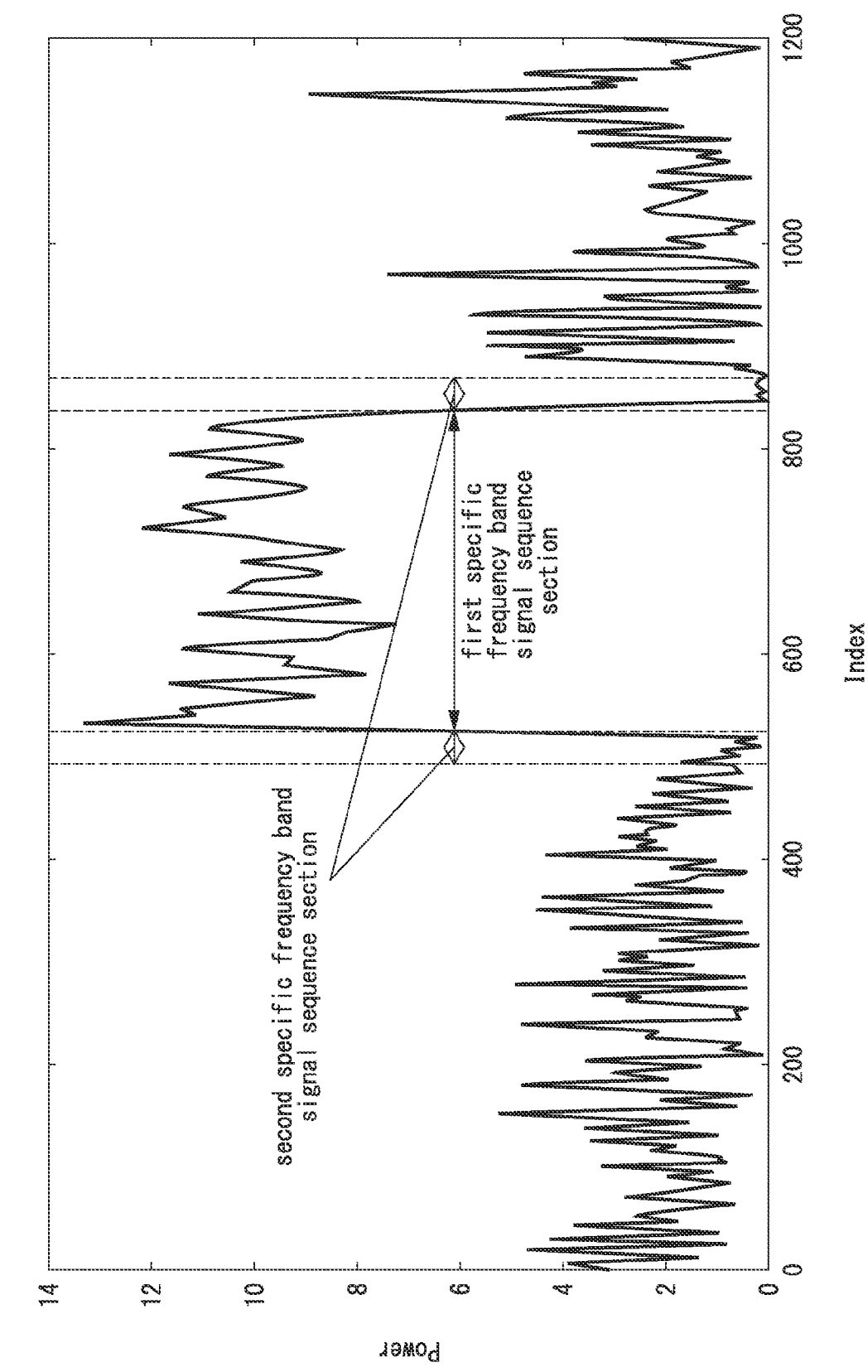
FIG. 40 is a diagram showing an output signal sequence of a first multiplexing circuit.

80 km SMF transmission corresponds to a chromatic dispersion value of approximately 1360 ps/nm, and it can be seen that with the fifth or sixth embodiment of the present invention, a chromatic dispersion value (a CD value) can be calculated as a value in the vicinity of 1360 ps/nm, with respect to each training signal sequence. Moreover, 1397 ps/nm is obtained by averaging these 400 samples, and it can be seen that a chromatic dispersion value almost equivalent to the anticipated value can be calculated. Furthermore, for purposes of comparison, FIG. 39 shows an experimental result of calculated values of chromatic dispersion when second specific frequency band signals were not used and only the first specific frequency band signals were used as training signal sequences. The diagram shows that the accuracy in calculating chromatic dispersion becomes significantly deteriorated if the second specific frequency band signal sequences are not used. This is because interference signals are generated at both ends of the first specific frequency band signal sequence if the second specific frequency band signal sequences are not used. In contrast, with use of the second specific frequency band signal sequences, as shown in FIG. 40, in the output signal sequence of the n-th multiplexing circuit 8204-n, signal components are eliminated (or becomes extremely small) in the sections of the second specific frequency band signal sequences, and the influence thereof on the first specific frequency band signal sequence becomes small.

Figure 41:
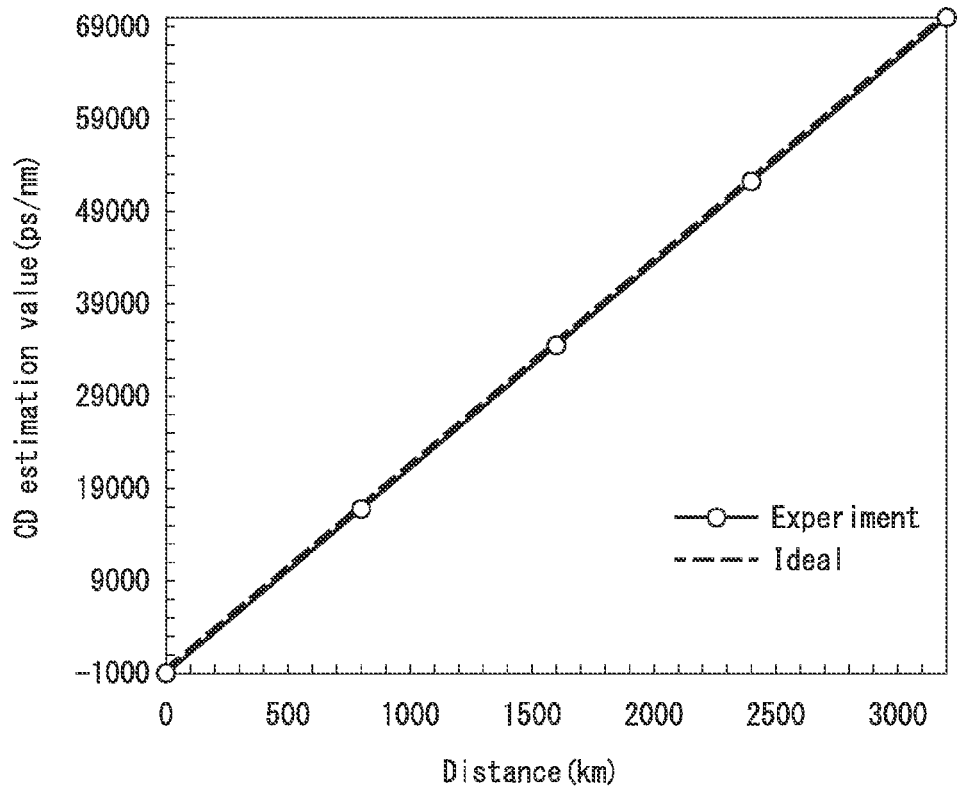
FIG. 41 is a diagram showing the results of chromatic dispersion calculation values at the time of carrying out long-haul transmission with an SMF.

FIG. 41 is an experimental result where the horizontal axis represents a transmission distance over SMF, and the vertical axis represents calculated values of chromatic dispersion. The number of averaged frames was 400 frames. As can be understood from the diagram, the chromatic dispersion value becomes higher in proportion to the transmission distance; however, the chromatic dispersion values can be calculated as per the ideal values by using the proposed scheme.

Figure 42:
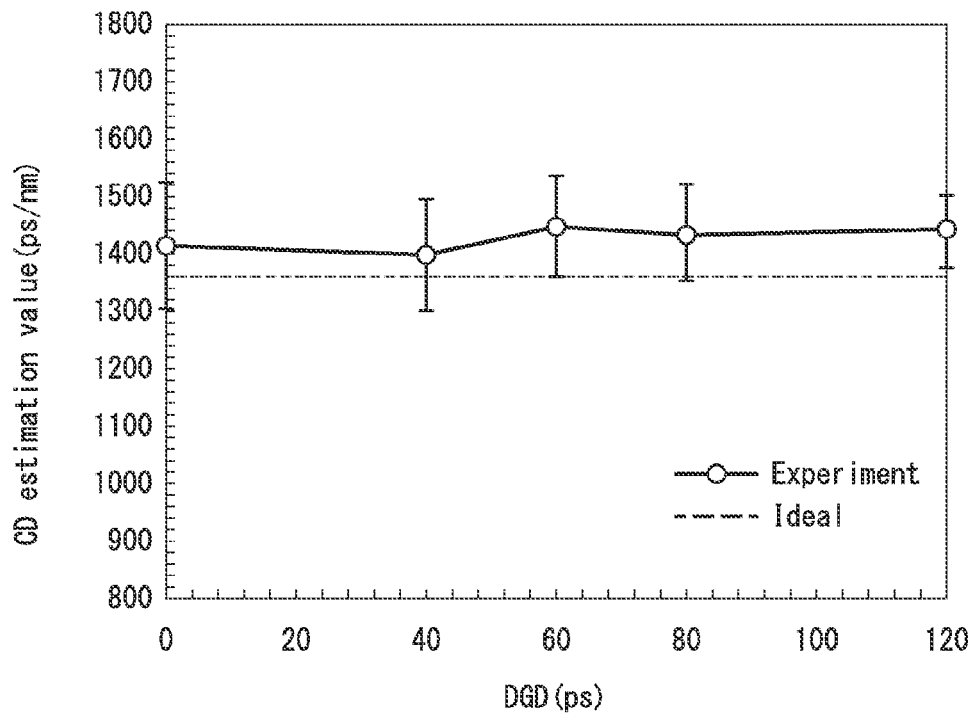
FIG. 42 is a diagram showing the results of chromatic dispersion calculation values at the time of applying polarization mode dispersion.

FIG. 42 is an experimental result when polarization mode dispersion (DGD) was added with an emulator. In the diagram, the solid line shows measured values of chromatic dispersion values calculated in the experiment, and the dashed line shows chromatic dispersion values when the values were ideally estimated. The number of averaged frames was 400 frames. As can be understood from the diagram, chromatic dispersion values can be calculated at a high level of accuracy regardless of polarization mode dispersion.

Although the embodiments of the present invention have been described in detail with reference to the drawings, specific configurations are not limited to these embodiments, and may include designs or the like (addition, omission, replacement of configurations, and other modifications) without departing from the gist of the present invention. For example, the above embodiments may be combined appropriately. The present invention is not limited by the description above, and is limited only by the accompanying claims.

INDUSTRIAL APPLICABILITY

As described above, in accordance with the present invention, with use of an optical signal transmitting apparatus and an optical signal receiving apparatus of specific frequency band signals, it is possible to calculate an estimated chromatic dispersion value, and compensate for distortion in transmission signals caused by chromatic dispersion.

DESCRIPTION OF REFERENCE SYMBOLS 101, 201 . . . transmission signal modulating circuit
102, 202 . . . signal multiplexing circuit
103, 203 . . . electro-optical conversion circuit
104, 204 . . . specific frequency band signal generating circuit
205 . . . polarization-division multiplexing circuit
1001, 3001 . . . photoelectric conversion circuit
1002, 3002 . . . analog/digital conversion circuit
1003, 3003 . . . chromatic dispersion compensating unit
1004, 3004 . . . adaptive equalization circuit
1005, 3005 . . . demodulating circuit
1006, 1006A, 3006, 3006A . . . chromatic dispersion calculating unit (chromatic dispersion value calculating apparatus)
2001, 4001 . . . signal distributing circuit
2002-1 to 2002-N, 4002-1 to 4002-N . . . n-th frequency band pass filter circuit ($1 \leq n \leq N$, $N \geq 2$)
2003-1 to 2003-N, 4003-1 to 4003-N . . . n-th power calculating circuit ($1 \leq n \leq N$, $N \geq 2$)
2004 . . . delay time calculating circuit
2005 . . . chromatic dispersion value calculating circuit
2006-1 to 2006-N . . . averaging circuit
3000 . . . polarized wave distributing circuit
4004-1 to 4004-N . . . n-th multiplexing circuit ($1 \leq n \leq N$, $N \geq 2$)
4006-1 to 4006-N . . . averaging circuit
5001-1, 5001-2 . . . overlap FFT calculating circuit
5002-1, 5002-2 . . . frequency domain filter circuit
5003-1, 5003-2 . . . overlap IFFT calculating circuit
5004-1, 5004-2 . . . high frequency band pass filter circuit
5005-1, 5005-2 . . . low frequency band pass filter circuit
5006-1, 5006-2 . . . averaging circuit
6000 . . . frame detection, frequency offset calculation, and chromatic dispersion calculation unit
6001-1, 6000-2 . . . memory
6002 . . . frequency offset calculating circuit
6003-1, 6003-2 . . . FFT circuit for frame detection
6004 . . . specific frequency band signal detecting circuit
7101, 7201 . . . transmission signal modulating circuit
7102, 7202 . . . signal multiplexing circuit
7103, 7203 . . . electro-optical conversion circuit
7104, 7204 . . . training signal sequence generating circuit (specific frequency band signal generating circuit)
7205 . . . polarization-division multiplexing circuit
8001 . . . polarized wave dividing circuit
8002-1, 8002-2 . . . photoelectric conversion circuit
8003-1, 8003-2 . . . analog/digital conversion circuit
8004-1, 8004-2 . . . chromatic dispersion compensating unit
8005, 9005 . . . adaptive equalization circuit
8006, 9006 . . . demodulating circuit
8007 . . . chromatic dispersion value calculating unit (chromatic dispersion value calculating apparatus)
8101-1, 8101-2 . . . memory
8102 . . . training signal sequence detecting circuit
8103 . . . frequency offset calculating circuit
8104 . . . delay calculating circuit
8201-1, 8201-2 . . . signal distributing circuit
8202-1-1 to 8202-1-N, 8202-2-1 to 8202-2-N . . . n-th frequency band pass filter circuit ($1 \leq n \leq N$, $N \geq 2$)
8203-1-1 to 8203-1-N, 8203-2-1 to 8203-2-N . . . n-th power calculating circuit ($1 \leq n \leq N$, $N \geq 2$)
8204-1 to 8204-N . . . n-th multiplexing circuit ($1 \leq n \leq N$, $N \geq 2$)
8205-1 to 8205-N . . . n-th averaging filter circuit ($1 \leq n \leq N$, $N \geq 2$)
8206 . . . delay time calculating circuit

The invention claimed is:

1. A chromatic dispersion value calculating apparatus comprising:
at least one set including
a signal distributing circuit which distributes, into a plurality of signal sequences, an electrical digital signal converted from a received optical signal of an optical signal transmitted by an optical signal transmission apparatus in which a known signal with concentrated frequency components of a plurality of specific frequencies is appended to a signal generated from a transmission data sequence,
a plurality of frequency band pass filter circuits, each of which separating only each of a plurality of specific frequency components in which the known signal is included from each of the signal sequences distributed by the signal distributing circuit, and passing each of the specific frequency components therethrough, and
a plurality of power calculating circuits which are provided so as to correspond respectively to the plurality of frequency band pass filter circuits and which calculate power values of signals output from the corresponding frequency band pass filter circuits;

a delay time calculating circuit which detects times at which power has the maximum value or times at which the power exceeds a predetermined threshold value, respectively from signal sequences of the power values, and which compares the detected times; and a chromatic dispersion value calculating circuit which calculates a chromatic dispersion value based on a comparison result of the times by the delay time calculating circuit.

2. The chromatic dispersion value calculating apparatus according to claim 1, further comprising a plurality of averaging circuits which are provided so as to correspond to the respective signal sequences and which average the signal sequences of the power values obtained in a period in which the known signal arrives.

3. The chromatic dispersion value calculating apparatus according to claim 1, wherein the received optical signal is a received optical signal in each of polarized waves of the optical signal, the plurality of signal sequences are a plurality of polarized wave signal sequences, a plurality of sets each including the signal distributing circuit, the plurality of frequency band pass filter circuits, and the plurality of power calculating circuits are provided so as to correspond to the polarized waves, the chromatic dispersion value calculating apparatus further comprises a plurality of multiplexing circuits which synthesize signal sequences of the power values output from the plurality of power calculating circuits corresponding to different polarized waves in the same frequency band, and the delay time calculating circuit detects the times at which power has the maximum value or times at which the power exceeds the predetermined threshold value, from signal sequences of the power values output from the plurality of multiplexing circuits.

4. The chromatic dispersion value calculating apparatus according to claim 3, further comprising a plurality of averaging circuits which are provided so as to correspond to the respective polarized wave signal sequences and which average the signal sequences of the power values obtained in a period in which the known signal arrives.

5. An optical signal receiving apparatus comprising:

a photoelectric conversion circuit which converts, into an electrical signal, a received optical signal of an optical signal in which a known signal with concentrated frequency components in a plurality of specific frequencies is appended to a signal generated from a transmission data sequence;

an analog/digital conversion circuit which converts the electrical signal converted by the photoelectric conversion circuit into a digital signal;

a chromatic dispersion calculating unit which calculates a chromatic dispersion value;

a chromatic dispersion compensating unit which compensates the digital signal output from the analog/digital conversion circuit, for distortion caused by chromatic dispersion, based on the chromatic dispersion value calculated by the chromatic dispersion calculating unit;

an adaptive equalization circuit which equalizes the digital signal in which the distortion caused by the chromatic dispersion has been compensated for by the chromatic dispersion compensating unit; and a demodulating circuit which demodulates the digital signal which have been equalized by the adaptive equalization circuit, wherein the chromatic dispersion calculating unit is the chromatic dispersion value calculating apparatus according to claim 1 or claim 2, and the chromatic dispersion calculating unit calculates the chromatic dispersion value from the digital signal converted by the analog/digital conversion circuit or the digital signal output from the chromatic dispersion compensating unit.

6. An optical signal receiving apparatus comprising:

a polarized wave distributing circuit which distributes, into polarized waves, a received optical signal of an optical signal in which a known signal with frequency components concentrated in a plurality of specific frequencies is appended to a signal generated from a transmission data sequence;

a plurality of photoelectric conversion circuits which convert optical signals in the respective polarized waves distributed by the polarized wave distributing circuit into electrical signals;

a plurality of analog/digital conversion circuits which are provided so as to correspond respectively to the plurality of photoelectric conversion circuits, and which convert the electrical signals converted by the plurality of corresponding photoelectric conversion circuits into digital signals;

a chromatic dispersion calculating unit which calculates a chromatic dispersion value;

a plurality of chromatic dispersion compensating units which are provided so as to correspond to the plurality of analog/digital conversion circuits, and which compensate the digital signals output from the corresponding analog/digital conversion circuits for distortion caused by chromatic dispersion, based on the chromatic dispersion value calculated by the chromatic dispersion calculating unit;

an adaptive equalization circuit which equalizes respective digital signals in which the distortion caused by the chromatic dispersion has been compensated for by the plurality of chromatic dispersion compensating units; and a plurality of demodulating circuits which demodulate respective digital signals equalized by the adaptive equalization circuit, wherein the chromatic dispersion calculating unit is the chromatic dispersion value calculating apparatus according to claim 3 or claim 4, and the chromatic dispersion calculating unit calculates the chromatic dispersion value from the digital signals converted by the plurality of analog/digital conversion circuits, or the digital signals output from the plurality of chromatic dispersion compensating units.

7. The chromatic dispersion value calculating apparatus according to claim 3, wherein the optical signal transmitted by the optical signal transmission apparatus is generated by time-division multiplexing a training signal sequence in which second specific frequency band signal sequences with power concentrated in a specific frequency band which differs from a first specific frequency band signal sequence with power concentrated in a plurality of specific frequency bands are appended before and after the first specific frequency band signal sequence with the transmission data sequence, each of the plurality of frequency band pass filter circuits separates each of a plurality of specific frequency components with power concentrated in the first specific frequency band signal sequence, the chromatic dispersion value calculating apparatus further comprises a plurality of averaging filter circuits which are provided so as correspond respectively to the plurality of multiplexing circuits and which average consecutive signal sequences output from the corresponding multiplexing circuits, and the delay time calculating circuit detects, for respective signal sequences averaged by the plurality of averaging filter circuits, the times at which power has the maximum value or the times at which the power exceeds the predetermined threshold value.

8. The chromatic dispersion value calculating apparatus according to claim 7, further comprising a frequency offset calculating circuit which calculates a frequency offset based on frequencies at which the power has a peak value in a signal sequence of the electrical digital signal, wherein the plurality of frequency band pass filter circuits shift frequencies of frequency bands to be passed, based on the value of the frequency offset calculated by the frequency offset calculating circuit, or compensate the signal sequences of the polarized waves to be passed for the frequency offset, based on the value of the frequency offset.

9. The chromatic dispersion value calculating apparatus according to claim 7, further comprising a training signal detecting circuit which detects an inserted position of the training signal sequence in the electrical digital signal, which extracts a signal sequence in a section which includes the training signal sequence and signal sequences in sections therebefore and thereafter, based on the detected inserted position, and which outputs the signal sequences to the signal distributing circuit.

10. The chromatic dispersion value calculating apparatus according to claim 9, further comprising a frequency offset calculating circuit which calculates a frequency offset based on frequencies at which the power has a peak value in the signal sequences extracted by the training signal detecting circuit, wherein the plurality of frequency band pass filter circuits shift frequencies of frequency bands to be passed, based on the value of the frequency offset calculated by the frequency offset calculating circuit, or compensate the signal sequences of the polarized waves to be passed for the frequency offset, based on the value of the frequency offset.

11. An optical signal receiving apparatus comprising:

a photoelectric conversion circuit which converts, into an electrical signal, a received optical signal of an optical signal in which a training signal sequence in which second specific frequency band signal sequences with power concentrated in a specific frequency band which differs from a first specific frequency band signal sequence with power concentrated in a plurality of specific frequency bands are appended before and after the first specific frequency band signal sequence, is time-division multiplexed with a transmission data sequence;

an analog/digital conversion circuit which converts the electrical signal converted by the photoelectric conversion circuit into a digital signal;

a chromatic dispersion compensating unit which compensates the digital signal output from the analog/digital conversion circuit for distortion caused by chromatic dispersion, based on a calculated chromatic dispersion value;

a chromatic dispersion value calculating unit which calculates the chromatic dispersion value based on a digital signal in which the distortion caused by the chromatic dispersion has been compensated for by the chromatic dispersion compensating unit;

an adaptive equalization circuit which equalizes the digital signal in which the distortion caused by the chromatic dispersion has been compensated for by the chromatic dispersion compensating unit; and a demodulating circuit which demodulates a digital signal which has been equalized by the adaptive equalization circuit, wherein the chromatic dispersion value calculating unit is the chromatic dispersion value calculating apparatus according to any one of claim 7 through claim 10.

12. An optical signal receiving apparatus comprising:

a polarized wave dividing circuit which divides, into polarized waves, a received optical signal of an optical signal in which a training signal sequence in which second specific frequency band signal sequences with power concentrated in a specific frequency band which differs from a first specific frequency band signal sequence with power concentrated in a plurality of specific frequency bands are appended before and after the first specific frequency band signal sequence, is time-division multiplexed with a transmission data sequence;

a plurality of photoelectric conversion circuits which convert optical signals in the respective polarized waves divided by the polarized wave dividing circuit into electrical signals;

a plurality of analog/digital conversion circuits which are provided so as to correspond respectively to the plurality of photoelectric conversion circuits, and which convert the electrical signals converted by the plurality of corresponding photoelectric conversion circuits into digital signals;

a plurality of chromatic dispersion compensating units which are provided so as to correspond respectively to the plurality of analog/digital conversion circuits, and which compensate the digital signals output from the plurality of corresponding analog/digital conversion circuits for distortion caused by chromatic dispersion, based on a calculated chromatic dispersion value;

a chromatic dispersion value calculating unit which calculates the chromatic dispersion value from digital signals in which the distortion caused by the chromatic dispersion has been compensated for by the plurality of chromatic dispersion compensating units;

an adaptive equalization circuit which equalizes the respective digital signals in which the distortion caused by the chromatic dispersion has been compensated for by the plurality of chromatic dispersion compensating units; and a plurality of demodulating circuits which are provided for the polarized waves, and which demodulate digital signals in each of the polarized waves equalized by the adaptive equalization circuit, wherein the chromatic dispersion value calculating unit is the chromatic dispersion value calculating apparatus according to any one of claim 7 through claim 10.

13. A chromatic dispersion value calculation method comprising:

a signal distributing step of distributing, into a plurality of signal sequences, an electrical digital signal in each of polarized waves converted from a received optical signal in each of the polarized waves of an optical signal transmitted by an optical signal transmitting apparatus in which a training signal sequence in which second specific frequency band signal sequences with power concentrated in a specific frequency band which differs from a first specific frequency band signal sequence with power concentrated in a plurality of specific frequency bands are appended before and after the first specific frequency band signal sequence, is time-division multiplexed with a transmission data sequence;
a filtering step of separating each of a plurality of specific frequency components with power concentrated in the first specific frequency band signal sequence, from each of the plurality of signal sequences distributed in the signal distributing step;
a power calculating step of calculating power values of the signal sequences of the plurality of specific frequency components separated in the filtering step;
a multiplexing step of synthesizing signal sequences of the power values corresponding to different polarized waves of the same specific frequency component, among the power values calculated in the power calculating step;
an averaging step of averaging consecutive signal sequences synthesized in the multiplexing step; and
a delay time calculating step of detecting times at which power has the maximum value or times at which the power exceeds a predetermined threshold value from a signal sequence averaged in the averaging step, comparing the detected times, and outputting a delay time obtained as a result of comparison or a chromatic dispersion value calculated from the delay time.

14. An optical signal transmitting apparatus comprising:
a specific frequency band signal generating circuit which generates a known signal with frequency components concentrated in a plurality of specific frequency bands including first specific frequency bands and a second specific frequency band which differs from the first specific frequency bands, the known signal including a first specific frequency band signal with power concentrated in the first specific frequency bands and second specific frequency band signals which are appended before and after the first specific frequency band signal, the second specific frequency band signals having power concentrated in the second specific frequency band;
a signal multiplexing circuit which appends the known signal generated by the specific frequency band signal generating circuit to a signal generated from a transmission data sequence; and
an electro-optical conversion circuit which converts an electrical signal generated by the signal multiplexing circuit into an optical signal.

15. The optical signal transmitting apparatus according to claim 14, wherein a plurality of sets each including the signal multiplexing circuit and the electro-optical conversion circuit are provided so as to correspond to polarized waves of the optical signal, and
the optical signal transmitting apparatus further comprises a polarization-division multiplexing circuit which polarization-division multiplexes optical signals output from the electro-optical conversion circuits included in the plurality of sets.

16. An optical signal transmitting apparatus comprising:
a specific frequency band signal generating circuit which generates a known signal with frequency components concentrated in a plurality of specific frequency bands;
a signal multiplexing circuit which appends the known signal generated by the specific frequency band signal generating circuit to a signal generated from a transmission data sequence; and
an electro-optical conversion circuit which converts an electrical signal generated by the signal multiplexing circuit into an optical signal,
wherein
the specific frequency band signal generating circuit generates the known signal by generating a first specific frequency band signal sequence with power concentrated in a plurality of specific frequency bands and second specific frequency band signal sequences with power concentrated in a specific frequency band different from the first specific frequency band signal sequence, and generating a training signal sequence in which the second specific frequency band signal sequences are time-division multiplexed immediately before and immediately after the first specific frequency band signal sequence, and
the signal multiplexing circuit generates a signal sequence in which the training signal sequence generated by the specific frequency band signal generating circuit is inserted into the transmission data sequence by means of time-division multiplexing.

17. The optical signal transmitting apparatus according to claim 16, wherein a transmission section of the second specific frequency band signal sequences in the training signal sequence only has a DC component, or no signals are transmitted in the transmission section.

18. The optical signal transmitting apparatus according to claim 16, wherein a frequency interval between the specific frequency band in which power is concentrated in the second specific frequency band signal sequences and the specific frequency bands in which power is concentrated in the first specific frequency band signal sequence is set so as to be a value greater than a predetermined value.

19. The optical signal transmitting apparatus according to claim 18, wherein the predetermined value is the maximum value with which a set frequency offset can be compensated for.

20. The optical signal transmitting apparatus according to claim 16, wherein the phase of the first specific frequency band signal sequence is different from the phases of the second specific frequency band signal sequences.

21. The optical signal transmitting apparatus according to claim 16, wherein the second specific frequency band signal sequences before and after the first specific frequency band signal sequence are different from each other.

22. The optical signal transmitting apparatus according to claim 16, wherein a plurality of sequences of the training signal sequence are transmitted on different polarization planes.

* * * * *